(12) United States Patent
Takashima et al.

(10) Patent No.: US 8,929,542 B2
(45) Date of Patent: *Jan. 6, 2015

(54) CRYPTOGRAPHIC PROCESSING SYSTEM, KEY GENERATION DEVICE, KEY DELEGATION DEVICE, ENCRYPTION DEVICE, DECRYPTION DEVICE, CRYPTOGRAPHIC PROCESSING METHOD, AND CRYPTOGRAPHIC PROCESSING PROGRAM

(75) Inventors: Katsuyuki Takashima, Tokyo (JP); Tatsuaki Okamoto, Tokyo (JP)

(73) Assignees: Mitsubishi Electric Corporation, Tokyo (JP); Nippon Telegraph and Telephone Corporation, Tokyo (JP)

(*) Notice: Subject to any disclaimer, the term of this patent is extended or adjusted under 35 U.S.C. 154(b) by 184 days.

This patent is subject to a terminal disclaimer.

(21) Appl. No.: 13/521,104

(22) PCT Filed: Dec. 20, 2010

(86) PCT No.: PCT/JP2010/072912
§ 371 (c)(1),
(2), (4) Date: Jul. 9, 2012

(87) PCT Pub. No.: WO2011/083678
PCT Pub. Date: Jul. 14, 2011

(65) Prior Publication Data
US 2013/0039489 A1 Feb. 14, 2013

(30) Foreign Application Priority Data
Jan. 8, 2010 (JP) .................................. 2010-002709

(51) Int. Cl.
*H04L 9/28* (2006.01)
*H04L 9/06* (2006.01)
*H04L 9/08* (2006.01)
*H04L 9/30* (2006.01)

(52) U.S. Cl.
CPC ............ *H04L 9/0836* (2013.01); *H04L 9/3073* (2013.01); *H04L 2209/08* (2013.01)

USPC .............. 380/44; 380/28; 380/280; 713/168; 713/189

(58) Field of Classification Search
USPC .......................... 380/28, 4, 280; 713/168, 189
See application file for complete search history.

(56) References Cited

U.S. PATENT DOCUMENTS

2007/0223686 A1* 9/2007 Li .................................... 380/28
2012/0027201 A1* 2/2012 Fujisaki et al. ................. 380/28

(Continued)

OTHER PUBLICATIONS

U.S. Appl. No. 13/509,695, filed May 14, 2012, Takashima et al.

(Continued)

*Primary Examiner* — Venkat Perungavoor
*Assistant Examiner* — Amir Mehrmanesh
(74) *Attorney, Agent, or Firm* — Oblon, Spivak, McClelland, Maier & Neustadt, L.L.P.

(57) ABSTRACT

It is an object of this invention to implement a predicate encryption scheme with delegation capability. A cryptographic process is performed using dual vector spaces (dual distortion vector spaces) of a space V and a space V* paired through a pairing operation. An encryption device generates as a cipher vector a vector of the space V, the cipher vector being a vector in which transmission information is embedded. Using a predetermined vector of the space V* as a key vector, a decryption device performs the pairing operation on the cipher vector generated by the encryption device and the key vector to decrypt the cipher vector and to extract information concerning the transmission information. In particular, the encryption device and the decryption device perform the cryptographic process without using some dimensions of the space V and the space V*.

6 Claims, 21 Drawing Sheets

(56) References Cited

U.S. PATENT DOCUMENTS

2012/0045056 A1* 2/2012 Takashima et al. ........... 380/255
2012/0297201 A1* 11/2012 Matsuda et al. ............. 713/189

OTHER PUBLICATIONS

Okamoto, T., et al., "Hierarchical Predicate Encryption for Inner-Products," Lecture Notes in Computer Science, vol. 5912, pp. 214-231, (Dec. 1, 2009).
Okamoto, T., et al., "A Geometric Approach on Pairings and Hierarchical Predicate Encryption," In Poster Session Eurocrypt 2009, Total 1 Page, (Apr. 2009).
Boneh, D., et al., "Anonymity from Asymmetry: New Constructions for Anonymous HIBE," In Poster Session, Eurocrypt 2009, Total 9 Pages, (Apr. 2009).
Katz, J., et al., "Predicate Encryption Supporting Disjunctions, Polynomial Equations, and Inner Products," Cryptology ePrint Archive, Report 2007/404, pp. 1-28. (Jul. 8, 2008).
Lewko, A., et al., "New Techniques for Dual System Encryption and Fully Secure HIBE with Short Ciphertexts," Cryptology ePrint Archive, Report 2009/482, Total 22 pages, (2009).
Okamoto, T., et al., "Hierarchical Predicate Encryption with Inner-Products from a Single DDH-like Assumption," 2010 Nen Symposium on Cryptography and Information Security, pp. 1-6, (Jan. 19-22, 2010).
Bethencourt, J., et al., "Ciphertext-Policy Attribute-Based Encryption," 2007 IEEE Symposium on Security and Privacy, pp. 321-334, (2007).
Boneh, D., et al., "Efficient Selective-ID Secure Identity Based Encryption Without Random Oracles," EUROCRYPT 2004, LNCS vol. 3027, pp. 223-238, (2004).
Boneh D., et al., "Secure Identity Based Encryption Without Random Oracles," CRYPTO 2004, LNCS vol. 3152, pp. 1-24, (2004).
Boneh, D., et al., "Hierarchical Identity Based Encryption with Constant Size Ciphertext," EUROCRYPT 2005, LNCS vol. 3494, pp. 1-27, (2005).
Boneh, D., et al., "Identity-Based Encryption from the Weil Pairing," CRYPTO 2001, LNCS vol. 2139, pp. 1-21, (2001).
Boneh, D., et al., "Generalized Identity Based and Broadcast Encryption Schemes," ASIACRYPT 2008, LNCS vol. 5350, pp. 455-470, (2008).
Boneh, D., et al., "Conjunctive, Subset, and Range Queries on Encrypted Data," TCC 2007, LNCS vol. 4392, pp. 535-554, (2007).
Boyen, X., et al., "Anonymous Hierarchical Identity-Based Encryption (Without Random Oracles)," CRYPTO 2006, LNCS vol. 4117, pp. 1-30, (Jun. 8, 2006).
Cocks, C., "An Identity Based Encryption Scheme Based on Quadratic Residues," Cryptography and Coding 2001, LNCS vol. 2260, pp. 360-363, (2001).
Gentry, C., "Practical Identity-Based Encryption Without Random Oracles," EUROCRYPT 2006, LNCS vol. 4004, pp. 445-464, (2006).
Gentry, C., et al., "Hierarchical Identity Based Encryption with Polynomially Many Levels," TCC 2009, LNCS vol. 5444, pp. 1-29, (2009).
Gentry, C., et al., "Hierarchical ID-Based Cryptography," ASIACRYPT 2002, LNCS vol. 2501, pp. 1-21, (2002).
Goyal, V., et al., "Attribute-Based Encryption for Fine-Grained Access Control of Encrypted Data," ACM Conference on Computer and Communication Security, pp. 1-28, (2006).
Groth, J., et al., "Efficient Non-interactive Proof Systems for Bilinear Groups," EUROCRYPT 2008, LNCS vol. 4965, pp. 1-30, (Jun. 3, 2008).
Horwitz, J., et al., "Toward Hierarchical Identity-Based Encryption," EUROCRYPT 2002, LNCS vol. 2332, pp. 466-481, (2002).
Okamoto, T., et al., "Homomorphic Encryption and Signatures from Vector Decomposition," Pairing 2008,L NCS vol. 5209, pp. 57-74, (Aug. 25, 2008).
Ostrovsky, R., et al., "Attribute-Based Encryption with Non-Monotonic Access Structures," ACM Conference on Computer and Communication Security, pp. 195-203, (2007).
Pirretti, M., et al., "Secure Attribute-Based Systems," ACM Conference on Computer and Communications Security, Total pp. 14, (2006).
Sahai, A., et al., "Fuzzy Identity-Based Encryption," EUROCRYPT 2006, LNCS vol. 3494, pp. 1-15, (2005).
Shi, E., et al., "Delegating Capabilities in Predicate Encryption Systems," ICALP 2008, LNCS vol. 5126, pp. 1-35, (2008).
Takashima, K., "Efficiently Computable Distortion Maps for Supersingular Curves," ANTS VIII, LNCS vol. 5011, pp. 88-101, (2008).
Waters, B., "Ciphertext-Policy Attribute-Based Encryption: An Expressive, Efficient, and Provably Secure Realization," IACR. Total 30 pages, (2008).
Waters, B., "Dual System Encryption: Realizing Fully Secure IBE and HIBE under Simple Assumptions," CRYPTO 2009, LNCS vol. 5677, pp. 1-38, (2009).
Galbraith, S., et al., "An analysis of the vector decomposition problem," PKC 2008, LNCS vol. 4939, pp. 1-16, (2008).
Duursma, I., et al., "The Vector Decomposition Problem for Elliptic and Hyperelliptic Curves," J. Ramanujan Math, Soc. 20, No. 1, Total pp. 20, (2005).
Duursma, I., et al., "ElGamal type signature schemes for n-dimensional vector spaces," IACR ePrint, vol. 312, pp. 1-13, (2006).
Yoshida, M., et al., "Vector Decomposition Problem and the Trapdoor Inseparable Multiplex Transmission Scheme based the Problem," SCIS, Total 6 pages, (Jan. 26-29, 2003).
Yoshida, M., "Inseparable Multiplex Transmission Using the pairing on Elliptic Curves and Its Application to Watermarking," Fifth Conference on Algebraic Geometry, Number Theory, Coding Theory and Cryptography, University of Tokyo, 2003, Total 11 pages, (2003).
Beimel, A., "Secure Schemes for Secret Sharing and Key Distribution," Israel Institute of Technology, Total 115 pages, (Jun. 1996).
Boneh, D., et al., "Improved Efficiency for CCA-Secure Cryptosystems Built Using Identity-Based Encryption," RSA-CT 2005, LNCS, Total 16 pages, (2005).
Canetti, R., et al., "Chosen-Ciphertext Security from Identity-Based Encryption," EUROCRYPT 2004, LNCS, Total 15 pages, (2004).
Waters, B., "Efficient Identity-Based Encryption Without Random Oracles," EUROCRYPT 2005, LNCS vol. 3152, pp. 1-13, (2005).
International Search Report Issued Jan. 25, 2011 in PCT/JP10/72912 Filed Dec. 20, 2010.

* cited by examiner

DIAGRAM FOR EXPLAINING A BASIS AND A BASIS VECTOR

CRYPTOGRAPHIC PROCESSING SYSTEM, KEY GENERATION DEVICE, KEY DELEGATION DEVICE, ENCRYPTION DEVICE, DECRYPTION DEVICE, CRYPTOGRAPHIC PROCESSING METHOD, AND CRYPTOGRAPHIC PROCESSING PROGRAM

TECHNICAL FIELD

This invention relates to a hierarchical predicate key encapsulation mechanism (HPKEM) scheme and a hierarchical predicate encryption (HPE) scheme.

BACKGROUND ART

Non-Patent Literature 18 discusses implementation of HPKEM and HPE schemes in dual spaces paired through a pairing operation.

CITATION LIST

Non-Patent Literature

Non-Patent Literature 1: Bethencourt, J., Sahai, A., Waters, B.: Ciphertext-policy attribute-based encryption. In: 2007 IEEE Symposium on Security and Privacy, pp. 321-334. IEEE Press (2007)

Non-Patent Literature 2: Boneh, D., Boyen, X.: Efficient selective-ID secure identity based encryption without random oracles. In: Cachin, C., Camenisch, J. (eds.) EUROCRYPT 2004. LNCS, vol. 3027, pp. 223-238. Springer Heidelberg (2004)

Non-Patent Literature 3: Boneh, D., Boyen, X.: Secure identity based encryption without random oracles. In: Franklin, M. K. (ed.) CRYPTO 2004. LNCS, vol. 3152, pp. 443-459. Springer Heidelberg (2004)

Non-Patent Literature 4: Boneh, D., Boyen, X., Goh, E.: Hierarchical identity based encryption with constant size ciphertext. In: Cramer, R (ed.) EUROCRYPT 2005. LNCS, vol. 3494, pp. 440-456. Springer Heidelberg (2005)

Non-Patent Literature 5: Boneh, D., Franklin, M.: Identity-based encryption from the Weil pairing. In: Kilian, J. (ed.) CRYPTO 2001. LNCS, vol. 2139, pp. 213-229. Springer Heidelberg (2001)

Non-Patent Literature 6: Boneh, D., Hamburg, M.: Generalized identity based and broadcast encryption scheme. In: Pieprzyk, J. (ed.) ASIACRYPT 2008. LNCS, vol. 5350, pp. 455-470. Springer Heidelberg (2008)

Non-Patent Literature 7: Boneh, D., Waters, B.: Conjunctive, subset, and range queries on encrypted data. In: Vadhan, S. P. (ed.) TCC 2007. LNCS, vol. 4392, pp. 535-554. Springer Heidelberg (2007)

Non-Patent Literature 8: Boyen, X., Waters, B.: Anonymous hierarchical identity-based encryption (without random oracles). In: Dwork, C. (ed.) CRYPTO 2006. LNCS, vol. 4117, pp. 290-307. Springer Heidelberg (2006)

Non-Patent Literature 9: Cocks, C.: An identity based encryption scheme based on quadratic residues. In: Honary, B. (ed.) IMA Int. Conf. LNCS, vol. 2260, pp. 360-363. Springer Heidelberg (2001)

Non-Patent Literature 10: Gentry C.: Practical identity-based encryption without random oracles. In: Vaudenay, S. (ed.) EUROCRYPT 2006. LNCS, vol. 4004, pp. 445-464. Springer Heidelberg (2006)

Non-Patent Literature 11: Gentry, C., Halevi, S.: Hierarchical identity-based encryption with polynomially many levels. In: Reingold, O. (ed.) TCC 2009. LNCS, vol. 5444, pp. 437-456. Springer Heidelberg (2009)

Non-Patent Literature 12: Gentry C., Silverberg, A.: Hierarchical ID-based cryptography. In: Zheng, Y. (ed.) ASIACRYPT 2002. LNCS, vol. 2501, pp. 548-566. Springer Heidelberg (2002)

Non-Patent Literature 13: Goyal, V., Pandey, O., Sahai, A., Waters, B.: Attribute-based encryption for fine-grained access control of encrypted data. In: ACM Conference on Computer and Communication Security 2006, pp. 89-98, ACM (2006)

Non-Patent Literature 14: Groth, J., Sahai, A.: Efficient non-interactive proof systems for bilinear groups. In: Smart, N. P. (ed.) EUROCRYPT 2008. LNCS, vol. 4965, pp. 415-432. Springer Heidelberg (2008)

Non-Patent Literature 15: Horwitz, J., Lynn, B.: Towards hierarchical identity-based encryption. In: Knudsen, L. R. (ed.) EUROCRYPT 2002. LNCS, vol. 2332, pp. 466-481. Springer Heidelberg (2002)

Non-Patent Literature 16: Katz, J., Sahai, A., Waters, B.: Predicate encryption supporting disjunctions, polynomial equations, and inner products. In: Smart, N. P. (ed.) EUROCRYPT 2008. LNCS, vol. 4965, pp. 146-162. Springer Heidelberg (2008)

Non-Patent Literature 17: Okamoto, T., Takashima, K.: Homomorphic encryption and signatures from vector decomposition. In: Galbraith, S. D., Paterson, K. G. (eds.) Pairing 2008. LNCS, vol. 5209, pp. 57-74. Springer Heidelberg (2008)

Non-Patent Literature 18: Okamoto, T., Takashima, K.: A geometric approach on pairing and hierarchical predicate encryption. In: Poster session, EUROCRYPT 2009. (2009)

Non-Patent Literature 19: Ostrovsky, R., Sahai, A., Waters, B.: Attribute-based encryption with non-monotonic access structures. In: ACM Conference on Computer and Communication Security 2007, pp. 195-203, ACM, (2007)

Non-Patent Literature 20: Pirretti, M., Traynor, P., McDaniel, P., Waters, B.: Secure attribute-based systems. In: ACM Conference on Computer and Communication Security 2006, pp. 99-112, ACM, (2006)

Non-Patent Literature 21: Sahai, A., Waters, B.: Fuzzy identity-based encryption. In: Cramer, R. (ed.) EUROCRYPT 2005. LNCS, vol. 3494, pp. 457-473. Springer Heidelberg (2005)

Non-Patent Literature 22: Shi, E., Waters, B.: Delegating capability in predicate encryption systems. In: Aceto, L., Damgard, I., Goldberg, L. A., Halldorsson, M. M., Ingolfsdottir, A., Walukiewicz, I. (eds.) ICALP (2) 2008. LNCS, vol. 5126, pp. 560-578. Springer Heidelberg (2008)

Non-Patent Literature 23: Takashima, K.: Efficiently computable distortion maps for supersingular curves. In: van der Poorten, A. J., Stein, A. (eds.) ANTS VIII, LNCS, vol. 5011, pp. 88-101. Springer Heidelberg (2008)

Non-Patent Literature 24: Waters, B: Ciphertext-policy attribute-based encryption: an expressive, efficient, and provably secure realization. ePrint, IACR, http://eprint.iacr.org/2008/290

Non-Patent Literature 25: T. Okamoto and K. Takashima, "Hierarchical predicate encryption for inner-products", Asiacrypt 2009, LNCS vol. 5912, pp. 214-231. Springer Heidelberg (2009)

Non-Patent Literature 26: B. Waters, "Dual system encryption: Realizing fully secure IBE and HIBE under simple assumptions", CRYPTO 2009, LNCS vol. 5677, pp. 619-636. Springer Heidelberg (2009)

Non-Patent Literature 27: A. Lewko and B. Waters, "New techniques for dual system encryption and fully secure HIBE with short ciphertexts", ePrint, IACR, http://eprint.iacr.org/2009/482

DISCLOSURE OF INVENTION

Technical Problem

In the HPKEM and HPE schemes proposed in Non-Patent Literature 18, security proof is given in an idealized (generic) model. However, in the HPKEM and HPE schemes proposed in Non-Patent Literature 18, security proof is not given in a standard model.

It is an object of this invention to provide a predicate encryption (PE) scheme and a predicate key encapsulation mechanism (PKEM) scheme with enhanced security. In particular, it is an object of this invention to provide a PE scheme and a PKEM scheme with delegation capability.

Solution to Problem

A cryptographic processing system according to this invention, for example, performs a predicate encryption process using dual vector spaces of a space V and a space V* paired through a pairing operation shown in Formula 1, and the cryptographic processing system comprises:

an encryption device that is given a basis B^ and predetermined attribute information as a public key, the basis B^ having, out of basis vectors $b_i$ (i=1, ..., n, ..., S, ..., N) (N being an integer of 3 or greater, S being an integer from n+1 to N−1, and n being an integer from 1 to N−2) that constitute a predetermined basis B of the space V, at least basis vectors $b_i$ (i=1, ..., n+1) excluding basis vectors $b_i$ (i=S+1, ..., N), and, using a processing device, generates as a cipher vector $c_1$ a vector in which attribute information is set as coefficients of one or more basis vectors out of basis vectors $b_i$ (i=1, ..., n) of the basis B^, and predetermined information is set as a coefficient of the basis vector $b_{n+1}$; and a decryption device that, using the processing device, performs the pairing operation e ($c_1$, $k^*_{L,dec}$) shown in Formula 1 on the cipher vector $c_1$ generated by the encryption device and a key vector $k^*_{L,dec}$ to decrypt the cipher vector $c_1$ and to extract a value concerning the predetermined information, the key vector $k^*_{L,dec}$ being a vector, of a basis B* of the space V*, in which predicate information is set as coefficients of one or more basis vectors of basis vectors $b^*_i$ (i=1, ..., n) out of basis vectors $b^*_i$ (i=1, ..., n, S, ..., N) that constitute the basis B*, and a predetermined value is set as a coefficient of a basis vector $b^*_{n+1}$ of the basis B*.

$$e(p,q) := \Pi_{i=1}^{N} e(\chi_i b_i, \eta_i b^*_i) \quad \text{[Formula 1]}$$

where
$p := \Sigma_{i=1}^{N} \chi_i b_i$,
$q := \Sigma_{i=1}^{N} \eta_i b^*_i$,
$\chi_i, \eta_i$: coefficients.

Advantageous Effects of Invention

A cryptographic system according to this invention can implement a predicate encryption (PE) scheme and a predicate key encapsulation mechanism (PKEM) scheme with enhanced security.

DESCRIPTION OF PREFERRED EMBODIMENTS

Figure 1:
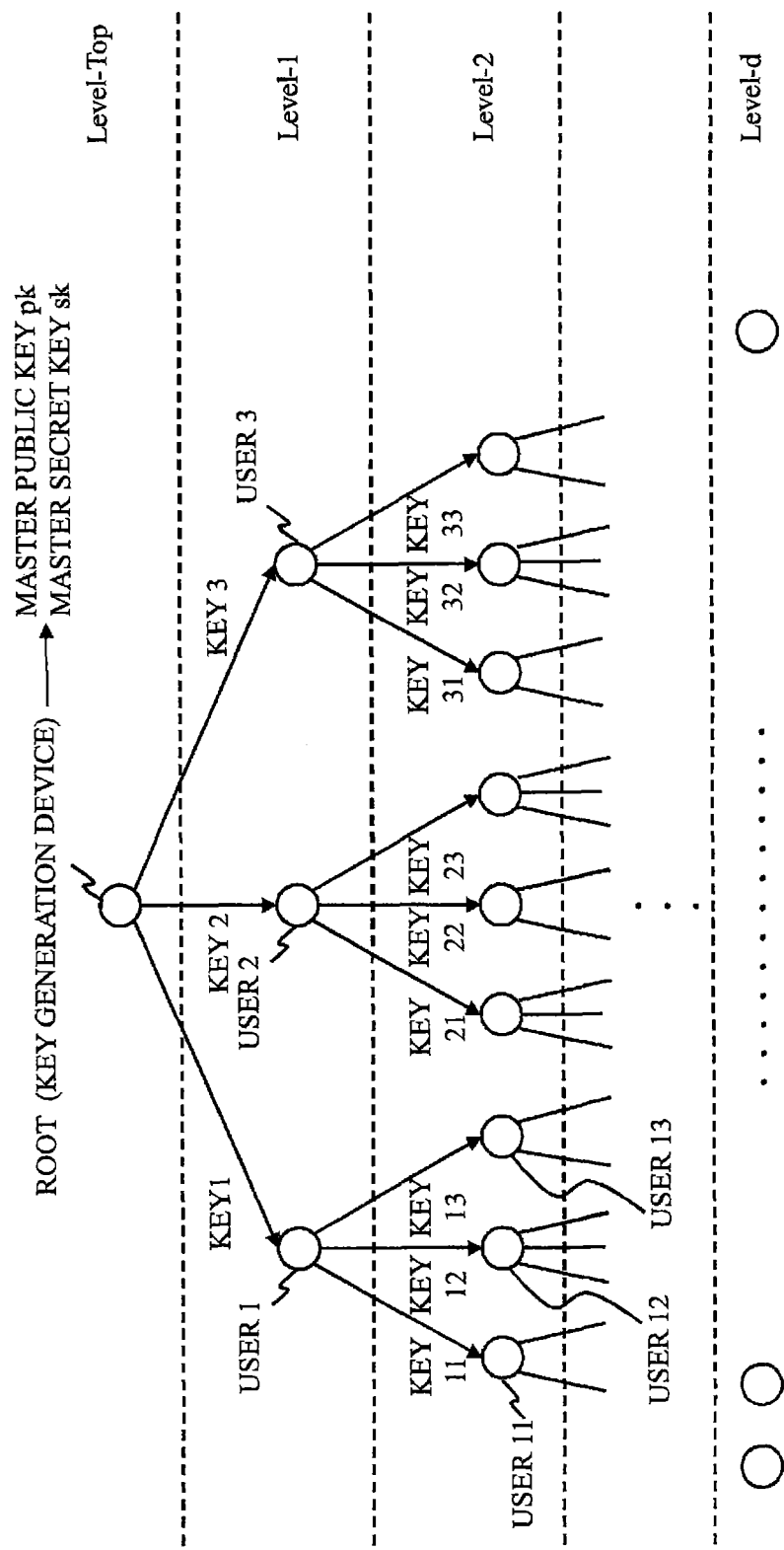
FIG. 1 is a diagram for explaining a notion of "delegation (hierarchical delegation)"

Embodiments of the invention will now be described with reference to drawings.

In the following description, a processing device is a CPU 911 or the like to be described later. A storage device is a ROM 913, a RAM 914, a magnetic disk 920 or the like to be described later. A communication device is a communication board 915 or the like to be described later. An input device is a keyboard 902, the communication board 915 or the like to be described later. An output device is the RAM 914, the magnetic disk 920, the communication board 915, an LCD

901 or the like to be described later. That is, the processing device, the storage device, the communication device, the input device, and the output device are hardware.

Notations to be used in the following description will be described.

When A is a random variable or distribution, Formula 101 denotes that y is randomly selected from A according to the distribution of A. That is, y is a random number in Formula 101.

$$y \xleftarrow{R} A \qquad \text{[Formula 101]}$$

When A is a set, Formula 102 denotes that y is uniformly selected from A. That is, y is a uniform random number in Formula 102.

$$y \xleftarrow{U} A \qquad \text{[Formula 102]}$$

Formula 103 denotes that y is set, defined or substituted by z.

$$y := z \qquad \text{[Formula 103]}$$

When a is a fixed value, Formula 104 denotes that a machine (algorithm) A outputs a on an input x.

$$A(x) \to a \qquad \text{[Formula 104]}$$

For example, $$A(x) \to 1$$

A vector symbol denotes a vector representation over a finite field $F_q$, that is, Formula 105.

$$\vec{x} \qquad \text{[Formula 105]}$$

denotes $$(x_1, \ldots, x_n) \in \mathbb{F}_q.$$

Formula 106 denotes the inner-product of two vectors $\vec{x}$ and $\vec{v}$ shown in Formula 107, and Formula 108 shows this inner-product.

$$\vec{x} \cdot \vec{v} \qquad \text{[Formula 106]}$$

$$\vec{x} = (x_1, \ldots, x_n),$$

$$\vec{v} = (v_1, \ldots, v_n) \qquad \text{[Formula 107]}$$

$$\Sigma_{i=1}^{n} x_i v_i \qquad \text{[Formula 108]}$$

$X^T$ denotes the transpose of a matrix X.

In the following description, a cryptographic process shall include an encryption process, a decryption process, and a key generation process, and shall also include a key encapsulation process.

First Embodiment

In this embodiment, basic concepts for implementing a "predicate encryption (PE) scheme with delegation" and a "predicate key encapsulation mechanism (PKEM) scheme with delegation" to be discussed in subsequent embodiments will be described, together with basic constrictions of the PE (PKEM) scheme with delegation.

Firstly, a notion of a "PE (PKEM) scheme with delegation for inner-product predicates", which is a type of PE (PKEM) scheme with delegation, will be described. The PE (PKEM) schemes with delegation to be discussed in the subsequent embodiments are PE (PKEM) schemes with delegation for inner-product predicates. To describe the notion of the PE scheme with delegation for inner-product predicates, a notion of "delegation" will be described first, together with a notion of "hierarchical delegation". Then, the "PE scheme for inner-product predicates" will be described. Then, a "hierarchical PE (HPE) scheme for inner-product predicates (hierarchical PKEM (HPKEM) scheme for inner-product predicates), which is a type of PE scheme for inner-product predicates with the notion of hierarchical delegation, will be described. Further, to reinforce the understanding of the HPE scheme for inner-product predicates, an application example of the HPE scheme for inner-product predicates will be described.

Secondly, the HPE scheme for inner-product predicates in vector spaces will be described. In this and subsequent embodiments, the HPE and HPKEM schemes for inner-product predicates are implemented in vector spaces. A "base" and a "basis vector" will be described first. Then, the "PE scheme for inner-product predicates in vector spaces" will be described. Then, a "method for implementing a hierarchical structure in a vector space" will be described. Further, to reinforce the understanding, an implementation example of the hierarchical structure will be described.

Thirdly, basic constructions of the "HPE and HPKEM schemes" according to this and subsequent embodiments will be described. An outline of a "cryptographic processing system 10" that implements the HPE and HPKEM schemes will also be described.

Fourthly, concepts for implementing the HPKEM and HPE schemes will be described. "Bilinear pairing groups", "vector spaces V and V*", "canonical dual bases A and A*", "pairing operation", "base change", and "distortion maps" will be described.

Fifthly, "dual pairing vector spaces (DPVS)" having rich mathematical structures for implementing the HPKEM and HPE schemes will be described.

Sixthly, based on the above descriptions, a method for implementing the HPE and HPKEM schemes to be discussed in detail in the subsequent embodiments will be briefly described.

<1. HPE Scheme for Inner-Product Predicates>

<1-1. Notion of Delegation (Hierarchical Delegation)>

FIG. 1 is a diagram for explaining the notion of "delegation (hierarchical delegation)".

Delegation means that a user who has a higher level key generates a lower level key having more limited capabilities than the user's (higher level) key.

In FIG. 1, a root (key generation device) generates secret keys for first level (level-1) users by using a master secret key. That is, the root generates keys 1, 2, and 3 for first level users 1, 2, and 3, respectively. Then, by using the key 1, for example, the user 1 can generate keys 11, 12, and 13 for users 11, 12, and 13, respectively, who are lower (second) level users of the user 1. The keys 11, 12, and 13 possessed by the users 11, 12, and 13 have more limited capabilities than the key 1 possessed by the user 1. The limited capabilities mean that ciphertexts that can be decrypted by that secret key are limited. That is, a lower level secret key can only decrypt some of ciphertexts that can be decrypted by a higher level secret key. This means that the keys 11, 12, and 13 possessed by the users 11, 12, and 13 can only decrypt some of ciphertexts that can be decrypted by the key 1 possessed by the user 1. Normally, the keys 11, 12, and 13 can decrypt respectively different ciphertexts. On the other hand, a ciphertext that can be decrypted by the keys 11, 12, or 13 can be decrypted by the key 1.

As shown in FIG. 1, each secret key is provided for a specific level. This is described as "hierarchical". That is, as shown in FIG. 1, hierarchical generation of lower level keys is called "hierarchical delegation".

Figure 2:
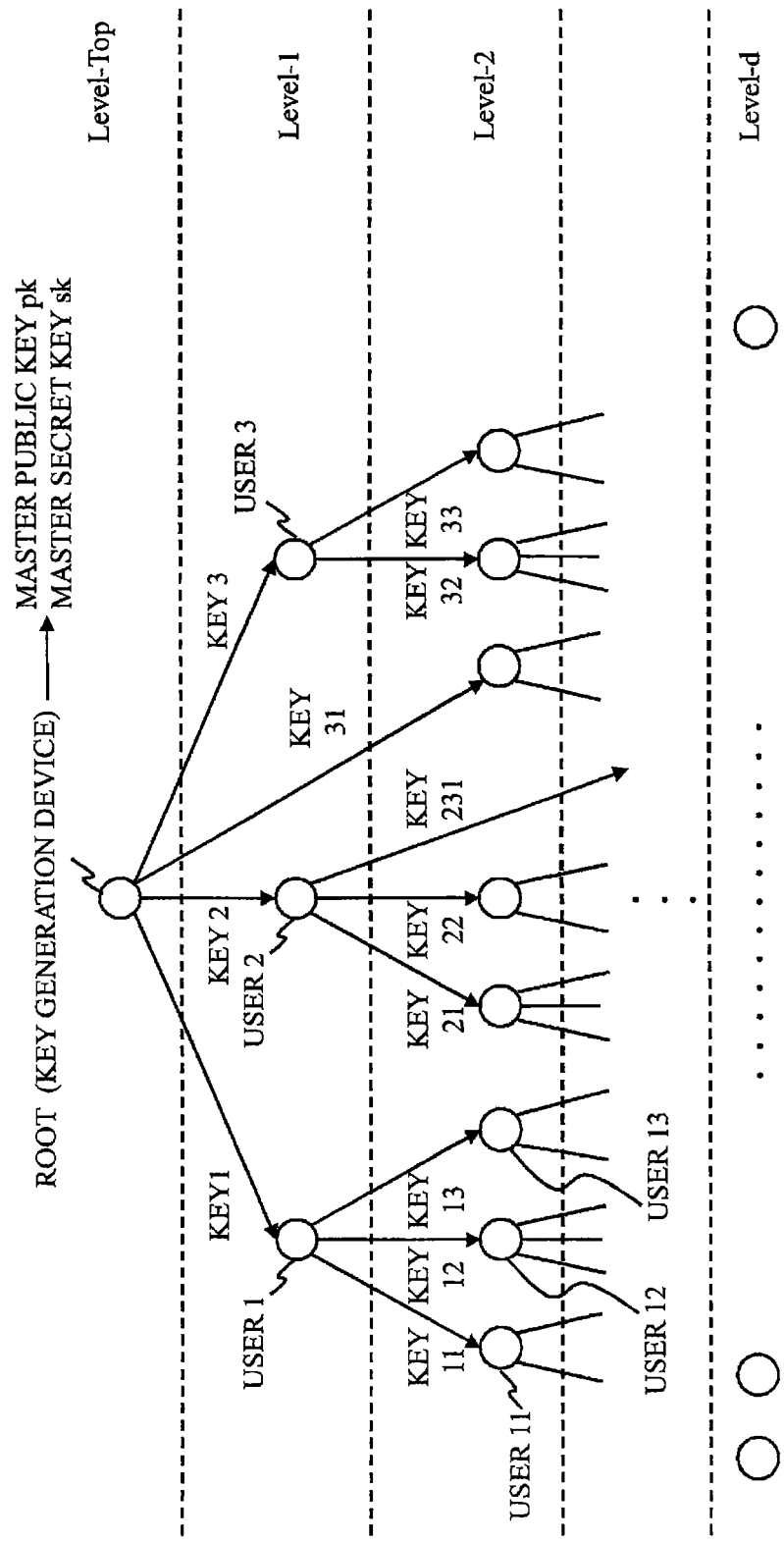
FIG. 2 is a diagram for explaining delegation skipping over a level.

In FIG. 1, it has been described that the root generates the secret keys for the first level users, the first level users generate the secret keys for the second level users, and the second level users generate the secret keys for the third level users. However, as shown in FIG. 2, the root can generate not only the secret keys for the first level users, but also the secret keys for the second or lower level users. Likewise, the first level users can generate not only the secret keys for the second level users, but also the secret keys for the third or lower level users. That is, the root or each user can generate the secret keys for levels lower than the level of its own secret key.

<1-2. PE Scheme for Inner-Product Predicates>

Next, the "PE scheme for inner-product predicates" will be described.

The PE scheme is a cryptographic scheme in which a ciphertext can be decrypted if a result of inputting attribute information x to predicate information $f_v$ is 1 (true) ($f_v(x)=1$). Normally, the attribute information x is embedded in a ciphertext, and the predicate information $f_v$ is embedded in a secret key. That is, in the PE scheme, a ciphertext c encrypted based on the attribute information x is decrypted by a secret key $SK_f$ generated based on the predicate information $f_v$. The PE scheme may be described as a cryptographic scheme in which, for example, the predicate information $f_v$ is a conditional expression and the attribute information x is information to be input to the conditional expression, and a ciphertext can be decrypted if the input information (attribute information x) satisfies the conditional expression (predicate information $f_v$) ($f_v(x)=1$).

The PE scheme is discussed in detail in Non-Patent Literature 16.

The PE scheme for inner-product predicates is a type of PE scheme in which $f_v(x)=1$ if the inner-product of attribute information x and predicate information $f_v$ is a predetermined value. That is, a ciphertext c encrypted by the attribute information x can be decrypted by a secret key $SK_f$ generated based on the predicate information $f_v$ if and only if the inner-product of the attribute information x and the predicate information $f_v$ is a predetermined value. In the following description, it is assumed that $f_v(x)=1$ if the inner-product of the attribute information x and the predicate information is 0.

<1-3. HPE Scheme for Inner-Product Predicates>

The HPE (HPKEM) scheme for inner-product predicates is a type of "PE scheme for inner-product predicates" with the above-described notion of "hierarchical delegation".

In the HPE scheme for inner-product predicates, attribute information and predicate information have hierarchical structures, in order to add a hierarchical delegation system to the PE scheme for inner-product predicates.

Figure 3:
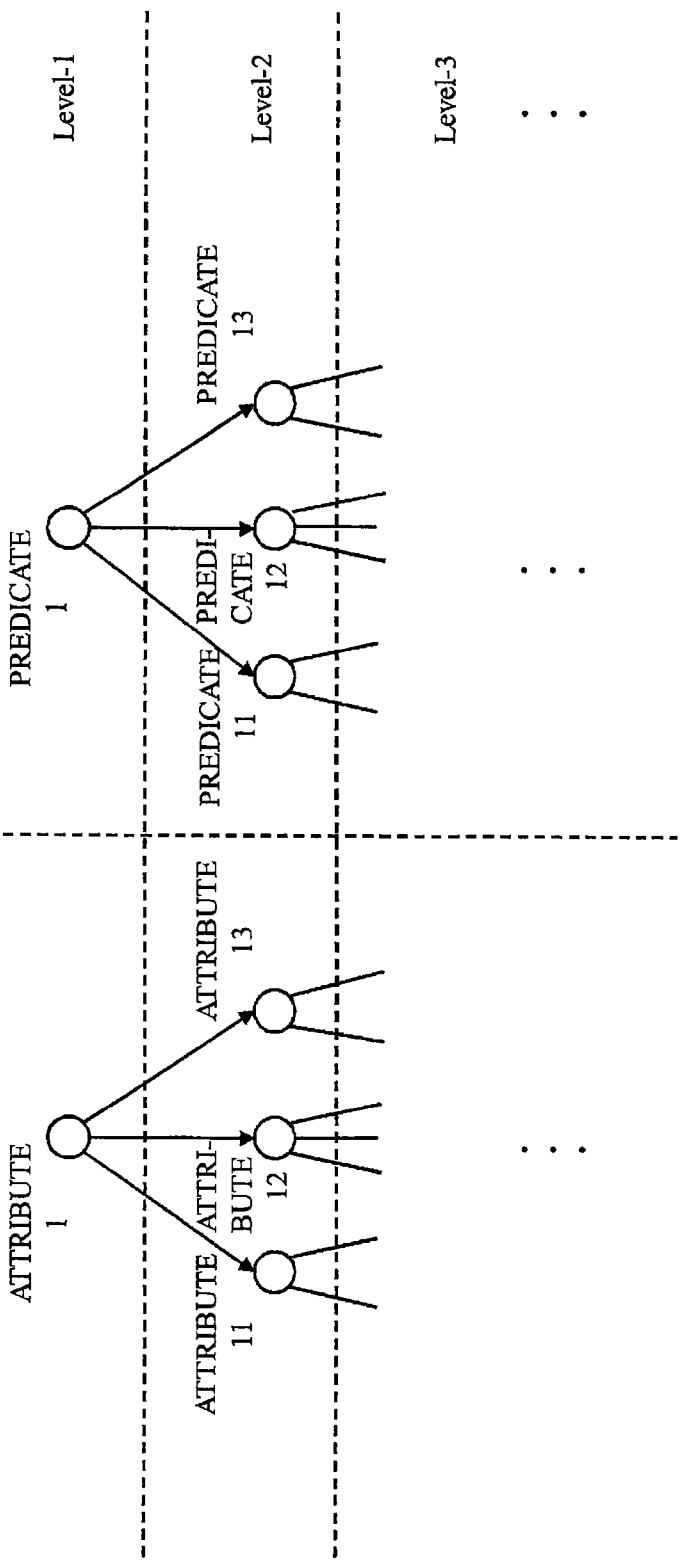
FIG. 3 is a diagram showing hierarchical structures of attribute information and predicate information.

FIG. 3 is a diagram showing hierarchical structures of attribute information and predicate information.

In FIG. 3, attribute information and predicate information with the same reference numerals correspond to each other (i.e., their inner-product is 0). That is, the inner-product of an attribute 1 and a predicate 1 is 0, the inner-product of an attribute 11 and a predicate 11 is 0, the inner-product of an attribute 12 and a predicate 12 is 0, and the inner-product of an attribute 13 and a predicate 13 is 0. This means that a ciphertext c1 encrypted by the attribute 1 can be decrypted by a secret key k1 generated based on the predicate 1. A ciphertext c11 encrypted by the attribute 11 can be decrypted by a secret key k11 generated based on the predicate 11. The same can be said of the attribute 12 and the predicate 12 as well as the attribute 13 and the predicate 13.

As described above, the HPE scheme for inner-product predicates has the hierarchical delegation system. Thus, the secret key k11 can be generated based on the predicate 11 and the secret key k1 generated based on the predicate 1. That is, a user having the higher level secret key k1 can generate its lower level secret key k11 from the secret key k1 and the lower level predicate 11. Likewise, a secret key k12 can be generated from the secret key k1 and the predicate 12, and a secret key k13 can be generated from the secret key k1 and the predicate 13.

A ciphertext encrypted by a key (public key) corresponding to a lower level secret key can be decrypted by a higher level secret key. On the other hand, a ciphertext encrypted by a key (public key) corresponding to a higher level secret key cannot be decrypted by a lower level secret key. That is, the ciphertexts c11, c12, and c13 encrypted by the attributes 11, 12, and 13, respectively, can be decrypted by the secret key k1 generated based on the predicate 1. On the other hand, the ciphertext c1 encrypted by the attribute 1 cannot be decrypted by the secret keys k11, k12, and k13 generated based on the predicates 11, 12, and 13, respectively. That is, the inner-product of the attribute 11, 12, or 13 and the predicate 1 is 0. On the other hand, the inner-product of the attribute 1 and the predicate 11, 12, or 13 is not 0.

<1-4. Application Example of the HPE Scheme for Inner-Product Predicates>

Figure 4:
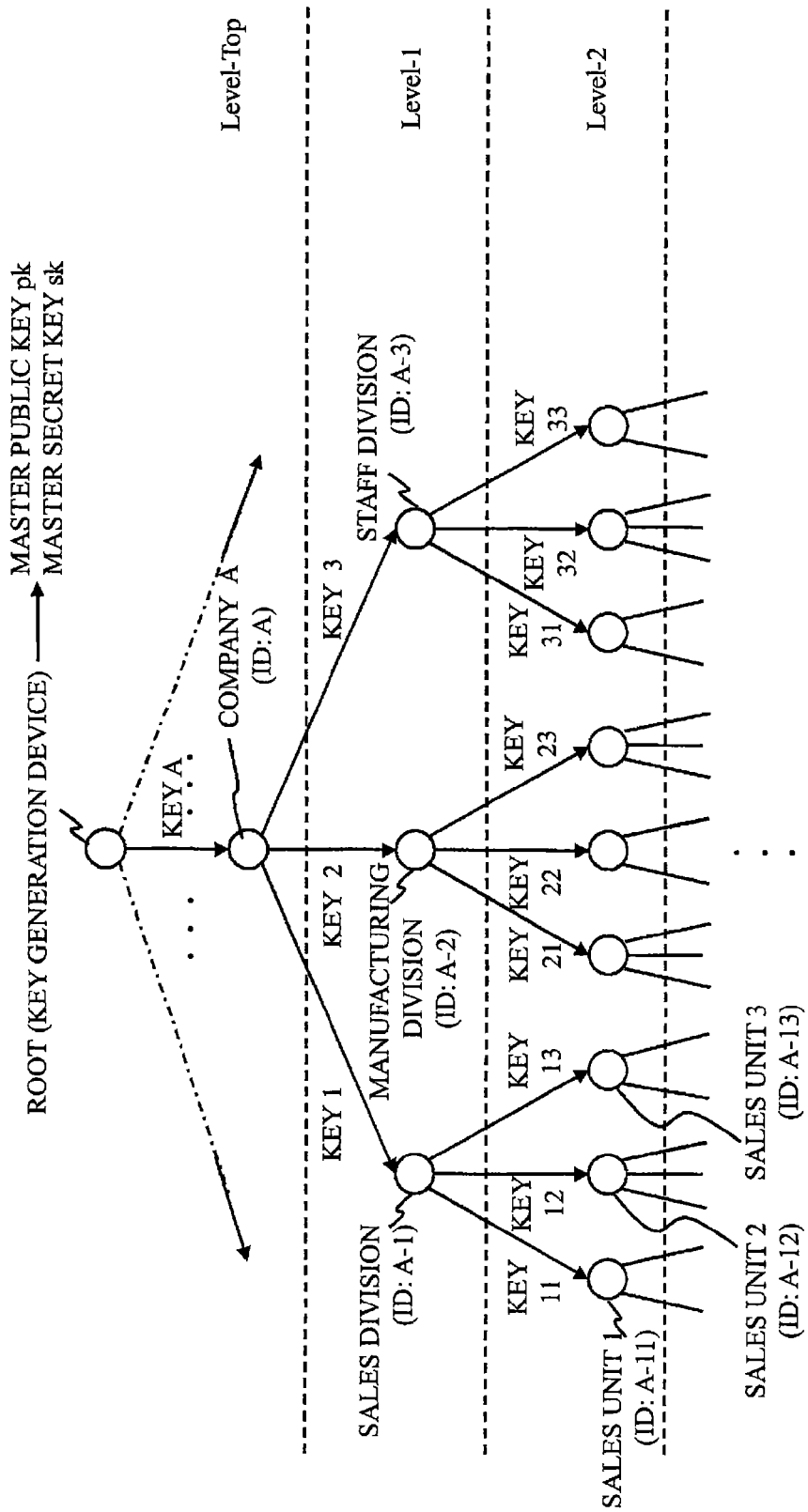
FIG. 4 is a diagram showing an example of a hierarchical identity-based encryption (HIBE) scheme which is an application example of a hierarchical predicate encryption (HPE) scheme for inner-product predicates.

FIG. 4 is a diagram showing an example of a hierarchical identity-based encryption (HIBE) scheme, which is an application example of the HPE scheme for inner-product predicates to be described later. The HIBE scheme is a cryptographic process in which the notion of hierarchical is applied to an identity-based encryption (IBE) scheme. The IBE scheme is a type of PE scheme, namely, a matching PE scheme, which allows a ciphertext to be decrypted if an ID included in the ciphertext matches an ID included in a secret key.

In the example shown in FIG. 4, based on a master secret key sk and an ID "A" of Company A, a root (key generation device) generates a secret key (key A) corresponding to the ID "A". For example, based on the key A and the ID of each division, a security administrator of Company A generates a secret key corresponding to that ID. For example, the security administrator generates a secret key (key 1) corresponding to an ID "A-1" of a sales division. Then, based on the secret key of each division and the ID of each unit belonging to that division, for example, an administrator of each division generates a secret key corresponding to that ID. For example, an administrator of the sales division generates a secret key (key 11) corresponding to an ID "A-11" of a sales unit 1.

In this case, a ciphertext encrypted by the ID "A-11" of the sales unit 1 can be decrypted by the key 11 which is the secret key corresponding to the ID "A-11" of the sales unit 1. However, a ciphertext encrypted by the ID of a sales unit 2 or a sales unit 3 cannot be decrypted by the key 11. Also, a ciphertext encrypted by the ID of the sales division cannot be decrypted by the key 11.

A ciphertext encrypted by the ID "A-1" of the sales division can be decrypted by the key 1 which is the secret key corresponding to the ID "A-1" of the sales division. Also, a ciphertext encrypted by the ID of a unit belonging to the sales division can be decrypted by the key 1. That is, a ciphertext encrypted by the ID of the sales unit 1, 2, or 3 can be decrypted by the key 1. However, a ciphertext encrypted by the ID of a manufacturing division (ID: A-2) or a staff division (ID: A-3) cannot be decrypted by the key 1. Also, a ciphertext encrypted by the ID of Company A cannot be decrypted by the key 1.

A ciphertext encrypted by the ID "A" of Company A can be decrypted by the key A which is the secret key corresponding to the ID "A" of Company A. Also, a ciphertext encrypted by the ID of each division belonging to Company A or the ID of a unit belonging to each division can be decrypted by the key A.

The HPE scheme for inner-product predicates can be adapted to various applications other than the IBE scheme. In particular, the cryptographic processes to be described later are not limited to a class of equality tests, so that they can be applied to a vast number of applications. For example, the cryptographic processes can also be adapted for other types of PE scheme for inner-product predicates such as a searchable encryption scheme, making it possible to implement applications that are not possible with a prior art PE scheme with the delegation system, such as limiting a searchable range at each level by using a conditional expression such as AND or OR.

That is, the HPKEM and HPE schemes to be described in the subsequent embodiments can be applied to a wide variety of applications such as the IBE and searchable encryption schemes.

<2. HPE Scheme for Inner-Product Predicates in Vector Spaces>

The HPKEM and HPE schemes are implemented in high-dimensional vector spaces called dual pairing vector spaces (DPVS) to be described later. Thus, the HPE scheme for inner-product predicates in vector spaces will be described.

<2-1. Basis and Basis Vector>

First, a "basis" and a "basis vector" to be used for explaining a vector space will be briefly explained.

Figure 5:
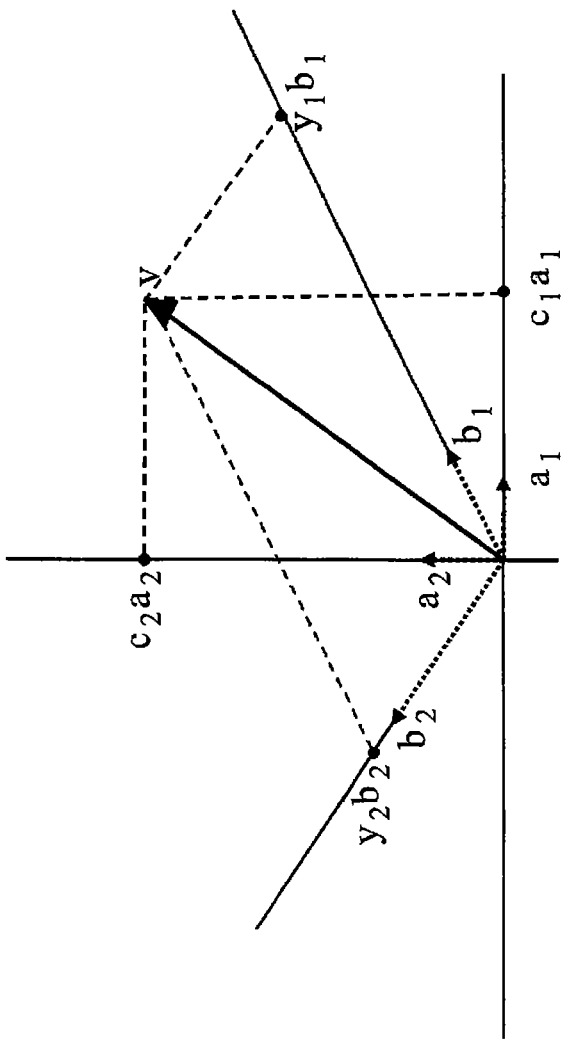
FIG. 5 is a diagram for explaining a basis and a basis vector.

FIG. 5 is a diagram for explaining the basis and the basis vector.

FIG. 5 shows a vector v of a 2-dimensional vector space. The vector v is $c_1 a_1 + c_2 a_2$. Further, the vector v is $y_1 b_1 + y_2 b_2$. Here, $a_1$ and $a_2$ are called basis vectors in a basis A, and are represented as basis A:=$(a_1, a_2)$. $b_1$ and $b_2$ are called basis vectors in a basis B, and are represented as basis B:=$(b_1, b_2)$. $c_1$, $c_2$, $y_1$, and $y_2$ are coefficients of respective basis vectors. FIG. 5 shows a 2-dimensional vector space, so that there are two basis vectors in each basis. In an N-dimensional vector space, there are an N number of basis vectors in each basis.

<2-2. PE Scheme for Inner-Product Predicates in Vector Spaces>

The PE scheme for inner-product predicates in vector spaces will now be described.

As described above, the PE scheme for inner-product predicates is a type of PE scheme in which $f_v(x)=1$ if the inner-product of the attribute information x and the predicate information $f_v$ is a predetermined value (0 in this case). When the attribute information x and the predicate information $f_v$ are vectors, namely, an attribute vector x and a predicate vector v, their inner-product predicate is defined as shown in Formula 109.

If $\vec{x} \cdot \vec{v} = \Sigma_{i=1}^n x_i \cdot v_i = 0$ then $f_{\vec{v}}(\vec{x})=1$, and if $\vec{x} \cdot \vec{v} = \Sigma_{i=1}^n x_i \cdot v_i \neq 0$, then $f_{\vec{v}}(\vec{x})=0$, [Formula 109]

where $\vec{x}=(x_1, \ldots, x_n)$, $\vec{v}=(v_1, \ldots, v_n)$.

That is, it is a type of PE scheme in which a result of inputting the attribute information x to the predicate information $f_v$ is 1 (true) if the inner-product of the attribute vector x and the predicate vector v (i.e., the sum of element-wise inner-products) is 0, and a result of inputting the attribute information x to the predicate information $f_v$ is 0 (false) if the inner-product of the attribute vector x and the predicate vector v is not 0.

<2-3. Method for Implementing a Hierarchical Structure in a Vector Space>

A method for implementing a hierarchical structure in a vector space will now be described.

Figure 6:
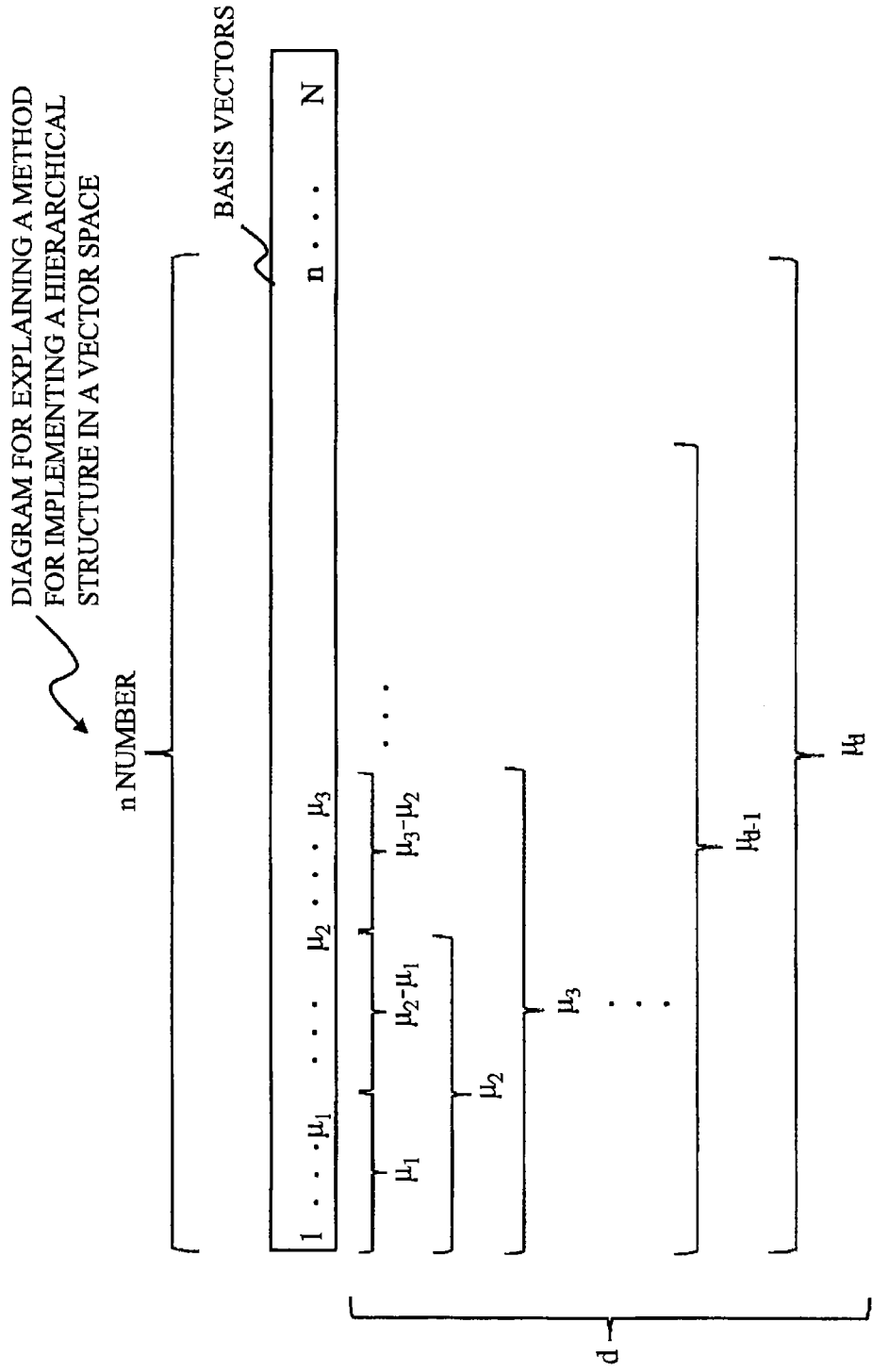
FIG. 6 is a diagram for explaining an example of a method for implementing a hierarchical structure in a vector space.

FIG. 6 is a diagram for explaining an example of the method for implementing a hierarchical structure in a vector space.

The vector space here is assumed to be a high-dimensional (N-dimensional) vector space. That is, there exist an N number of basis vectors $c_i$ (i=1, ..., N) in a predetermined basis C of the vector space.

An n number of basis vectors (basis vectors $c_i$ (i=1, ..., n)) out of the N number of basis vectors are used to represent the hierarchical structure. The basis vectors $c_i$ (i=1, ..., n) are divided into a d number of groups, namely, basis vectors $c_i$ (i=1, ..., $\mu_1$), basis vectors $c_i$ (i=$\mu_1$+1, ..., $\mu_2$), ..., and basis vectors $c_i$ (i=$\mu_{d-1}$+1, ..., n), where d denotes a depth of hierarchy.

Then, a $\mu_1$ number of basis vectors $c_1$ (i=1, ..., $\mu_1$) are assigned to represent attribute information and predicate information of the first level. A ($\mu_2 - \mu_1$) number of basis vectors $c_i$ (i=$\mu_1$+1, ..., $\mu_2$) are assigned to represent attribute information and predicate information of the second level. Likewise, a ($\mu_d - \mu_{d-1}$) number of basis vectors $c_i$ (i=$\mu_{d-1}$+1, ..., $\mu_d$(=n)) are assigned to represent attribute information and predicate information of the d-th level.

To generate a ciphertext by L-th level attribute information, not only L-th level but first to L-th level attribute information is used to generate a ciphertext. Likewise, to generate a secret key by L-th level predicate information, not only L-th level but first to L-th level predicate information is used to generate a secret key. That is, to generate a ciphertext by the L-th level attribute information, or to generate a secret key by the L-th level predicate information, a $\mu_L$ number of basis vectors $c_i$ (i=1, ..., $\mu_L$) assigned to the first to L-th levels are used. For example, to generate a ciphertext by third level attribute information, a $\mu_L$ number of basis vectors $c_i$ (i=1, ..., $\mu_L$) assigned to the first to third levels are used to generate a ciphertext, such that first to third level attribute information is reflected. Likewise, to generate a secret key by third level predicate information, the $\mu_3$ number of basis vectors $c_i$ (i=1, ..., $\mu_3$) assigned to the first to third levels are used to generate a secret key, such that first to third level predicate information is reflected. That is, attribute information or predicate information to be used at a lower level includes attribute information or predicate information to be used at a higher level. In this way, attribute information and predicate information each have a hierarchical structure. Then, by using the hierarchical structures of attribute information and predicate information, a delegation system is incorporated in the PE scheme for inner-product predicates.

In the following description, a format of hierarchy $\mu$ is used to denote a hierarchical structure of a vector space. The format of hierarchy $\mu$ is shown in Formula 110.

$$\vec{\mu} := (n, d; \mu_1, \ldots, \mu_d)$$ [Formula 110]

where $\mu_0 = 0 < \mu_1 < \mu_2 < \ldots < \mu_d = n$.

That is, the format of hierarchy $\mu$ has information n which denotes the number of basis vectors (number of dimensions) assigned to represent the hierarchical structure, information d which denotes the depth of hierarchy, and information $\mu_1, \ldots, \mu_d$ which denote basis vectors assigned to each level.

The HPE scheme for inner-product predicates in vector spaces will now be described.

Let an attribute space $\Sigma_L$ (L=1, . . . , d) be a space assigned to represent L-th level attribute information, where each $\Sigma_L$ is as shown in Formula 111.

$$\Sigma_L := \mathbb{F}_q^{\mu_L - \mu_{L-1}} \setminus \{\vec{0}\} \qquad \text{[Formula 111]}$$

Let a set of hierarchical attributes be $\Sigma$ shown in Formula 112, where the union is a disjoint union.

$$\Sigma := \cup_{L=1}^{d}(\Sigma_1 \times \ldots \times \Sigma_L) \qquad \text{[Formula 112]}$$

Then, hierarchical predicates shown in Formula 114 on hierarchical attributes shown in Formula 113 are defined as shown in Formula 115.

$$(\vec{x}_1, \ldots, \vec{x}_h) \in \Sigma \qquad \text{[Formula 113]}$$

$$f_{(\vec{v}_1, \ldots, \vec{v}_L)} \qquad \text{[Formula 114]}$$

where $$\vec{v}_i \in \mathbb{F}_q^{\mu_i - \mu_{i-1}} \setminus \{\vec{0}\}.$$

If and only if $L \leq h$ and $$\vec{x}_i \cdot \vec{v}_i = 0 \text{ for all } 1 \leq i \leq L, \text{ then}$$

$$f_{(\vec{v}_1, \ldots, \vec{v}_L)}(\vec{x}_1, \ldots, \vec{x}_h) = 1. \qquad \text{[Formula 115]}$$

Let a space of hierarchical predicates be F shown in Formula 116.

$$\mathcal{F} := \{f_{(\vec{v}_1, \ldots, \vec{v}_L)} | \vec{v}_i \in \mathbb{F}_q^{\mu_i - \mu_{i-1}} \setminus \{\vec{0}\}\} \qquad \text{[Formula 116]}$$

Let h in Formula 117 and L in Formula 118 each be called a level.

$$(\vec{x}_1, \ldots, \vec{x}_h) \qquad \text{[Formula 117]}$$

$$(\vec{v}_1, \ldots, \vec{v}_L) \qquad \text{[Formula 118]}$$

<2-4. Implementation Example of the Hierarchical Structure>

The hierarchical structure will be explained by using a simple example, where 6-dimensional space having three levels, each level consisting of 2-dimensional space, is employed. That is, $\mu := (n, d; \mu_1, \ldots, \mu_d) = (6, 3; 2, 4, 6)$.

A user who has a first level secret key $sk_1$ generated based on a first level predicate vector $v_1 = (v_1, v_2)$ can generate a second level secret key $sk_2$ based on the first level secret key $sk_1$ and a second level predicate vector $v_2 := (v_3, v_4)$. That is, the second level secret key $sk_2$ is generated based on the predicate vectors $(v_1, v_2)$. Likewise, a user who has the second level secret key $sk_2$ can generate a third level secret key $sk_3$ based on the second level secret key $sk_2$ and a third level predicate vector $v_3 := (v_5, v_6)$. That is, the third level secret key $sk_3$ is generated based on the predicate vectors $(v_1, v_2, v_3)$.

The first level secret key $sk_1$ generated based on the first level predicate vector $v_1$ is a secret key generated by $(v_1, (0, 0), (0, 0))$. Thus, the first level secret key $sk_1$ can decrypt a ciphertext encrypted by an attribute vector $(x_1, (*, *), (*, *)) := ((x_1, X_2), (*, *), (*, *))$ if $v_1 \cdot x_1 = 0$. This is because $(*, *) \cdot (0, 0) = 0$. Here, "*" denotes an arbitrary value.

Likewise, the second level secret key $sk_2$ generated based on the second level predicate vectors $(v_1, v_2)$ is a secret key generated by $(v_1, v_2, (0, 0))$. Thus, the second level secret key $sk_2$ can decrypt a ciphertext encrypted by attribute vectors $(x_1, x_2, (*, *)) := ((x_1, x_2), (x_3, x_4), (*, *))$ if $v_1 \cdot x_1 = 0$ and $v_2 \cdot v_2 = 0$.

However, the second level secret key $sk_2$ cannot decrypt a ciphertext encrypted by the first level attribute vector $x_1 := (x_1, x_2)$ (i.e., $(x_1, (*, *), (*, *))$). This is because if not $v_2 = (0, 0)$, then $(*, *) \cdot v_2 \neq 0$ and $v_2 \cdot x_2 \neq 0$. Therefore, it can be stated that the second level secret key $sk_2$ has more limited capabilities than the parent secret key $sk_1$.

<3. Constructions of the HPE and HPKEM Schemes>
<3-1. HPE Scheme>

A construction of the HPE scheme will be briefly described.

The HPE scheme includes five probabilistic polynomial-time algorithms: Setup, GenKey, Enc, Dec, and Delegate$_L$ (L=1, . . . , d-1).

(Setup)

The Setup algorithm takes as input a security parameter $1^\lambda$ and a format of hierarchy $\mu$, and outputs a master public key pk and a master secret key sk. The master secret key sk is a top level key.

(GenKey)

The GenKey algorithm takes as input the master public key pk, the master secret key sk, and predicate vectors shown in Formula 119, and outputs an L-th level secret key shown in Formula 120.

$$(\vec{v}_1, \ldots, \vec{v}_L) \qquad \text{[Formula 119]}$$

$$sk_{(\vec{v}_1, \ldots, \vec{v}_L)} \qquad \text{[Formula 120]}$$

(Enc)

The Enc algorithm takes as input the master public key pk, attribute vectors shown in Formula 121, and a message m, and outputs a ciphertext c. That is, the Enc algorithm outputs the ciphertext c containing the message m and encrypted by the attribute vectors shown in Formula 121.

$$(\vec{x}_1, \ldots, \vec{x}_h) \qquad \text{[Formula 121]}$$

where
$1 \leq h \leq d$.

(Dec)

The Dec algorithm takes as input the master public key pk, the L-th level secret key shown in Formula 122, and the ciphertext c, and outputs either the message m or a distinguished symbol $\perp$. The distinguished symbol $\perp$ is information indicating decryption failure. That is, the Dec algorithm decrypts the ciphertext c by the L-th level secret key, and extracts the message m. In case of decryption failure, the Dec algorithm outputs the distinguished symbol $\perp$.

$$sk_{(\vec{v}_1, \ldots, \vec{v}_L)} \qquad \text{[Formula 122]}$$

where
$1 \leq L \leq d$.

(Delegate$_L$)

Delegate$_L$ takes as input the master public key pk, the L-th level secret key shown in Formula 123, and an (L+1)-th level predicate vector shown in Formula 124, and outputs an (L+1)-th level secret key shown in Formula 125. That is, the Delegate$_L$ algorithm outputs a lower level secret key.

$$sk_{(\vec{v}_1, \ldots, \vec{v}_L)} \qquad \text{[Formula 123]}$$

$$\vec{v}_{L+1} \qquad \text{[Formula 124]}$$

$$sk_{(\vec{v}_1, \ldots, \vec{v}_{L+1})} \qquad \text{[Formula 125]}$$

<3-2. HPKEM Scheme>

A construction of the HPKEM scheme will be briefly explained.

As with the HPE scheme, the HPKEM scheme includes five probabilistic polynomial-time algorithms: Setup, GenKey, Enc, Dec, and Delegate$_L$ (L=1, ..., d−1).

(Setup)

The Setup algorithm takes as input a security parameter $1^\lambda$ and a format of hierarchy μ, and outputs a master public key pk and a master secret key sk. The master secret key sk is a top level key.

(GenKey)

The GenKey algorithm takes as input the master public key pk, the master secret key sk, and predicate vectors shown in Formula 126, and outputs an L-th level secret key shown in Formula 127.

$$(\vec{v}_1, \ldots, \vec{v}_L)$$ [Formula 126]

$$sk_{(\vec{v}_1, \ldots, \vec{v}_L)}$$ [Formula 127]

(Enc)

The Enc algorithm takes as input the master public key pk and attribute vectors shown in Formula 128, and outputs a ciphertext c and a session key K. That is, the Enc algorithm outputs the ciphertext c containing predetermined information (ρ) and encrypted by the attribute vectors shown in Formula 128 as well as the session key K generated from the predetermined information (ρ).

$$(\vec{x}_1, \ldots, \vec{x}_h)$$ [Formula 128]

where
1≤h≤d.

(Dec)

The Dec algorithm takes as input the master public key pk, the L-th level secret key shown in Formula 129, and the ciphertext c, and outputs either the session key K or a distinguished symbol ⊥. The distinguished symbol ⊥ is information indicating decryption failure. That is, the Dec algorithm decrypts the ciphertext c by the L-th level secret key, extracts the information on the predetermined information (ρ), and generates the session key K. In case of decryption failure, the Dec algorithm outputs the distinguished symbol ⊥.

$$sk_{(\vec{v}_1, \ldots, \vec{v}_L)}$$ [Formula 129]

(Delegate$_L$)

The Delegate$_L$ algorithm takes as input the master public key pk, the L-th level secret key shown in Formula 130, and an (L+1)-th level predicate vector shown in Formula 131, and outputs an (L+1)-th level secret key shown in Formula 132. That is, the Delegate$_L$ algorithm outputs a lower level secret key.

$$sk_{(\vec{v}_1, \ldots, \vec{v}_L)}$$ [Formula 130]

$$\vec{v}_{L+1}$$ [Formula 131]

$$sk_{(\vec{v}_1, \ldots, \vec{v}_{L+1})}$$ [Formula 132]

<3-3. Cryptographic Processing System 10>

The cryptographic processing system 10 will be described. The cryptographic processing system 10 executes the above-described algorithms of the HPE and HPKEM schemes.

Figure 7:
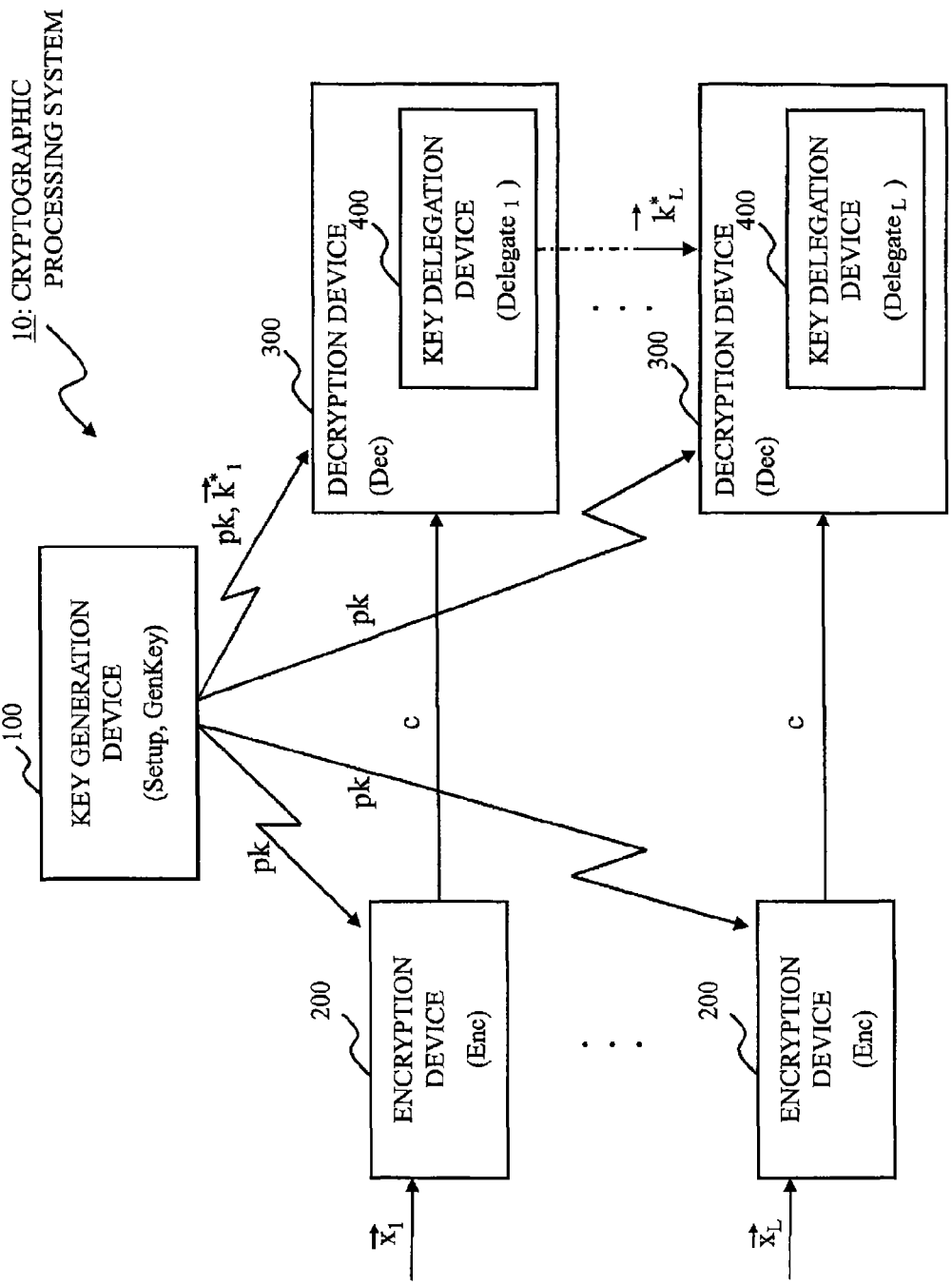
FIG. 7 is a configuration diagram of a cryptographic processing system 10.

FIG. 7 is a configuration diagram of the cryptographic processing system 10.

The cryptographic processing system 10 includes a key generation device 100, an encryption device 200, a decryption device 300, and a key delegation device 400. Here, the decryption device 300 includes the key delegation device 400. As described above, the cryptographic processing system 10 implements hierarchical cryptographic processes, so that it includes a plurality of the encryption devices 200, a plurality of the decryption devices 300, and a plurality of the key delegation devices 400.

The key generation device 100 executes the Setup and GenKey algorithms of the HPKEM and HPE schemes.

The encryption device 200 executes the Enc algorithm of the HPKEM and HPE schemes.

The decryption device 300 executes the Dec algorithm of the HPKEM and HPE schemes.

The key delegation device 400 executes the Delegate$_L$ algorithm of the HPKEM and HPE schemes.

Figure 8:
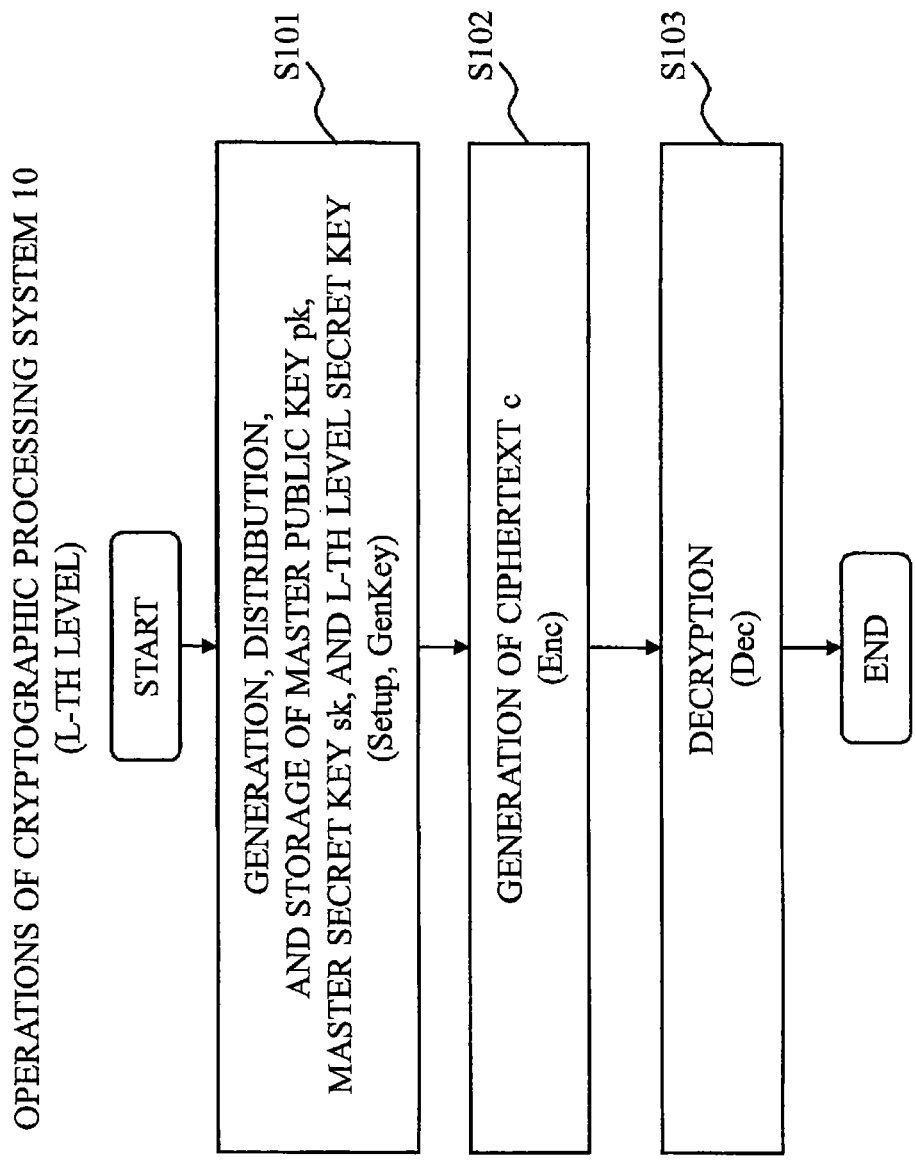
FIG. 8 is a flowchart showing operations of a key generation device 100, an L-th level encryption device 200, and an L-th level decryption device 300 of the cryptographic processing system 10.

FIG. 8 is a flowchart showing operations of the key generation device 100, an L-th level encryption device 200, and an L-th level decryption device 300 of the cryptographic processing system 10. That is, FIG. 8 is a flowchart showing operations from the generation of master keys (a master public key and a master secret key) and the generation of an L-th level secret key to the encryption and decryption at the L-th level.

(S101: Key Generation Step)

The key generation device 100 executes the Setup algorithm to generate a master public key pk and a master secret key sk. Based on the generated master public key pk, the generated master secret key sk, and a predicate vector v$_L$ (v$_L$=(v$_1$, ... v$_i$) (i=μ$_L$) corresponding to a predetermined decryption device 300 (the L-th level decryption device 300), the key generation device 100 executes the GenKey algorithm to generate an L-th level secret key. Then, the key generation device 100 publishes (distributes) the generated master public key pk, and secretly provides the L-th level secret key to the predetermined decryption device 300 The key generation device 100 secretly keeps the master secret key.

(S102: Encryption Step)

Based on the master public key pk distributed by the key generation device 100 in (S101) and an attribute vector x$_L$ (x$_L$=(x$_1$, ... , x$_i$) (i=μ$_L$)) of the decryption device 300, the encryption device 200 executes the Enc algorithm to generate a ciphertext c. In the case of the HPKEM scheme, the encryption device 200 also generates a session key K. Then, the encryption device 200 transmits the generated ciphertext c to the decryption device 300 through a network or the like. The attribute vector x$_L$ may be public, or may be obtained by the encryption device 200 from the key generation device 100 or the decryption device 300.

(S103: Decryption Step)

Based on the master public key pk and the L-th level secret key provided by the key generation device 100 in (S101), the decryption device 300 executes the Dec algorithm to decrypt the ciphertext c received from the encryption device 200. As a result of decrypting the ciphertext c, the decryption device 300 obtains the session key K in the case of the HPKEM scheme, or obtains a message m in the case of the HPE scheme. In case of decryption failure, the decryption device 300 outputs a distinguished symbol ⊥.

Figure 9:
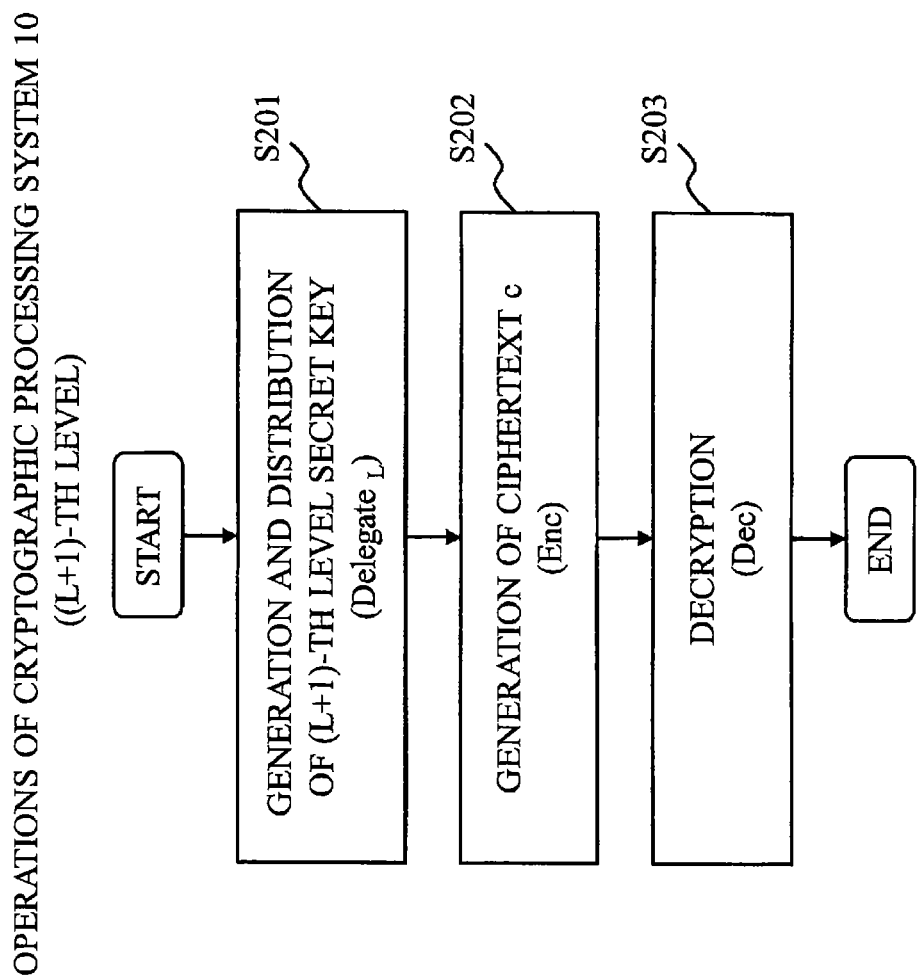
FIG. 9 is a flowchart showing operations of an L-th level key delegation device 400, an (L+1)-th level encryption device 200 and an (L+1)-th level decryption device 300 of the cryptographic processing system 10.

FIG. 9 shows a flowchart showing operations of an L-th level key delegation device 400, an (L+1)-th level encryption device 200, and an (L+1)-th level decryption device 300 of the cryptographic processing system 10. That is, FIG. 9 is a flowchart showing operations from the generation of an (L+1)-th level secret key to the encryption and decryption at the (L+1)-th level.

(S201: Key Delegation Step)

Based on the master public key pk distributed by the key generation device 100 in (S101), the L-th level secret key provided by the key generation device 100 or an (L−1)-th level key delegation device 400, and a predicate vector v$_{L+1}$ (v$_{L+1}$=(v$_i$, ... , v$_j$) (i=μ$_L$+1, j=μ$_{L+1}$)) corresponding to the (L+1)-th level decryption device 300, the L-th level delegation device 400 (the key delegation device 400 included in the L-th level decryption device 300) executes the Delegate$_L$ algorithm to generate an (L+1)-th level secret key. Then, the L-th level key delegation device 400 secretly provides the generated secret key to the (L+1)-th level decryption device 300.

(S202: Encryption Step)

Based on the master public key pk distributed by the key generation device 100 in (S101) and attribute vectors $x_1$ to $x_{L+1}$ ($x_i$ (i=1, ..., L+1) (=($x_1$, ..., $x_i$) (i=$\mu_{L+1}$))) of the first to (L+1)-th level decryption devices 300, the encryption device 200 executes the Enc algorithm to generate a ciphertext c. In the case of the HPKEM scheme, the encryption device 200 also generates a session key K. Then, the encryption device 200 transmits the generated ciphertext c to the decryption device 300 through a network or the like. The attribute vectors to $x_1$ to $x_{L+1}$ ($x_i$ (i=1, ..., L+1)) may be public, or may be obtained by the encryption device 200 from the key generation device 100 or the decryption device 300.

(S203: Decryption Step)

Based on the master public key pk distributed by the key generation device 100 in (S101) and the secret key provided by the L-th level key delegation device 400 in (S201), the decryption device 300 executes the Dec algorithm to decrypt the ciphertext c received from the encryption device 200. As a result of decrypting the ciphertext c, the decryption device 300 obtains the session key K in the case of the HPKEM scheme, or obtains a message m in the case of the HPE scheme.

<4. Concepts for Implementing the HPKEM and HPE Schemes>

Concepts required for implementing the above-described algorithms of the HPKEM and HPE schemes will now be described.

The method for implementing the cryptographic processes will be described by using an example in which dual pairing vector spaces (DPVS) to be described later are constructed by direct products of asymmetric pairing groups. However, DPVS are not limited to those realized by direct products of asymmetric pairing groups. That is, the cryptographic processes to be described below can be implemented in DPVS constructed by other methods. Three typical examples of DPVS are discussed in Non-Patent Literature 17.

<4-1. Bilinear Pairing Groups>

Bilinear pairing groups (q, $G_1$, $G_2$, $G_T$, $g_1$, $g_2$, $g_T$) will be described. The bilinear pairing groups (q, $G_1$, $G_2$, $G_T$, $g_1$, $g_2$, $g_T$) are a tuple of three cyclic groups $G_1$, $G_2$ and $G_T$ of order q. $g_1$ is a generator of $G_1$, and $g_2$ is a generator of $G_2$. The bilinear pairing groups (q, $G_1$, $G_2$, $G_T$, $g_1$, $g_2$, $g_T$) satisfy the following condition of nondegenerate bilinear pairing:

(Condition: Nondegenerate Bilinear Pairing)

There exists a polynomial-time computable nondegenerate bilinear pairing shown in Formula 133.

$$e: G_1 \times G_2 \to G_T$$

That is, for every $\xi \in G_1$, $\eta \in G_2$, $$e(s\xi, t\eta) = e(\xi, \eta)^{st} \text{ and}$$

$$g_T = e(g_1, g_2) \neq 1.$$ [Formula 133]

This is called symmetric bilinear pairing when $G_1 = G_2$ (=:G), and asymmetric bilinear pairing when $G_1 \neq G_2$. Symmetric bilinear pairing can be constructed using supersingular (hyper) elliptic curves. On the other hand, asymmetric bilinear pairing can be constructed using any (hyper) elliptic curves. Asymmetric bilinear pairing can be constructed using, for example, ordinary elliptic curves.

<4-2. Vector Spaces V and V*>

A cyclic group (1-dimensional space) is extended to a higher-dimensional (vector) space. That is, as shown in Formula 134, N-dimensional vector spaces V and V* are constructed by direct products of $G_1$ and $G_2$.

$$V := \underbrace{G_1 \times \cdots \times G_1}_{N},$$

$$V^* := \underbrace{G_2 \times \cdots \times G_2}_{N}$$ [Formula 134]

where an element x of the space V is represented by an N-dimensional vector as $$x := (x_1 g_1, \ldots, x_N g_1), \text{ and}$$

likewise, an element y of the space V* is represented by an N-dimensional vector as $$y := (y_1 g_2, \ldots, y_N g_2),$$

where $x_i$, $y_i \in \mathbb{F}_q$ for i=1, ..., N.

<4-3. Canonical Dual Bases A and A*>

Canonical bases A and A* of the N-dimensional vector spaces V and V* will be described.

Formula 135 shows the canonical bases A and A*.

$$A := (a_1, \ldots, a_N)$$

$$A^* := (a^*_1, \ldots, a^*_N)$$ [Formula 135]

where
$a_1 := (g_1, 0, \ldots, 0)$, $a_2 := (0, g_1, 0, \ldots, 0)$, ..., $a_N := (0, \ldots, 0, g_1)$
$a^*_1 := (g_2, 0, \ldots, 0)$, $a^*_2 := (0, g_2, 0, \ldots, 0)$, ..., $a^*_N := (0, \ldots, 0, g_2)$ The canonical bases A and A* satisfy the conditions shown in Formula 136.

$$e(a_i, a^*_j) = g_T^{\delta_{i,j}} \; i,j \in \{1, \ldots, N\}$$ [Formula 136]

where
$\delta$: Kronecker $\delta$ (i.e., $\delta_{i,j} = 1$ if i=j and $\delta_{i,j} = 0$ if i≠j),
$g_T := e(g_1, g_2) \neq 1$ That is, the canonical bases A and A* are dual orthonormal bases, and the spaces V and V* are dual vector spaces paired through the pairing operation e.

The statement that the canonical bases A and A* satisfy the conditions shown in Formula 136 will be further explained.

First, the equation $e(a_i, a^*_i) = g_T$ will be explained. To take an example, $e(a_1, a^*_1)$ will be computed. Based on $a_1 = (g_1, 0, \ldots, 0)$ and $a^*_1 = (g_2, 0, \ldots, 0)$ as described above, it follows that: $e(a_1, a^*_1) = e(g_1, g_2) \times e(0, 0) \times \ldots \times e(0, 0)$. Here, as described above, the equation $e(g_1, g_2) = g_T$ holds. Also, based on $e(0, 0) = e(0 \cdot g_1, 0 \cdot g_2) = e(g_1, g_2)^0$, it follows that: $e(0, 0) = 1$. Thus, the equation $e(a_1, a^*_1) = g_T$ holds. The same computations also hold for other $e(a_i, a^*_i)$, so that the equation $e(a_i, a^*_i) = g_T$ holds.

Next, the equation $e(a_i, a^*_j) = 1$ (i≠j) will be explained. To take an example, $e(a_1, a^*_2)$ will be computed. Based on $a_1 = (g_1, 0, \ldots, 0)$ and $a^*_2 = (0, g_2, 0, \ldots, 0)$ as described above, it follows that: $e(a_1, a^*_2) = e(g_1, 0) \times e(0, g_2) \times e(0, 0) \times \ldots \times e(0, 0)$. Based on $e(g_1, 0) = e(g_1, 0 \cdot g_2) = e(g_1, g_2)^0$, the equation $e(g_1, 0) = 1$ holds. Likewise, the equation $e(0, g_2) = 1$ holds. Also, as described above, the equation $e(0, 0) = 1$ holds. Thus, the equation $e(a_i, a^*_j) = 1$ holds. The same computations also hold for other $e(a_i, a^*_j)$, so that the equation $e(a_i, a^*_j) = 1$ holds.

Thus, the equations $e(a_i, a^*_i)=g_T$ and $e(a_i, a^*_j)=1$ ($i \neq j$) hold over the canonical bases A and A*.

<4-4. Pairing Operation>

A pairing operation e on the N-dimensional vector spaces V and V* is defined as shown in Formula 137.

$$e(x,y):=\Pi_{i=1}^{N} e(x_i g_1, y_i g_2) \qquad \text{[Formula 137]}$$

That is, the pairing operation $e(x, y)$ on a vector $x:=(x_1 g_1, x_2 g_1, \ldots, x_N g_1)$ of the N-dimensional vector space V and a vector $y:=(y_1 g_2, y_2 g_2, \ldots, y_N g_2)$ of the N-dimensional vector space V* is defined as the product of pairing operations on respective elements of the vectors x and y. Then, based on the above-described condition of nondegenerate bilinear pairing, the pairing operation $e(x, y)$ can be expressed as shown in Formula 138.

$$e(x, y) := \prod_{i=1}^{N} e(x_i g_1, y_i g_2) = e(g_1, g_2) \sum_{i=1}^{N} x_i y_i = g_T^{\vec{x} \cdot \vec{y}} \in \mathbb{G}_T \qquad \text{[Formula 138]}$$

<4-5. Base Change>

Figure 10:
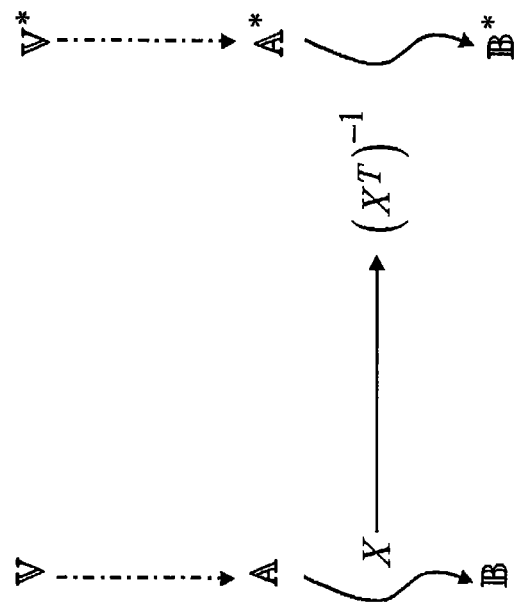
FIG. 10 is a diagram for explaining a base change method.

A base change method for changing the canonical bases A and A* to other bases B and B* will be described. FIG. 10 is a diagram for explaining the base change method.

The canonical basis A of the space V is changed to another basis $B:=(b_1, \ldots, b_N)$ of the space V. Using a uniformly chosen linear transformation X shown in Formula 139, the canonical basis A of the space V is changed to another basis B of the space V as shown in Formula 140.

$$X := (x_{i,j}) \xleftarrow{U} GL(N, \mathbb{F}_q) \qquad \text{[Formula 139]}$$

$$b_i = \sum_{j=1}^{N} x_{i,j} a_j \quad i = 1, \ldots, N \qquad \text{[Formula 140]}$$

where $\mathbb{B} := (b_1, \ldots, b_N)$.

Here, GL stands for general linear. That is, GL is a general linear group, a set of square matrices with nonzero determinants, and a group under multiplication.

By using X, the basis $B^*:=(b^*_1, \ldots, b^*_N)$ of the space V* can be efficiently computed from the canonical basis A* of the space V*. The basis B* of the space V* is computed by using X as shown in Formula 141.

$$b_i^* = \Sigma_{j=1}^{N} v_{i,j} a_j^* \quad i=1, \ldots, N \qquad \text{[Formula 141]}$$

where $(v_{i,j}) := (X^T)^{-1}$ $\mathbb{B}^* := (b_1^*, \ldots, b_N^*)$.

Here, Formula 142 holds.

$$e(b_i, b_j^*) = g_T^{\delta_{i,j}} \quad i, j \in \{1, \ldots, N\} \qquad \text{[Formula 142]}$$

where

δ: Kronecker δ (i.e., $\delta_{i,j}=1$ if $i=j$ and $\delta_{i,j}=0$ if $i \neq j$), $g_T := e(g_1, g_2) \neq 1$ That is, the bases B and B* are dual orthonormal bases of dual spaces V and V*. This means that even when the canonical bases A and A* are changed by using X, dual orthonormal bases are preserved.

<4-6. Distortion Maps>

A linear transformation, called a distortion map, for a generator x in the space V over the canonical basis A will be described.

A distortion map $\phi_{i,j}$ on the canonical basis A of the space V is a map shown in Formula 143.

If $\phi_{i,j}(a_j) = a_i$ and $k \neq j$, then $\phi_{i,j}(a_k) = 0$. [Formula 143]

Since Formula 144 holds, the distortion map $\phi_{i,j}$ can achieve the transformation shown in Formula 145.

$$\begin{aligned}\phi_{i,j}(x) &= \phi_{i,j}(x_1 a_1 + x_2 a_2 + \cdots + x_N a_N) \\ &= \phi_{i,j}(x_j a_j) \\ &= x_j \phi_{i,j}(a_j) \\ &= x_j a_i\end{aligned} \qquad \text{[Formula 144]}$$

For $x := (x_1 g_1, \ldots, x_j g_1, \ldots, x_N g_1)$, [Formula 145]

$$\phi_{i,j}(x) := (\overbrace{0, \ldots, 0}^{i-1}, x_j g_1, \overbrace{0, \ldots, 0}^{N-i}).$$

That is, an element, namely a basis vector j, in the canonical basis A of the vector x can be transformed into another element, namely a basis vector i, in the canonical basis A. At this time, elements other than the basis vector j that is transformed all become 0. That is, in the vector x, the basis vector j becomes the basis vector i and other elements become 0.

A distortion map $\phi^*_{i,j}$ on the canonical basis A* of the space V* can be represented in the same manner as the distortion map $\phi_{i,j}$ on the canonical basis A of the space V.

By using the distortion map $\phi_{i,j}$ ($\phi^*_{i,j}$), any linear transformation W, expressed as an N×N-matrix shown in Formula 146, for x∈V can be efficiently computed by Formula 147.

$$(\gamma_{i,j}) \in \mathbb{F}_q N \times N \qquad \text{[Formula 146]}$$

$$W(x) := \Sigma_{i=1,j=1}^{N,N} \gamma_{i,j} \phi_{i,j}(x) \qquad \text{[Formula 147]}$$

<5. Dual Pairing Vector Spaces (DPVS)>

Based on the concepts described in the above 4, dual pairing vector spaces (DPVS) will be described. The HPE and HPKEM schemes to be described later are implemented in DPVS.

DPVS (q, V, V*, $G_T$, A, A*) include a prime order q, two N-dimensional vector spaces V and V* over $F_q$, a cyclic group $G_T$ of order q, a canonical basis $A:=(a_1, \ldots, a_{N-1})$ of the space V, and a canonical basis $A^*:=(a^*_1, \ldots, a^*_{N-1})$ of the space V*. The DPVS (q, V, V*, $G_T$, A, A*) satisfy the following three conditions: (1) there exists a nondegenerate bilinear pairing, (2) the canonical bases A and A* are dual orthonormal bases, and (3) there exist distortion maps.

(1) Nondegenerate Bilinear Pairing (See the Above 4-1.)

There exists a polynomial-time computable nondegenerate bilinear pairing e.

That is, the first condition is that there exists a nondegenerate bilinear pairing e shown in Formula 148.

$$e: \mathbb{V} \times \mathbb{V}^* \to \mathbb{G}_T \qquad \text{[Formula 148]}$$

That is, if $e(sx, ty) = e(x, y)^{st}$ and $e(x, y) = 1$ for all $y \in \mathbb{V}$, then $x = 0$.

(2) Dual Orthonormal Bases (See the Above 4-2.)

The canonical bases A and A* of the spaces V and V* are dual orthonormal bases.

That is, the second condition is that the canonical bases A and A* of the spaces V and V* satisfy the condition shown in Formula 149.

$$e(a_i, a_j^*) = g_T^{\delta_{i,j}} \text{ for every } i \text{ and } j, \qquad \text{[Formula 149]}$$

where

δ: Kronecker δ (i.e., $\delta_{i,j}=1$ if $i=j$ and $\delta_{i,j}=0$ if $i \neq j$), $g_T \neq 1 \in \mathbb{G}_T$ (3) Distortion Maps (See the Above 4-6.)

There exist polynomial-time computable distortion maps $\phi_{i,j}$ and $\phi^*_{i,j}$.

That is, the third condition is that endomorphisms $\phi_{i,j}$ and $\phi^*_{i,j}$ of the spaces V and V* shown in Formula 150 are polynomial-time computable.

If $\phi_{i,j}(a_j)=a_i$ and $k \neq j$, then $\phi_{i,j}(a_k)=0$.

If $\phi_{i,j}^*(a_j^*)=a_i^*$ and $k \neq j$, then $\phi_{i,j}^*(a_k^*)=0$. [Formula 150]

By satisfying the second condition, it can also be stated that the spaces V and V* are dual spaces paired through the pairing operation e (see the above 4-2).

<6. Outline of a Method for Implementing the HPKEM and HPE Schemes>

Based on the concepts (see the above 4) and the DPVS (see the above 5) described above, a method will be briefly described by which the above-mentioned cryptographic processing system 10 (see the above 3) implements the HPE and HPKEM schemes.

First, an outline of the PE scheme for inner-product predicates to be implemented by the cryptographic processing system 10 will be described. For simplicity of description, the notion of hierarchical will be omitted, and an outline of the PE scheme for inner-product predicates with only one level will be described.

The cryptographic processing system 10 implements the PE scheme for inner-product predicates in the DPVS $(q, V, V^*, G_T, A, A^*)$, where the spaces V and V* are $(n+4)$-dimensional spaces.

The key generation device 100 generates orthonormal bases $B:=(b_1, \ldots, b_{n+4})$ and $B^*:=(b^*_1, \ldots, b^*_{n+4})$ from canonical bases A and A* by the base change method described in the above 4-5. The key generation device 100 generates a basis $B^{\wedge}:=(b_1, \ldots, b_{n+2})$ composed of basis vectors $b_i$ $(i=1, \ldots, n+2)$ of the basis B $(b_1, \ldots, b_{n+4})$. The basis $B^{\wedge}$ is used as a master public key pk, and the basis B* is used as a master secret key sk. Further, the key generation device 100 generates a secret key k* from a predicate vector $v(v=(v_1, \ldots, v_n) \in \mathbb{F}^n_q)$ as shown in Formula 151, and secretly transmits the secret key k* to the decryption device 300.

$$k^* := \sigma(v_1 b_1^* + \cdots + v_n b_n^*) + b_{n+1}^* + \eta b_{n+3}^* \quad \text{[Formula 151]}$$

where $$\sigma, \eta \xleftarrow{U} \mathbb{F}_q.$$

The encryption device 200 generates two ciphertexts $c_1$ and $c_2$ from an attribute vector $x(x=(x_1, \ldots, x_n) \in \mathbb{F}^n_q)$ and a message m. The ciphertexts $c_1$ and $c_2$ are generated as shown in Formula 152.

$$c_1 := \delta_1(x_1 b_1 + \cdots + x_n b_n) + \zeta b_{n+1} + \delta_2 b_{n+2}, \quad \text{[Formula 152]}$$

$$c_2 := g_T^\zeta m$$

where $$\delta_1, \delta_2, \zeta \xleftarrow{U} \mathbb{F}_q.$$

Based on the ciphertexts $c_1$ and $c_2$ and the secret key k*, the decryption device 300 computes Formula 153 to extract the message m.

$$m:=c_2/e(c_1,k^*) \quad \text{[Formula 153]}$$

If $v \cdot x=0$, the decryption device 300 can obtain the message m by computing Formula 153 as shown in Formula 154.

$$e(c_1, k^*) = \left(\prod_{i=1}^n e(\delta_1 x_1 b_i, \sigma v_i b_i^*) \cdot e(\zeta b_{n+1}, b_{n+1}^*) \cdot \right. \quad \text{[Formula 154]}$$

$$\left. e(\delta_2 b_{n+2}, 0) \cdot e(0, \eta b_{n+3}^*) \right)$$

$$= g_T^{\delta_1 \sigma(\sum_{i=1}^n x_i v_i) + \zeta + 0 + 0}$$

$$= g_T^\zeta$$

Next, an outline of the PE scheme for inner-product predicates with hierarchical delegation capability, that is the HPE scheme for inner-product predicates, will be described using a simple example. The example employs 10-dimensional spaces, each space having six dimensions (three levels, each having two dimensions) which are used for predicate vectors and attribute vectors and four other dimensions. That is, the spaces V and V* are 10-dimensional spaces. Hence, a master public key includes a base $B^{\wedge}:=(b_1, \ldots, b_6, d_7, b_8)$. A master secret key includes a basis $B^*:=(b^*_1, \ldots, b^*_{10})$.

In the following description, a subscript "dec" stands for "decryption" and indicates a key vector used for decrypting a ciphertext. A subscript "ran" stands for "randomization" and indicates a randomizing vector for randomizing the coefficient of a predetermined basis vector of a lower level key. A subscript "del" stands for "delegation" and indicates a key-generation vector for generating a lower level key vector.

Ciphertexts $c_1$ and $c_2$ are generated by attribute vectors $(x_1, x_2, x_3)=((x_1, x_2), (x_3, x_4), (x_5, x_6))$ and a message m, as shown in Formula 155.

$$c_1 := \quad \text{[Formula 155]}$$

$$\delta_1(x_1 b_1 + x_2 b_2) + \cdots + \delta_3(x_5 b_5 + x_6 b_6) + \zeta b_7 + \delta_4 b_8,$$

$$c_2 := g_T^\zeta m$$

where $$\delta_1, \ldots, \delta_4, \zeta \xleftarrow{U} \mathbb{F}_q.$$

If the attribute vector is of a higher level such as $x_1:=(x_1, x_2)$, the attribute vector is modified as shown in Formula 156.

$$\vec{x}^+ := ((x_1, x_2), (x_3^+, x_4^+), (x_5^+, x_6^+)) \quad \text{[Formula 156]}$$

where $$(x_3^+, x_4^+, x_5^+, x_6^+) \xleftarrow{U} \mathbb{F}_q^4.$$

That is, the ciphertext $c_1$ generated by the attribute vector $x_1$ is generated as the ciphertext $c_1$ generated by the attribute vector $x^+$ shown in Formula 156.

A first level secret key $k^*_1 := (k^*_{1,dec}, k^*_{1,ran,1}, k^*_{1,ran,2}, k^*_{1,del,3}, \ldots, k^*_{1,del,6})$ generated based on a first level predicate vector $v_1:=(v_1, v_2) \in \mathbb{F}^2_q$ consists of three types of elements: $k^*_{1,dec}$, $(k^*_{1,ran,1}, k^*_{1,ran,2})$, and $(k^*_{1,del,3}, \ldots, k^*_{1,del,6})$. $k^*_{1,dec}$ is a key vector used for decrypting a ciphertext. $(k^*_{1,ran,1}, k^*_{1,ran,2})$ are randomizing vectors for randomizing the coefficient of a predetermined basis vector of a lower level key vector. $(k^*_{1,del,3}, \ldots, k^*_{1,del,6})$ are key-generation vectors for generating a lower level key vector. $k^*_{1,dec}$, $(k^*_{1,ran,1}, k^*_{1,ran,2})$, and $(k^*_{1,del,3}, \ldots, k^*_{1,del,6})$ are generated as shown in Formula 157.

$$k^*_{1,dec} := \sigma_{1,0}(v_1 b^*_1 + v_2 b^*_2) + b^*_7 + \eta_0 b^*_9, \quad [\text{Formula 157}]$$

$$k^*_{1,ran,j} := \sigma_{1,j}(v_1 b^*_1 + v_2 b^*_2) + \eta_j b^*_9, \quad (j = 1, 2),$$

$$k^*_{1,del,j} := \sigma_{1,j}(v_1 b^*_1 + v_2 b^*_2) + \psi b^*_j +$$
$$\eta_j b^*_9 (j = 3, \ldots, 6)$$

where $$\sigma_{1,j}, \eta_j, \psi \xleftarrow{U} \mathbb{F}_q \quad (j = 0, \ldots, 6).$$

If the attribute vectors used in generating the ciphertext $c_1$ is $((x_1, x_2), (*, *), (*, *))$ such that $(x_1, x_2) \cdot (v_1, v_2) = 0$, then Formula 158 holds. Hence, $k^*_{1,0}$ can decrypt the ciphertexts $c_1$ and $c_2$ by computing Formula 159.

$$e(c_1, k_{1,dec}^*) = g_T^\zeta \quad [\text{Formula 158}]$$

$$c_2/e(c_1, k_{1,0}^*) \quad [\text{Formula 159}]$$

A second level secret key $k^*_2 := (k^*_{2,dec}, k^*_{2,ran,1}, k^*_{2,ran,2}, k^*_{2,ran,3}, k^*_{2,del,5}, k^*_{2,del,6})$ is generated by a second level predicate vector $v_2 := (v_3, v_4)$.

To generate $k^*_{2,dec}$, $\sigma_{2,0}(v_3 k^*_{1,del,3} + v_4 k^*_{1,del,4})$ is added to $k^*_{1,dec}$. To generate $k^*_{2,ran,j}$, $\sigma_{2,j}(v_3 k^*_{1,del,3} + v_4 k^*_{1,del,4})$ is added to 0 (j=1, 2, 3). To generate $k^*_{2,del,j}$, $\sigma_{2,j}(v_3 k^*_{1,del,3} + v_4 k^*_{1,del,4})$ is added to $\psi^+ k^*_{1,del,j}$ (j=5, 6). Here, $\sigma_{2,j}$ (j=0, 1, 2, 3, 5, 6) and $\psi^+$ are uniformly selected values.

Further, the coefficients of $(v_1 b^*_1 + v_2 b^*_2)$, $b^*_7$, and $b^*_8$ of the second level secret key are randomized (uniformly distributed). Hence, to generate $k^*_{2,dec}$, $(\alpha_{0,1} k^*_{1,ran,1} + \alpha_{0,2} k^*_{1,ran,2})$ is also added. To generate $k^*_{2,ran,j}$, $(\alpha_{j,1} k^*_{1,ran,1} + \alpha_{j,2} k^*_{1,ran,2})$ is added (j=1, 2, 3). To generate, $k^*_{2,del,j}$, $(\alpha_{j,1} k^*_{1,ran,1} + \alpha_{j,2} k^*_{1,ran,2})$ is added (j=5, 6). Here, $\alpha_{j,1}$ and $\alpha_{j,2}$ (j=0, 1, 2, 3, 5, 6) are uniformly selected values.

To summarize, the second level secret key $k^*_2 := (k^*_{2,dec}, k^*_{2,ran,1}, k^*_{2,ran,2}, k_{2,ran,3}, k^*_{2,del,5}, k^*_{2,del,6})$ is generated as shown in Formula 160.

$$k^*_{2,dec} := k^*_{1,dec} + (\alpha_{0,1} k^*_{1,ran,1} + \alpha_{0,2} k^*_{1,ran,2}) + \quad [\text{Formula 160}]$$
$$\sigma_{2,0}(v_3 k^*_{1,del,3} + v_4 k^*_{1,del,4}),$$

$$k^*_{2,ran,j} := (\alpha_{j,1} k^*_{1,ran,1} + \alpha_{j,2} k^*_{1,ran,2}) +$$
$$\sigma_{2,j}(v_3 k^*_{1,del,3} + v_4 k^*_{1,del,4})$$
$$(j = 1, 2, 3),$$

$$k^*_{2,del,j} := \psi^+ k^*_{1,del,j} +$$
$$(\alpha_{j,1} k^*_{1,ran,1} + \alpha_{j,2} k^*_{1,ran,2}) + \sigma_{2,j}(v_3 k^*_{1,del,3} + v_4 k^*_{1,del,4})$$
$$(j = 5, 6)$$

where $$\alpha_{j,1}, \alpha_{j,2}, \sigma_{2,j}, \psi^+ \xleftarrow{U} \mathbb{F}_q \quad (j = 0, 1, 2, 3, 5, 6).$$

$k^*_{2,dec}$ is a key vector used for decrypting a ciphertext. $(k^*_{2,ran,1}, k^*_{2,ran,2}, k^*_{2,ran,3})$ are randomizing vectors for randomizing the coefficient of a predetermined basis vector of a lower level key vector. $(k^*_{2,del,5}, k^*_{2,del,6})$ are used for generating a lower level key.

In general, in an L-th level secret key $k^*_L := (k^*_{L,dec}, k^*_{L,ran,j}, k^*_{L,del,j})$, $k^*_{L,dec}$ is a key vector used for decrypting a ciphertext. $k^*_{L,ran,j}$ is a randomizing vector for randomizing the coefficient of a predetermined basis vector of a lower level key vector. $k^*_{L,del,j}$ is a key-generation vector for generating a lower level key vector.

Second Embodiment

In this embodiment, based on the concepts described in the first embodiment, the cryptographic processing system 10 that implements the HPE scheme will be described.

Referring to FIGS. 11 to 16, functions and operations of the cryptographic processing system 10 according to the second embodiment will be described.

Figure 11:
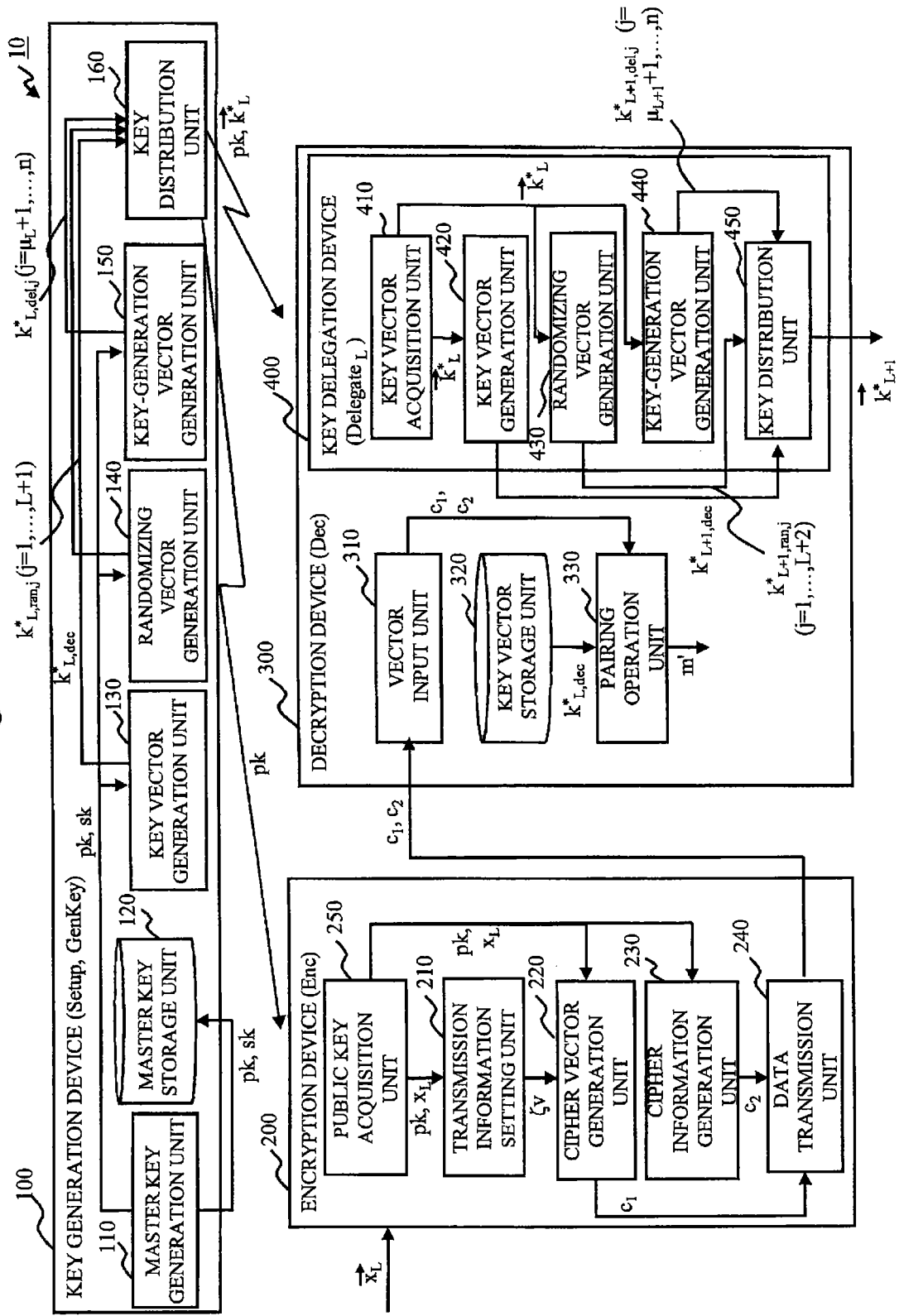
FIG. 11 is a functional block diagram showing functions of the cryptographic processing system 10 that implements an HPE scheme according to a second embodiment.

FIG. 11 is a functional block diagram showing the functions of the cryptographic processing system 10 that implements the HPE scheme. As described above, the cryptographic processing system 10 includes the key generation device 100, the encryption device 200, the decryption device 300, and the key delegation device 400. It is also assumed in this embodiment that the decryption device 300 includes the key delegation device 400.

Figure 12:
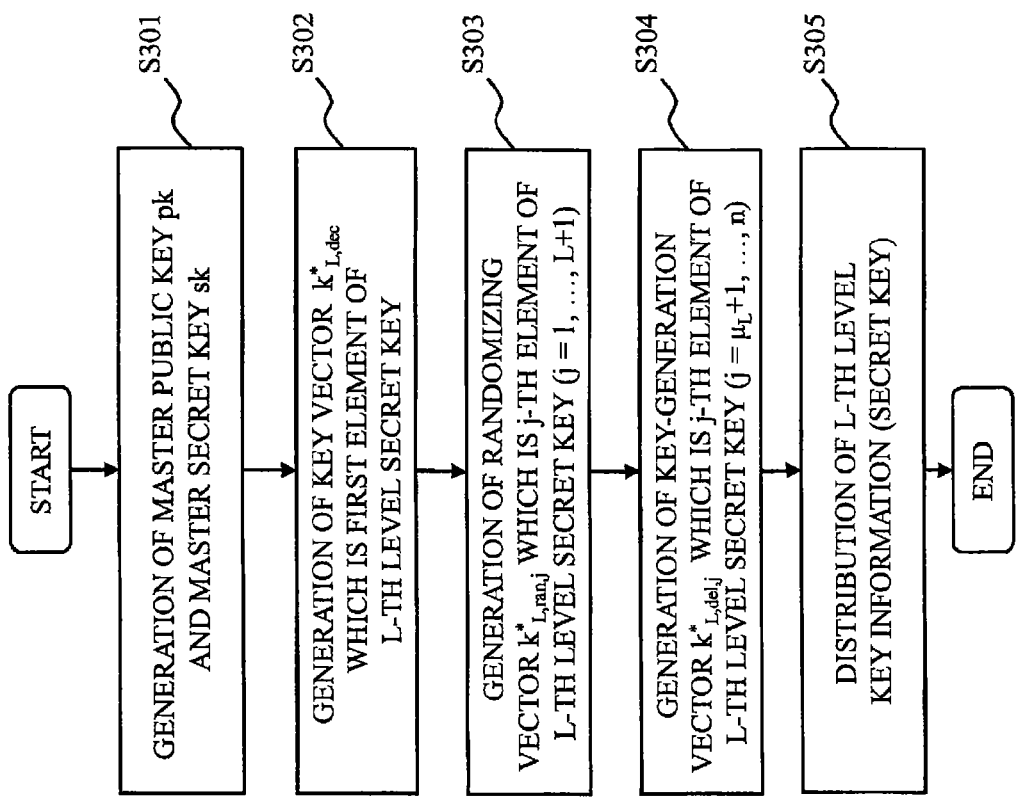
FIG. 12 is a flowchart showing operations of the key generation device 100 according to the second embodiment.
Figure 13:
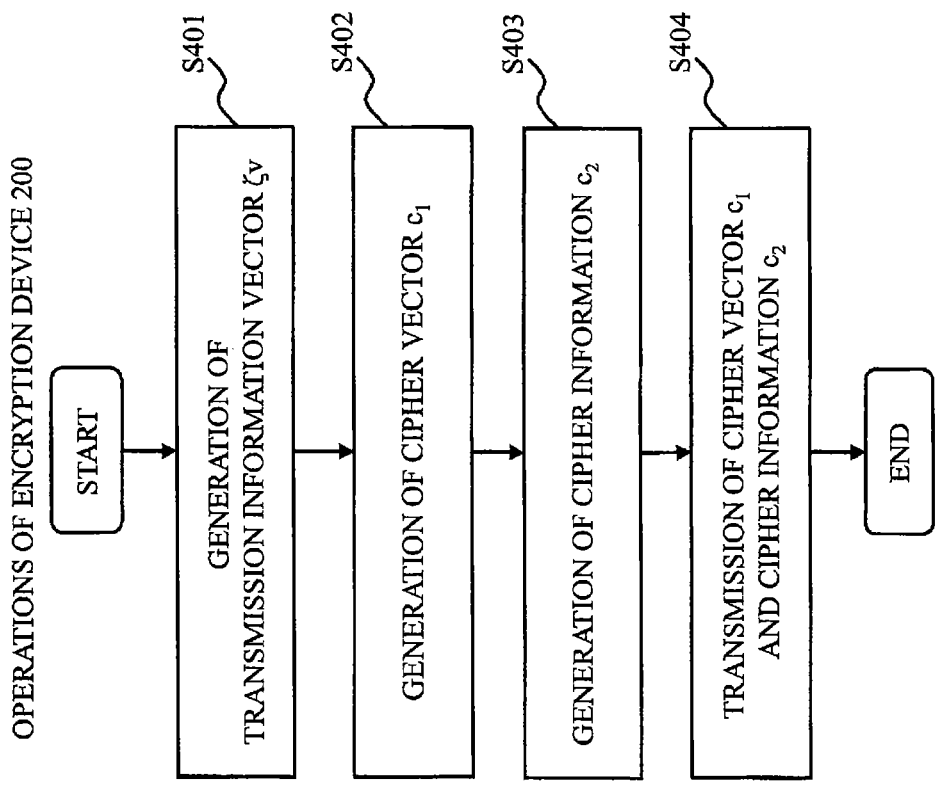
FIG. 13 is a flowchart showing operations of the encryption device 200 according to the second embodiment.
Figure 14:
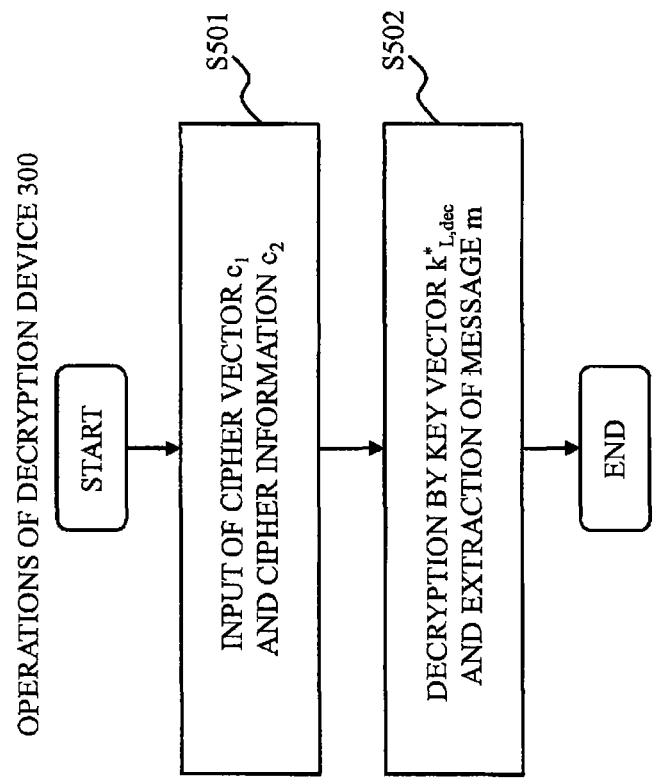
FIG. 14 is a flowchart showing operations of the decryption device 300 according to the second embodiment.
Figure 15:
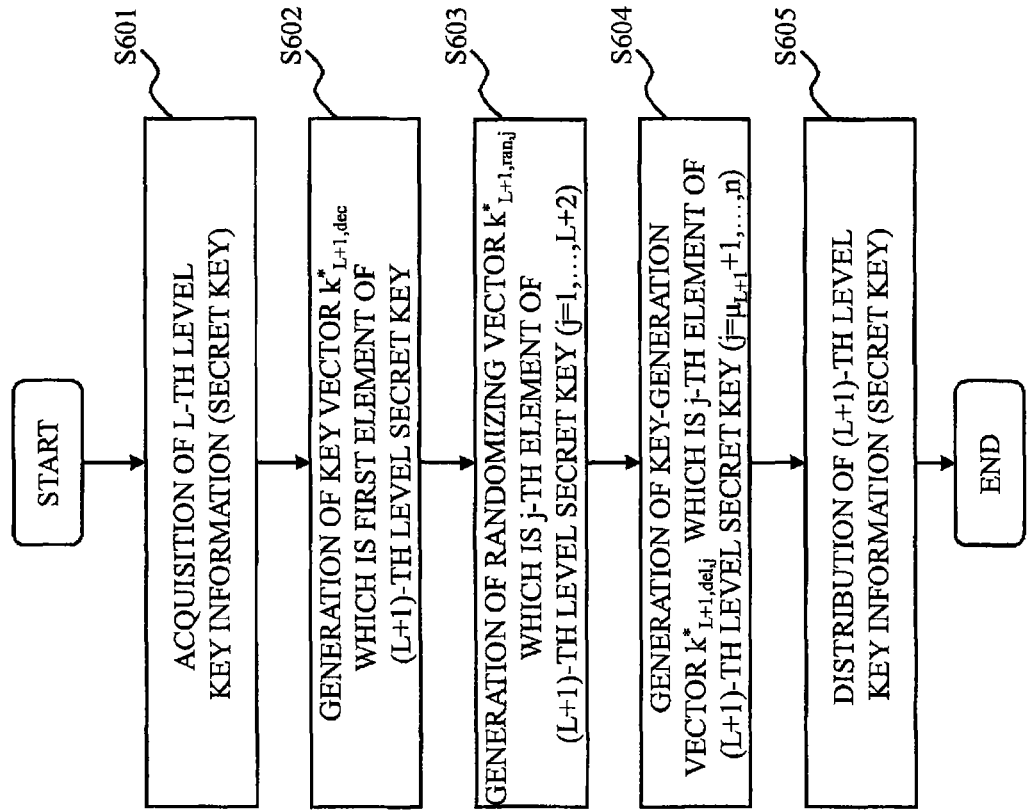
FIG. 15 is a flowchart showing operations of the key delegation device 400 according to the second embodiment.

FIG. 12 is a flowchart showing operations of the key generation device 100. FIG. 13 is a flowchart showing operations of the encryption device 200. FIG. 14 is a flowchart showing operations of the decryption device 300. FIG. 15 is a flowchart showing operations of the key delegation device 400.

Figure 16:
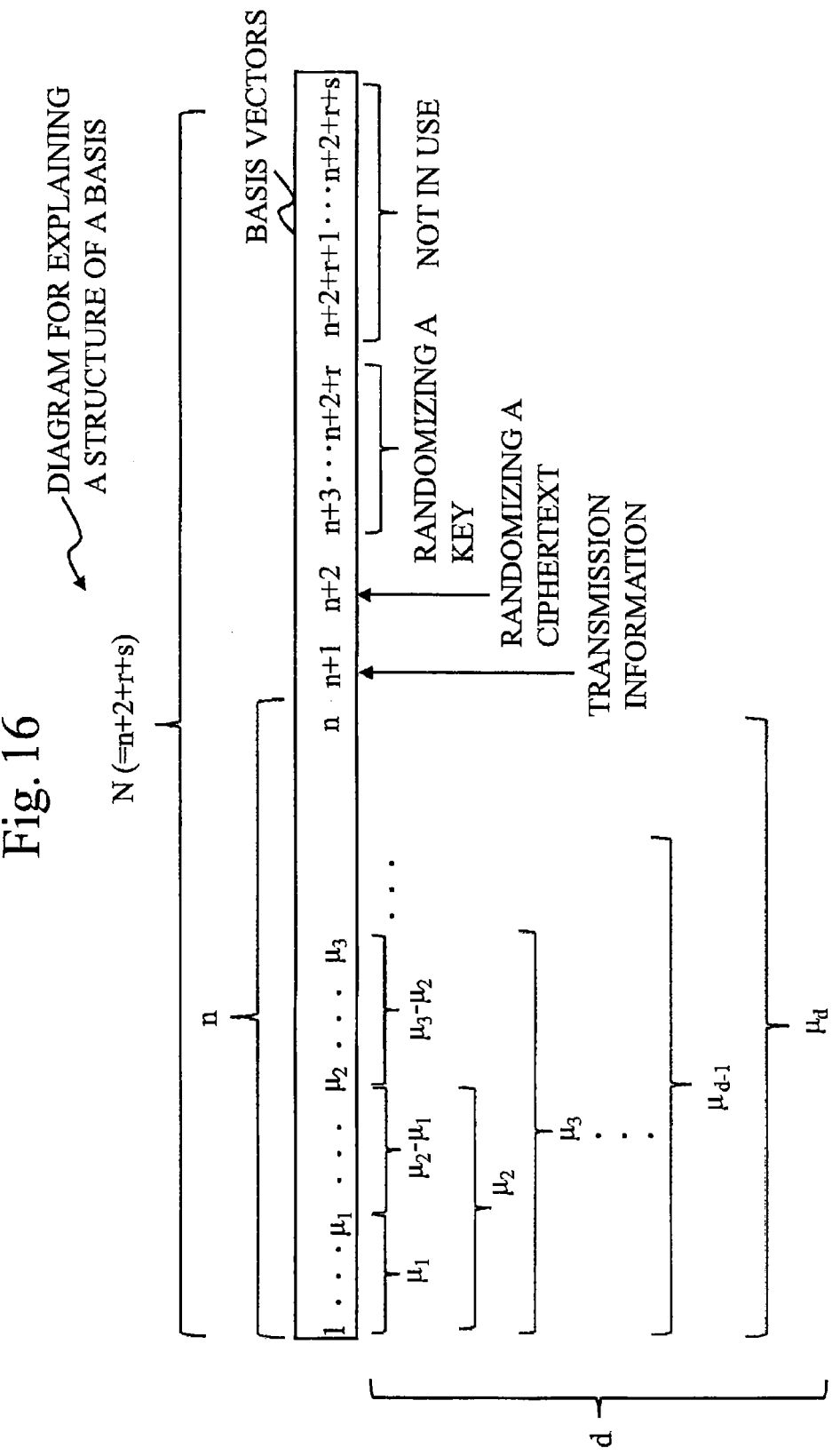
FIG. 16 is a conceptual diagram showing a structure of a basis of dual pairing vector spaces according to the second embodiment.

FIG. 16 is a conceptual diagram showing a structure of a basis of dual pairing vector spaces (DPVS).

The functions and operations of the key generation device 100 will be described. The key generation device 100 includes a master key generation unit 110, a master key storage unit 120, a key vector generation unit 130, a randomizing vector generation unit 140, a key-generation vector generation unit 150, and a key distribution unit 160.

(S301: Master Key Generation Step)

Using the processing device, the master key generation unit 110 computes Formula 161 to generate a master public key pk and a master secret key sk, and stores the generated keys in the master key storage unit 120.

[Formula 161]

$$N := n + 2 + r + s, \quad (1)$$

$$(q, \mathbb{V}, \mathbb{V}^*, \mathbb{G}_T, \mathbb{A}, \mathbb{A}^*) \xleftarrow{R} \mathcal{G}_{dpvs}(1^\lambda, N)$$

$$X := (\chi_{i,j}) \xleftarrow{U} GL(N, \mathbb{F}_q) \quad (2)$$

$$b_i = \sum_{j=1}^{N} \chi_{i,j} a_j, \quad (3)$$

$$\mathbb{B} := (b_1, \ldots, b_N)$$

$$\hat{\mathbb{B}} := (b_1, \ldots, b_n, b_{n+1}, b_{n+2}) \quad (4)$$

$$(\nu_{i,j}) := (X^T)^{-1} \quad (5)$$

$$b^*_i = \sum_{j=1}^{N} \nu_{i,j} a^*_j, \quad (6)$$

$$\mathbb{B}^* := (b^*_1, \ldots, b^*_N)$$

$$sk := (X, \mathbb{B}^*), \, pk := (1^\lambda, q, \mathbb{V}, \mathbb{V}^*, \mathbb{G}_T, \mathbb{A}, \mathbb{A}^*, \hat{\mathbb{B}}) \quad (7)$$

return $sk, pk$

That is: (1) using the processing device, the master key generation unit 110 generates N(=n+2+s+r)-dimensional DPVS (q, V, V*, $G_T$, A, A*) with a security parameter $1^\lambda$. $G_{dpvs}$ is a DPVS generation algorithm that takes as input $1^\lambda$ and N, and outputs DPVS (q, V, V*, $G_T$, A, A) with the security parameter $1^\lambda$ and N-dimensional spaces. It is assumed that n is an integer of 1 or greater, s is an integer of 1 or greater, and r is an integer of 0 or greater, n+2=R, and n+2+r=s. In particular, instances in which (s, r)=(1, 0), (1, 1), (n, 1), (1, n), and (n, n) are important, where n is an arbitrary value of 2 or greater. When s and r are small values, efficiency is enhanced. When s and r are large values, security is enhanced.

(2) Using the processing device, the master key generation unit 110 randomly selects a linear transformation X in order to generate a basis B from a canonical basis A.

(3) Using the processing device and based on the selected linear transformation X, the master key generation unit 110 generates the basis B:=($b_1, \ldots, b_N$) from the basis A:=($a_1, \ldots, a_N$).

(4) Using the processing device, the master key generation unit 110 generates a basis vector B^:=($b_1, \ldots, b_n, b_{n+1}, b_{n+2}$) having basis vectors $b_i$ (i=1, . . . , n+2) of the basis B.

(5) Using the processing device, the master key generation unit 110 generates a linear transformation $(X^T)^{-1}$ from the linear transformation X in order to generate a basis B*:=($b^*_1, \ldots, b^*_N$) from a basis A*:=($a^*_1, \ldots, a^*_N$).

(6) Using the processing device and based on the generated linear transformation $(X^T)^{-1}$, the master key generation unit 110 generates the basis B*:=($b^*_1, \ldots, b^*_N$) from the basis A*.

(7) The master key generation unit 110 designates the generated linear transformation X and basis B* as the master secret key sk, and ($1^\lambda$, q, V, V*, $G_T$, A, A*, B^) including the generated basis B^ as the master public key pk. The master key storage unit 120 stores in a storage device the master public key pk and the master secret key sk generated by the master key generation unit 110.

It is assumed that there are an N (=n+2+r+s) number of dimensions in the DPVS, where n denotes the number of bases assigned to represent the hierarchical structure of the format of hierarchy μ. That is, in addition to the n number of bases assigned to represent the hierarchical structure, a (2+r+s) number of basis vectors are provided.

As shown in FIG. 16, the n number of basis vectors out of the N (=n+2+r+s) number of basis vectors are assigned for the predicate vectors and attribute vectors. The structure of the basis vectors assigned for the predicate vectors and attribute vectors is the same as the structure shown in FIG. 6. Out of the (2+r+s) number of remaining basis vectors, the (n+1)-th basis vector is used for generating a session key. The (n+2)-th basis vector is used for randomizing a ciphertext $c_1$. The (n+3)-th to (n+2+r)-th basis vectors are used for randomizing a key $k^*_L$. The (n+2+r+1)-th to (n+2+r+s)-th basis vectors are not used.

To summarize, in (S301), the master key generation unit 110 executes the Setup algorithm shown in Formula 162 to generate the master public key pk and the master secret key sk.

[Formula 162]

$$\text{Setup}(1^\lambda, \vec{\mu} := (n, d; \mu_1, \ldots, \mu_d)):$$

$$(\text{param}, \mathbb{B}, \mathbb{B}^*) \xleftarrow{R} \mathcal{G}_{ob}(1^\lambda, n + 2 + r + s),$$

$$\hat{\mathbb{B}} := (b_1, \ldots, b_n, b_{n+1}, b_{n+2}),$$

$$\text{return } sk := (X, \mathbb{B}^*), pk := (1^\lambda, \text{param}, \hat{\mathbb{B}}).$$

-continued where $$\mathcal{G}_{ob}(1^\lambda, N) : \text{param} := (q, \mathbb{V}, \mathbb{V}^*, \mathbb{G}_T, \mathbb{A}, \mathbb{A}^*) \xleftarrow{R} \mathcal{G}_{dpvs}(1^\lambda, N),$$

$$X := (\chi_{i,j}) \xleftarrow{U} GL(N, \mathbb{F}_q), (v_{i,j}) := (X^T)^{-1},$$

$$b_i = \sum_{j=1}^{N} \chi_{i,j} a_j, \mathbb{B} := (b_1, \ldots, b_N),$$

$$b_i^* = \sum_{j=1}^{N} v_{i,j} a_j^*, \mathbb{B}^* := (b_1^*, \ldots, b_N^*),$$

return (param, $\mathbb{B}$, $\mathbb{B}^*$)

(S302: Key Vector $k^*_{L,dec}$ Generation Step)

Using the processing device and based on the master public key pk, the master secret key sk, and predicate vectors ($v_1, \ldots, v_L$) shown in Formula 163, the key vector generation unit 130 computes Formula 164 to generate a key vector $k^*_{L,dec}$ which is the first element of an L-th level (level L) secret key.

[Formula 163]

$$(\vec{v}_1, \ldots, \vec{v}_L) := ((v_1, \ldots, v_{\mu_1}), \ldots, (v_{\mu_{L-1}+1}, \ldots, v_{\mu_L}))$$

[Formula 164]

$$\sigma_{0,i}, \eta_{0,h} \xleftarrow{U} \mathbb{F}_q \ (i = 1, \ldots, L; h = 1, \ldots, r) \quad (1)$$

$$vv := \sum_{t=1}^{L} \sigma_{0,t} \left( \sum_{i=\mu_{t-1}+1}^{\mu_t} v_i b_i^* \right) \quad (2)$$

$$rv := \sum_{h=1}^{r} \eta_{0,h} b_{n+2+h}^* \quad (3)$$

$$k^*_{L,dec} := \quad (4)$$

$$vv + b^*_{n+1} + rv := \sum_{t=1}^{L} \sigma_{0,t} \left( \sum_{i=\mu_{t-1}+1}^{\mu_t} v_i b_i^* \right) + b^*_{n+1} + \sum_{h=1}^{r} \eta_{0,h} b^*_{n+2+h}$$

That is: (1) using the processing device, the key vector generation unit 130 generates random numbers $\sigma_{0,i}$ (i= 1, . . . , L) and $\eta_{0,h}$ (h=1, . . . , r).

(2) Using the processing device, the key vector generation unit 130 generates a vector vv by setting each of the predicate vectors randomized by the generated random number $\sigma_{0,t}$ as the coefficient of the basis vector $b^*_i$ (i=1, . . . , $\mu_L$). That is, each of the predicate vectors is embedded in the coefficient of the basis vector $b^*_i$ (i=1, . . . , $\mu_L$).

(3) Using the processing device, the key vector generation unit 130 generates a vector rv by setting the generated random number $\eta_{0,h}$ as the coefficient of the basis vector $b^*_i$ (i=n+2+1, . . . , n+2+r).

(4) The key vector generation unit 130 generates the key vector $k^*_{L,dec}$ by adding the generated vectors vv and rv to a vector in which 1 is set as the coefficient of the basis vector $b^*_{n+1}$.

(S303: Randomizing Vector $k^*_{L,ranj}$ Generation Step)

Based on the master public key pk, the master secret key sk, and the predicate vectors ($v_1, \ldots, v_L$) shown in Formula 163, the randomizing vector generation unit 140 computes Formula 165 to generate a randomizing vector $k^*_{L,ranj}$ (j=

1, . . . , L+1). The randomizing vector $k^*_{L,ran,j}$ (j=1, . . . , L+1) is a vector, in a lower level key, for uniformly distributing the coefficient of a basis vector in which each of predicate vectors is embedded. The randomizing vector $k^*_{L,ran,j}$ is the j-th element of the L-th level secret key.

[Formula 165]

$$\sigma_{j,i}, \eta_{j,h} \xleftarrow{U} \mathbb{F}_q \ (j=1, \ldots, L+1; i=1, \ldots, L; h=1, \ldots, r) \quad (1)$$

$$vv_j := \sum_{t=1}^{L} \sigma_{j,t} \left( \sum_{i=\mu_{t-1}+1}^{\mu_t} v_i b_i^* \right) (j=1, \ldots, L+1) \quad (2)$$

$$rv_j := \sum_{h=1}^{r} \eta_{j,h} b_{n+2+h}^* \ (j=1, \ldots, L+1) \quad (3)$$

$$k^*_{L,ran,j} := vv_j + rv_j := \sum_{t=1}^{L} \sigma_{j,t} \left( \sum_{i=\mu_{t-1}+1}^{\mu_t} v_i b_i^* \right) + \sum_{h=1}^{r} \eta_{j,h} b_{n+2+h}^* \quad (4)$$

$$(j=1, \ldots, L+1)$$

That is, (1) using the processing device, the randomizing vector generation unit 140 generates random numbers $\sigma_{j,i}$ (j=1, . . . , L+1; i=1, . . . , L) and $\eta_{j,h}$ (j=1, . . . , L+1; h=1, . . . , r).

(2) Using the processing device, the randomizing vector generation unit 140 generates a vector $vv_j$, for each j of j=1, . . . , L+1, by setting each of the predicate vectors randomized by the random number $\sigma_{j,t}$ as the coefficient of the basis vector $b^*_i$ (i=1, . . . , $\mu_L$). That is, each of the predicate vectors is embedded in the coefficient of the basis vector $b^*_i$ (i=1, . . . , $\mu_L$).

(3) Using the processing device, the randomizing vector generation unit 140 generates a vector $rv_j$, for each j of j=1, . . . , L+1, by setting the random number $\eta_{j,h}$ as the coefficient of the basis vector $b^*_i$ (i=n+2+1, . . . , n+2+r).

(4) The randomizing vector generation unit 140 generates the randomizing vector $k^*_{L,ran,j}$ (j=1, . . . , L+1), for each j of j=1, . . . , L+1, by adding together the generated vectors $vv_j$ and $rv_j$.

(S304: Key-Generation Vector $k^*_{L,del,j}$ Generation Step)

Using the processing device and based on the master public key pk, the master secret key sk, and the predicate vectors $(v_1, \ldots, v_L)$ shown in Formula 163, the key-generation vector generation unit 150 computes Formula 166 to generate a key-generation vector $k^*_{L,del,j}$ (j=$\mu L$+1, . . . , n). The key-generation vector $k^*_{L,del,j}$ (j=$\mu_L$+1, . . . , n) is a vector for generating a lower level secret key (lower level key vector). The key-generation vector $k^*_{L,del,j}$ is the j-th element of the L-th level secret key.

[Formula 166]

$$\sigma_{j,i}, \psi, \eta_{j,h} \xleftarrow{U} \mathbb{F}_q \quad (1)$$
$$(j=\mu_L+1, \ldots, n; i=1, \ldots, L; h=1, \ldots r)$$

$$vv_j := \sum_{t=1}^{L} \sigma_{j,t} \left( \sum_{i=\mu_{t-1}+1}^{\mu_t} v_i b_i^* \right) (j=\mu_L+1, \ldots, n) \quad (2)$$

$$\psi v_j := \psi b_j^* \ (j=\mu_L+1, \ldots, n) \quad (3)$$

-continued $$rv_j := \sum_{h=1}^{r} \eta_{j,h} b_{n+2+h}^* \ (j=\mu_L+1, \ldots, n) \quad (4)$$

$$k^*_{L,del,j} := vv_j + \psi v_j + rv_j := \quad (5)$$

$$\sum_{t=1}^{L} \sigma_{j,t} \left( \sum_{i=\mu_{t-1}+1}^{\mu_t} v_i b_i^* \right) + \psi b_j^* + \sum_{h=1}^{r} \eta_{j,h} b_{n+2+h}^* \ (j=\mu_L+1, \ldots n)$$

That is, (1) using the processing device, the key-generation vector generation unit 150 generates random numbers $\sigma_{j,i}$ (j=$\mu_L$+1, . . . , n; i=1, . . . , L), $\psi$, and $\eta_{j,h}$ (j=$\mu_L$+1, . . . , n; h=1, . . . , r).

(2) Using the processing device, the key-generation vector generation unit 150 generates a vector $vv_j$, for each j of j=$\mu_L$+1, . . . , n, by setting each of the predicate vectors randomized by the random number $\sigma_{j,t}$ as the coefficient of the basis vector $b^*_i$ (i=1, . . . , $\mu_L$). That is, each of the predicate vectors is embedded in the coefficient of the basis vector $b^*_i$ (i=1, . . . , $\mu_L$).

(3) Using the processing device, the key-generation vector generation unit 150 generates a vector $\psi v_j$, for each j of j=$\mu_L$+1, . . . , n, by setting the random number $\psi$ as the coefficient of the basis vector $b^*_j$.

(4) Using the processing device, the key-generation vector generation unit 150 generates a vector $rv_j$, for each j of j=$\mu_L$+1, . . . , n, by setting the random number $\eta_{j,h}$ as the coefficient of the basis vector $b^*_i$ (i=n+2+1, . . . , n+2+r).

(5) The key-generation vector generation unit 150 generates the key-generation vector $k^*_{L,del,j}$ (j=$\mu_L$+1, . . . , n), for each j of j=$\mu_L$+1, . . . , n, by adding together the vectors $vv_j$, $\psi v_j$, and $rv_j$.

To summarize, in (S302) to (S304), using the processing device, the key vector generation unit 130, the randomizing vector generation unit 140, and the key-generation vector generation unit 150 execute the GenKey algorithm shown in Formula 167. This generates the L-th level secret key (key information $k^*_L$) including the key vector $k^*_{L,dec}$, the randomizing vector $k^*_{L,ran,j}$ (j=1, . . . , L+1), and the key-generation vector $k^*_{L,del,j}$ (j=$\mu_L$+1, . . . , n).

[Formula 167]

$$GenKey(pk, sk, (\vec{v}_1, \ldots, \vec{v}_L)) :=$$
$$((v_1, \ldots, v_{\mu_1}), \ldots, (v_{\mu_{L-1}+1}, \ldots, v_{\mu_L})):$$

$$\sigma_{j,i}, \psi, \eta_{j,j} \xleftarrow{U} \mathbb{F}_q$$

for $j=0, \ldots, L+1, \mu_L+1, \ldots n; i=1, \ldots, L; h=1, \ldots, r$ $$k^*_{L,dec} := \sum_{t=1}^{L} \sigma_{0,t} \left( \sum_{i=\mu_{t-1}+1}^{\mu_t} v_i b_i^* \right) + b_{n+1}^* + \sum_{h=1}^{r} \eta_{0,h} b_{n+2+h}^*,$$

$$k^*_{L,ran,j} := \sum_{t=1}^{L} \sigma_{j,t} \left( \sum_{i=\mu_{t-1}+1}^{\mu_t} v_i b_i^* \right) + \sum_{h=1}^{r} \eta_{j,h} b_{n+2+h}^*$$

for $j=1, \ldots, L+1$, $$k^*_{L,del,j} := \sum_{t=1}^{L} \sigma_{j,t} \left( \sum_{i=\mu_{t-1}+1}^{\mu_t} v_i b_i^* \right) + \psi b_j^* + \sum_{h=1}^{r} \eta_{j,h} b_{n+2+h}^*$$

for $j=\mu_L+1, \ldots, n$, return $\vec{k}^*_L := (k^*_{L,dec}, k^*_{L,ran,1}, \ldots, k^*_{L,ran,L+1}, k^*_{L,del,\mu_L+1}, \ldots, k^*_{L,del,n}).$ (S305: Key Distribution Step)

The key distribution unit 160 transmits the master public key generated by the master key generation unit 110 and the key information $k^*_L$ generated by the key vector generation unit 130, the randomizing vector generation unit 140, and the key-generation vector generation unit 150 to the decryption device 300 through the communication device. The key distribution unit 160 also transmits the master public key to the encryption device 200 through the communication device. The key information $k^*_L$ is secretly transmitted to the decryption device 300. Any method may be used to secretly transmit the key information $k^*_L$ to the decryption device 300. For example, the key information $k^*_1$ may be transmitted using a prior art cryptographic process.

The functions and operations of the encryption device 200 will be described. The encryption device 200 includes a transmission information setting unit 210, a cipher vector generation unit 220, a cipher information generation unit 230, a data transmission unit 240, and a public key acquisition unit 250.

It is assumed that the public key acquisition unit 250 has obtained the master public key and the attribute information vectors corresponding to the predicate information vectors of the decryption device 300 before the steps to be described below.

(S401: Transmission Information Setting Step)

Using the processing device and based on the master public key pk, the transmission information setting unit 210 computes Formula 168 to generate a transmission information vector $\zeta v$.

[Formula 168]

$$\zeta \xleftarrow{U} \mathbb{F}_q \quad (1)$$

$$\zeta v := \zeta b_{n+1} \quad (2)$$

That is, (1) using the processing device, the transmission information setting unit 210 generates a random number $\zeta$.

(2) Using the processing device, the transmission information setting unit 210 generates the transmission information vector v by setting the random number $\zeta$ as the coefficient of the basis vector $b_{n+1}$ of the basis $B^\wedge$ included in the master public key pk.

(S402: Cipher Vector $c_1$ Generation Step)

Using the processing device and based on the master public key pk and attribute vectors $(x_1, \ldots, x_L)$ shown in Formula 169, the cipher vector generation unit 220 computes Formula 170 to generate a cipher vector $c_1$.

[Formula 169]

$$(\vec{x}_1, \ldots, \vec{x}_L) := ((x_1, \ldots, x_{\mu_1}), \ldots, (x_{\mu_{L-1}+1}, \ldots, x_{\mu_L}))$$

[Formula 170]

$$(\vec{x}_{L+1}, \ldots, \vec{x}_d) := \quad (1)$$

$$((x_{\mu_L+1}, \ldots, x_{\mu_{L+1}}), \ldots, (x_{\mu_{d-1}+1}, \ldots, x_{\mu_d})) \xleftarrow{U} \mathbb{F}_q \mu_{L+1} - \mu_L \times \ldots \times \mathbb{F}_q n - \mu_{d-1},$$

$$\delta_1, \ldots, \delta_d, \delta_{n+2}, \zeta \xleftarrow{U} \mathbb{F}_q$$

$$xv := \sum_{t=1}^{d} \delta_t \left( \sum_{i=\mu_{t-1}+1}^{\mu_t} x_i b_i \right) \quad (2)$$

$$rv := \delta_{n+2} b_{n+2} \quad (3)$$

$$c_1 := xv + \zeta v + rv := \sum_{t=1}^{d} \delta_t \left( \sum_{i=\mu_{t-1}+1}^{\mu_t} x_i b_i \right) + \zeta b_{n+1} + \delta_{n+2} b_{n+2} \quad (4)$$

That is, (1) using the processing device, the cipher vector generation unit 220 generates random numbers $(x_{L+1}, \ldots, x_d)$ and $\delta_i$ ($i=1, \ldots, d, n+2$).

(2) Using the processing device, the cipher vector generation unit 220 sets each of the attribute vectors as the coefficient of the basis vector $b_i$ ($i=1, \ldots, \mu_L$) of the basis B included in the master public key pk. That is, each of the attribute vectors is embedded in the coefficient of the basis vector $b_i$ ($i=1, \ldots, \mu_L$). Using the processing device, the cipher vector generation unit 220 sets the random number as the coefficient of the basis vector $b_i$ ($i=\mu_L+1, \ldots, n$). The cipher vector generation unit 220 thus generates a vector xv.

(3) Using the processing device, the cipher vector generation unit 220 generates a vector rv by setting the random number $\delta_{n+2}$ as the coefficient of the basis vector $b_{n+2}$ of the basis B included in the master public key pk.

(4) Using the processing device, the cipher vector generation unit 220 generates the cipher vector $c_1$ by adding the generated vectors xv and rv to the transmission information vector $\zeta v$ generated by the transmission information setting unit 210.

The vector rv is added for enhancing security and is not a requisite element.

(S403: Cipher Information $c_2$ Generation Step)

Using the processing device and based on a message m, the cipher information generation unit 230 computes Formula 171 to generate cipher information $c_2$.

$$c_2 := g_T^\zeta m \quad \text{[Formula 171]}$$

where
$g_T = e(a_i, a_i^*) \neq 1$.

(S404: Data Transmission Step)

The data transmission unit 240 transmits the cipher vector $c_1$ generated by the cipher vector generation unit 220 and the cipher information $c_2$ generated by the cipher information generation unit 230 to the decryption device 300 through the communication device.

To summarize, the encryption device 200 executes the Enc algorithm shown in Formula 172 to generate the cipher vector $c_1$ and the cipher information $c_2$.

[Formula 172]

$Enc(pk, m \in \mathbb{G}_T,$ $(\vec{x}_1, \ldots, \vec{x}_L) := ((x_1, \ldots, x_{\mu_1}), \ldots, (x_{\mu_{L-1}+1}, \ldots, x_{\mu_L})):$ $(\vec{x}_{L+1}, \ldots, \vec{x}_d) \xleftarrow{U} \mathbb{F}_q \mu_{L+1} - \mu_L \times \ldots \times \mathbb{F}_q n - \mu_{d-1},$ $\delta_1, \ldots, \delta_d, \delta_{n+2}, \zeta \xleftarrow{U} \mathbb{F}_q,$ $c_1 := \sum_{t=1}^{d} \delta_t \left( \sum_{i=\mu_{t-1}+1}^{\mu_t} x_i b_i \right) + \zeta b_{n+1} + \delta_{n+2} b_{n+2}, c_2 := g_T^\zeta m,$ return $(c_1, c_2)$.

The functions and operations of the decryption device 300 will be described. The decryption device 300 includes a vector input unit 310, a key vector storage unit 320, and a pairing operation unit 330.

(S501: Vector Input Step)

The vector input unit 310 receives through the communication device and inputs the cipher vector $c_1$ and the cipher information $c_2$ transmitted by the data transmission unit 240 of the encryption device 200.

(S502: Decryption Step)

Using the processing device and based on the master public key pk and the key vector $k^*_{L,dec}$ which is the first element of the L-th level secret key, the pairing operation unit 330 computes Formula 173 to generate a message m'.

$$m':=c_2/e(c_1, k_{L,dec}^*)$$ [Formula 173]

That is, using the processing device, the pairing operation unit 330 performs the pairing operation e on the cipher vector $c_1$ input by the vector input unit 310 and the key vector $k^*_{L,dec}$ stored in the storage device by the key vector storage unit 320. The pairing operation unit 330 thus computes $g_T^\zeta$. Then, by dividing the cipher information $c_2$ (=$g_T^\zeta$m) by the computed $g_T^\zeta$, the message m' (=m) is computed. When the key vector $k^*_{L,dec}$ is provided by the key generation device 100 or the key delegation device 400 of a higher level, the key vector storage unit 320 stores the key vector $k^*_{L,dec}$ in the storage device.

If L≤h holds for the attribute vector $x_i$ (i=1, . . . , h) used by the encryption device 200 for encryption and the predicate vector $v_i$ (i=1, . . . , L) used by the decryption device 300 for decryption and if $x_i \cdot v_i = 0$ for all i (i=1, . . . , L), then $g_T^\zeta$ can be obtained by performing the pairing operation e on the cipher vector $c_1$ and the key vector $k^*_{L,dec}$ as shown in Formula 174.

$$e(c_1, k_{L,dec}^*) = g_T^{\Sigma_{1 \le i \le L} \sigma_i \delta_i \vec{x}_i \cdot \vec{v}_i + \zeta} = g_T^\zeta$$ [Formula 174]

To summarize, the decryption device 300 executes the Dec algorithm shown in Formula 175 to generate the message m'.

$$Dec(pk, k_{L,dec}^*, c_1, c_2): m':=c_2/e(c_1, k_{L,dec}^*), \text{return } m'.$$ [Formula 175]

The functions and operations of the key delegation device 400 will be described. The key delegation device 400 includes a key vector acquisition unit 410 (key-generation vector acquisition unit), a key vector generation unit 420, a randomizing vector generation unit 430, a key-generation vector generation unit 440, and a key distribution unit 450.

(S601: Key Information $K^*_L$ Acquisition Step)

The key vector acquisition unit 410 obtains, through the communication device, the L-th level secret key (key information $k^*_L$) including the key vector $k^*_{L,dec}$ which is the first element of the L-th level secret key, the randomizing vector $k^*_{L,ran,j}$ (j=1, . . . , L+1), and the key-generation vector $k^*_{L,del,j}$ (j=$\mu_L$+1, . . . , n).

(S602: Key Vector $K^*_{L+1,dec}$ Generation Step)

Using the processing device and based on the master public key pk, the key information $k^*_L$, a predicate vector $v_{L+1}$ shown in Formula 176, the key vector generation unit 420 computes Formula 177 to generate a key vector $k^*_{L+1,dec}$ which is the first element of an (L+1)-th level secret key.

[Formula 176]

$$\vec{v}_{L+1} := (v_{\mu_L+1}, \ldots, v_{\mu_{L+1}})$$

[Formula 177]

$$\alpha_{0,i}, \sigma_0 \xleftarrow{U} \mathbb{F}_q \ (i = 1, \ldots, L+1) \quad (1)$$

$$rv := \sum_{i=1}^{L+1} \alpha_{0,i} k_{L,ran,i}^* \quad (2)$$

$$vv := \sigma_0 \left( \sum_{i=\mu_L+1}^{\mu_{L+1}} v_i k_{L,del,i}^* \right) \quad (3)$$

$$k_{L+1,dec}^* := \quad (4)$$

$$k_{L,dec}^* + rv + vv := k_{L,dec}^* + \sum_{i=1}^{L+1} \alpha_{0,i} k_{L,ran,i}^* + \sigma_0 \left( \sum_{i=\mu_L+1}^{\mu_{L+1}} v_i k_{L,del,i}^* \right)$$

That is: (1) using the processing device, the key vector generation unit 420 generates random numbers $\alpha_{0,i}$ (i=1, . . . , L+1) and $\sigma_0$.

(2) Using the processing device, the key vector generation unit 420 generates a vector rv by adding together vectors in which the coefficient of the randomizing vector $k^*_{L,ran,i}$ is multiplied by the random number $\alpha_{0,i}$ for each i of i=1, . . . , L+1. Each of the predicate vectors is embedded in the coefficient of the basis vector $b^*_i$ (i=1, . . . , $\mu_L$) of the randomizing vector $k^*_{L,ran,i}$ (i=1, . . . , L+1). Thus, each of the predicate vectors multiplied by the random number is embedded in the coefficient of the basis vector $b^*_i$ (i=1, . . . , $\mu_L$) of the vector rv.

(3) Using the processing device, the key vector generation unit 420 generates a vector vv by adding together vectors in which each vector of the predicate vectors $v_{L+1}$ is set as the coefficient of the key-generation vector $k^*_{L,del,i}$ (i=$\mu_L$+1, . . . , $\mu_{L+1}$) and multiplying the sum by the random number $\sigma_0$. That is, each of the predicate vectors is embedded in the coefficient of the basis vector $b^*_i$ (i=$\mu_L$+1, . . . , $\mu_{L+1}$).

(4) Using the processing device, the key vector generation unit 420 generates the key vector $k^*_{L+1,dec}$ by adding together the key vector $k^*_{L,dec}$, the vector rv, and the vector vv.

(S603: Randomizing Vector $K^*_{L+1,ran,j}$ Generation Step)

Based on the master public key pk, the key information $k^*_L$, and the predicate vector $v_{L+1}$ shown in Formula 176, the randomizing vector generation unit 430 computes Formula 178 to generate a randomizing vector $k^*_{L+1,ran,j}$ (j=1, . . . , L+2). The randomizing vector $k^*_{L+1,ran,j}$ (j=1, . . . , L+2) is a vector, in a lower level key, for uniformly distributing the coefficient of a basis vector in which each of predicate vectors is embedded. The randomizing vector $k^*_{L+1,ran,j}$ is the j-th element of the (L+1)-th level secret key.

[Formula 178]

$$\alpha_{j,i}, \sigma_j \xleftarrow{U} \mathbb{F}_q \ (j = 1, \ldots, L+2; i = 1, \ldots, L+1) \quad (1)$$

$$rv_j := \sum_{i=1}^{L+1} \alpha_{j,i} k_{L,ran,i}^* \ (j = 1, \ldots, L+2) \quad (2)$$

$$vv_j := \sigma_j \left( \sum_{i=\mu_L+1}^{\mu_{L+1}} v_i k_{L,del,i}^* \right) \ (j = 1, \ldots L+2) \quad (3)$$

$$k_{L+1,ran,j}^* := rv_j + vv_j := \sum_{i=1}^{L+1} \alpha_{j,i} k_{L,ran,i}^* + \sigma_j \left( \sum_{i=\mu_L+1}^{\mu_{L+1}} v_i k_{L,del,i}^* \right) \quad (4)$$

$$(j = 1, \ldots, L+2)$$

That is, (1) using the processing device, the randomizing vector generation unit 430 generates random numbers $\alpha_{j,i}$ (j=1, . . . , L+2; i=1, . . . , L) and $\sigma_j$ (j=1, . . . , L+2).

(2) Using the processing device, the randomizing vector generation unit 430 generates a vector $rv_j$, for each j of j=1, ..., L+2, by multiplying the coefficient of the randomizing vector $k^*_{L,ran,i}$ (i=1, ..., L+1) by the random number $\alpha_{j,i}$ (i=1, ..., L+1). As described above, each of the predicate vectors is embedded in the coefficient of the basis vector $b^*_i$ (i=1, ..., $\mu_L$) of the randomizing vector $k^*_{L,ran,i}$ (i=1, ..., L+1). Thus, each of the predicate vectors multiplied by the random number is embedded in the coefficient of the basis vector $b^*_i$ (i=1, ..., $\mu_L$) of the vector $rv_j$.

(3) Using the processing device, the randomizing vector generation unit 430 generates a vector $vv_j$, for each j of j=1, ..., L+2, by adding together vectors in which each of the predicate vectors is set as the coefficient of the key-generation vector $k^*_{L,del,i}$ (i=$\mu_L$+1, ..., $\mu_{L+1}$) and multiplying the sum by the random number $\sigma_j$. That is, each of the predicate vectors is embedded in the coefficient of the basis vector $b^*_i$ (i=$\mu_{L+1}$, ..., $\mu_{L+1}$).

(4) Using the processing device, the randomizing vector generation unit 430 generates the randomizing vector $k^*_{L+1,ran,j}$, for each j of j=1, ..., L+2, by adding together the generated vectors $rv_j$ and $vv_j$.

(S604: Key-Generation Vector $k^*_{L+1,del,j}$ Generation Step)

Using the processing device and based on the master public key pk, the key information $k^*_L$, and the predicate vector $v_{L+1}$ shown in Formula 176, the key-generation vector generation unit 440 computes Formula 179 to generate a key-generation vector $k^*_{L+1,del,j}$ (j=$\mu_{L+1}$+1, ..., n). The key-generation vector $k^*_{L+1,del,j}$ (j=$\mu_{L+1}$+1, ..., n) is a vector for generating a lower level secret key (lower level key vector). The key-generation vector $k^*_{L+1,del,j}$ is the j-th element of the (L+1)-th level secret key.

[Formula 179]

$$\alpha_{j,i}, \sigma_j, \psi' \xleftarrow{U} \mathbb{F}_q \ (j = \mu_{L+1}+1, \ldots, n; i = 1, \ldots, L+1) \quad (1)$$

$$rv_j := \sum_{i=1}^{L+1} \alpha_{j,i} k^*_{L,ran,i} \ (j = \mu_{L+1}+1, \ldots n) \quad (2)$$

$$vv_j := \sigma_j \left( \sum_{i=\mu_L+1}^{\mu_{L+1}} v_i k^*_{L,del,i} \right) (j = \mu_{L+1}+1, \ldots, n) \quad (3)$$

$$\psi v_j := \psi' k^*_{L,del,j} \ (j = \mu_{L+1}+1, \ldots, n) \quad (4)$$

$$k^*_{L+1,del,j} := rv_j + vv_j + \psi v_j := \sum_{i=1}^{L+1} \alpha_{j,i} k^*_{L,ran,i} + \sigma_j \left( \sum_{i=\mu_L+1}^{\mu_{L+1}} v_i k^*_{L,del,i} \right) + \psi' k^*_{L,del,j} \ (j = \mu_{L+1}+1, \ldots, n) \quad (5)$$

That is, (1) using the processing device, the key-generation vector generation unit 440 generates random numbers $\alpha_{j,i}$ (j=$\mu_{L+1}$+1, ..., n; i=1, ..., L+1), $\sigma_j$ (j=$\mu_{L+1}$+1, ..., n), and $\psi'$.

(2) Using the processing device, the key-generation vector generation unit 440 generates a vector $rv_j$, for each j of j=$\mu_{L+1}$+1, ..., n, by multiplying the coefficient of the randomizing vector $k^*_{L,ran,i}$ (i=1, ..., L+1) by the random number $\alpha_{j,i}$. As described above, each of the predicate vectors is embedded in the coefficient of the basis vector $b^*_i$ (i=1, ..., $\mu_L$) of the randomizing vector $k^*_{L,ran,i}$ (i=1, ..., L+1). Thus, each of the predicate vectors multiplied by the random number is embedded in the coefficient of the basis vector $b^*_i$ (i=1, ..., $\mu_L$) of the vector $rv_j$.

(3) Using the processing device, the key-generation vector generation unit 440 generates a vector $vv_j$, for each j of j=$\mu_{L+1}$+1, ..., n, by adding together vectors in which each of the predicate vectors is set as the coefficient of the key-generation vector $k^*_{L,del,i}$ (i=$\mu_L$+1, ..., $\mu_{L+1}$) and multiplying the sum by the random number $\sigma_j$. That is, each of the predicate vectors is embedded in the coefficient of the basis vector $b^*_i$ (i=$\mu_L$+1, ..., $\mu_{L+1}$).

(4) Using the processing device, the key-generation vector generation unit 440 generates a vector $\psi v_j$, for each j of j=$\mu_{L+1}$+1, ..., n, by multiplying the coefficient of the key-generation vector $k^*_{L,del,j}$ by the random number $\psi'$. Each of the predicate vectors is embedded in the coefficient of the basis vector $b^*_j$ (j=$\mu_{L+1}$+1, ..., n) of the key-generation vector $k^*_{L,del,j}$. Thus, each of the predicate vectors multiplied by the random number is embedded in the coefficient of the basis vector $b^*_j$ of the vector $\psi v_j$ (j=$\mu_{L+1}$+1, ..., n).

(5) Using the processing device, the key-generation vector generation unit 440 generates the key-generation vector $k^*_{L+1,del,j}$ (j=$\mu_{L+1}$+1, ..., n), for each j of j=$\mu_{L+1}$+1, ..., n, by adding together the generated vectors $rv_j$, $vv_j$, and $\psi v_j$.

To summarize, in (S602) to (S604), using the processing device, the key vector generation unit 420, the randomizing vector generation unit 430, and the key-generation vector generation unit 440 execute the Delegate$_L$ algorithm shown in Formula 180 to generate the (L+1)-th level secret key (key information $k^*_{L+1}$) including the key vector $k^*_{L+1,dec}$, the randomizing vector $k^*_{L+1,ran,j}$ (j=1, ..., L+2), and the key-generation vector $k^*_{L+1,del,j}$ (j=$\mu_{L+1}$+1, ..., n).

[Formula 180]

$$\text{Delegate}_L \left( pk, \vec{k}^*_L, \vec{v}_{L+1} := (v_{\mu_L+1}, \ldots, v_{\mu_{L+1}}) \right):$$

$$\alpha_{j,i}, \sigma_j, \psi' \xleftarrow{U} \mathbb{F}_q$$

for $j = 0, \ldots, L+2, \mu_{L+1}+1, \ldots, n; i = 1, \ldots, L+1,$ $$k^*_{L+1,dec} := k^*_{L,dec} + \sum_{i=1}^{L+1} \alpha_{0,i} k^*_{L,ran,i} + \sigma_0 \left( \sum_{i=\mu_L+1}^{\mu_{L+1}} v_i k^*_{L,del,i} \right),$$

$$k^*_{L+1,ran,j} := \sum_{i=1}^{L+1} \alpha_{j,i} k^*_{L,ran,i} + \sigma_j \left( \sum_{i=\mu_L+1}^{\mu_{L+1}} v_i k^*_{L,del,i} \right)$$

for $j = 1, \ldots, L+2,$ $$k^*_{L+1,del,j} := \sum_{i=1}^{L+1} \alpha_{j,i} k^*_{L,ran,i} + \sigma_j \left( \sum_{i=\mu_L+1}^{\mu_{L+1}} v_i k^*_{L,del,i} \right) + \psi' k^*_{L,del,j}$$

for $j = \mu_{L+1}+1, \ldots, n,$ return $\vec{k}^*_{L+1} :=$ $$(k^*_{L+1,dec}, k^*_{L+1,ran,1}, \ldots, k^*_{L+1,ran,L+2}, k^*_{L+1,del,\mu_{L+1}+1}, \ldots k^*_{L+1,del,n}).$$

(S605: Key Distribution Step)

The key distribution unit 440 transmits the key information khd L+1 generated by the key vector generation unit 420, the randomizing vector generation unit 430, and the key-generation vector generation unit 440 to the decryption device 300 of a lower level through the communication device. The key information $k^*_{L+1}$ is secretly transmitted to the decryption device 300. Any method may be used to secretly transmit the key information $k^*_{L+1}$ to the decryption device 300. For example, the key information $k^*_{L+1}$ may be transmitted using a prior art cryptographic process.

As described above, the cryptographic processes to be implemented by the cryptographic processing system 10 have higher security than the cryptographic processes proposed in Non-Patent Literature 18, and security proof can be given in a standard model.

This is mainly because of the following three features (1) to (3).

(1) The spaces V and V* used for the cryptographic processes are N (=n+2+r+s)-dimensional, whereas the encryption device 200 uses only an (n+2) number of dimensions of basis vectors $b_i$ (i=1, ..., n+2) for generating the cipher vector $c_1$. The decryption device 300 uses only an (n+2+r) number of dimensions of basis vectors $b^*_i$ (i=1, ..., n+2+r) for decryption. That is, in the cryptographic processes, an s number of dimensions (basis vectors $b_{n+2+r+1}$, ..., $b_{n+2+r+s}$) of the spaces V and V* are not used. In other words, the master public key and the master secret key are generated in spaces with the s number of additional dimensions compared to the (n+2+r)-dimensional spaces used for the cryptographic processes. For this reason, compared to when the master secret key and the master public key are generated in the (n+2+r)-dimensional spaces used for the cryptographic processes, random elements of the linear transformation X and so on used for generating the master secret key and the master public key are increased by the s number of dimensions. Because of the increased random elements, security is enhanced.

(2) Random elements are added to the key vector $k^*_{L,dec}$, the randomizing vector $k^*_{L,ran,j}$ (j=1, ..., L+1), and the key-generation vector $k^*_{L,del,j}$ (j=$\mu_L$+1, ..., n) generated by the key generation device 100. That is, a random number is set in the basis vector $b^*_{n+3}$ in each of the key vector $k^*_{L,dec}$, the randomizing vector $k^*_{L,ran,j}$ (j=1, ..., L+1), and the key-generation vector $k^*_{L,del,j}$ (j=$\mu_L$+1, ..., n). By adding the random elements to the key vector $k^*_{L,dec}$, the randomizing vector $k^*_{L,ran,j}$ (j=1, ..., L+1), and the key-generation vector $k^*_{L,del,j}$ (j=$\mu_L$+1, ..., n), security is enhanced.

(3) The key delegation device 400 generates a lower level key by using a randomizing vector. Because of this feature, the coefficient of a predetermined basis vector of the lower level key can be randomized. As a result, the security of a key is not compromised by generating its lower level key.

When the randomizing vector is not used, two lower level key vectors $k^*_{L+1,dec}$ (A) and $k^*_{L+1,dec}$ (B) generated from the key information $k^*_L$ are constructed as shown in Formula 181.

[Formula 181]

$$k^*_{L+1,dec}(A) := k^*_{L,dec} + \sigma_A \left( \sum_{i=\mu_L+1}^{\mu_{L+1}} v_i k^*_{L,del,i} \right) :=$$

$$\sum_{t=1}^{L} \sigma_{0,t} \left( \sum_{i=\mu_{t-1}+1}^{\mu_t} v_i b^*_i \right) + \sigma_A \left( \sum_{i=\mu_L+1}^{\mu_{L+1}} v_i k^*_{L,del,i} \right) + \eta_0 b^*_{n+1} + (1-\eta_0) b^*_{n+2}$$

$$k^*_{L+1,dec}(B) := k^*_{L,dec} + \sigma_B \left( \sum_{i=\mu_L+1}^{\mu_{L+1}} v_i k^*_{L,del,i} \right) :=$$

$$\sum_{t=1}^{L} \sigma_{0,t} \left( \sum_{i=\mu_{t-1}+1}^{\mu_t} v_i b^*_i \right) + \sigma_B \left( \sum_{i=\mu_L+1}^{\mu_{L+1}} v_i k^*_{L,del,i} \right) + \eta_0 b^*_{n+1} + (1-\eta_0) b^*_{n+2}$$

That is, when the randomizing vector is not used, the coefficient of the basis vector $b^*_i$ (i=1, ..., $\mu_L$) included in the key vector $k^*_{L,dec}$ and in which predicate information is embedded is the same between the key vectors $k^*_{L+1,dec}$ (A) and $k^*_{L+1,dec}$ (B).

However, when the randomizing vector is used, the two lower level key vectors $k^*_{L+1,dec}$ (A) and $k^*_{L+1,dec}$ (B) generated from the key information $k^*_L$ are constructed as shown in Formula 182.

[Formula 182]

$$k^*_{L+1,dec}(A) :=$$

$$k^*_{L,dec} + \sum_{i=1}^{L+1} \alpha_{A,i} k^*_{L,ran,i} + \sigma_A \left( \sum_{i=\mu_L+1}^{\mu_{L+1}} v_i k^*_{L,del,i} \right) := \sum_{t=1}^{L} \sigma_{0,t} \left( \sum_{i=\mu_{t-1}+1}^{\mu_t} v_i b^*_i \right) +$$

$$\sum_{i=1}^{L+1} \alpha_{A,i} k^*_{L,ran,i} + \sigma_A \left( \sum_{i=\mu_L+1}^{\mu_{L+1}} v_i k^*_{L,del,i} \right) + \eta_0 b^*_{n+1} + (1-\eta_0) b^*_{n+2}$$

$$k^*_{L+1,dec}(B) := k^*_{L,dec} + \sum_{i=1}^{L+1} \alpha_{B,i} k^*_{L,ran,i} + \sigma_B \left( \sum_{i=\mu_L+1}^{\mu_{L+1}} v_i k^*_{L,del,i} \right) :=$$

$$\sum_{t=1}^{L} \sigma_{0,t} \left( \sum_{i=\mu_{t-1}+1}^{\mu_t} v_i b^*_i \right) + \sum_{i=1}^{L+1} \alpha_{A,i} k^*_{L,ran,i} +$$

$$\sigma_B \left( \sum_{i=\mu_L+1}^{\mu_{L+1}} v_i k^*_{L,del,i} \right) + \eta_0 b^*_{n+1} + (1-\eta_0) b^*_{n+2}$$

That is, when the randomizing vector is used, the randomizing vector $k^*_{L,ran,i}$ in which the coefficient is uniformly distributed by the random number $\alpha_{A,i}$ is added to the key vector $k^*_{L+1,dec}$ (A). The randomizing vector $k^*_{L,ran,i}$ in which the coefficient is uniformly distributed by the random number $\alpha_{B,i}$ is added to the key vector $k^*_{L+1,dec}$ (B). The randomizing vector $k^*_{L,ran,i}$ includes the basis vector $b^*_i$ (i=1, ..., $\mu_L$). Thus, in the key vectors $k^*_{L+1,dec}$ (A) and $k^*_{L+1,dec}$ (B), the coefficient of the basis vector $b^*_i$ (i=1, ..., $\mu_L$) is uniformly distributed. That is, the coefficient of the basis vector $b^*_i$ (i=1, ..., $\mu_L$) in which predicate information is set is different between the key vectors $k^*_{L+1,dec}$ (A) and $k^*_{L+1,dec}$ (B).

In the above description, the cryptographic processes are implemented in the N(=n+2+r+s)-dimensional vector spaces. For the cryptographic processes without delegation, n is an integer of 1 or greater. For the cryptographic processes with delegation, n is an integer of 2 or greater. Moreover, r is an integer of 0 or greater, and is an integer of 1 or greater.

When r is 0, random elements are not added to the key vector $k^*_{L,dec}$, the randomizing vector $k^*_{L,ran,j}$ (j=1, ..., L+1), and the key-generation vector $k^*_{L,del,j}$ (j=$\mu_L$+1, ..., n).

As described above, in (S402), it is not essential that the encryption device 200 generates the vector rv by using the basis vector $b_{n+2}$. When the vector rv is not generated, the cryptographic processes can be implemented in N (=n+1+r+s)-dimensional vector spaces.

Thus, for the cryptographic processes without delegation, N is an integer of 2 or greater. For the cryptographic processes with delegation, N is an integer of 3 or greater.

In the cryptographic processes described above, distortion maps which have been described as one of the conditions of DPVS are not used. Distortion maps are used not in the algorithms for implementing the cryptographic processes, but for proving the security of the cryptographic processes. Thus, the cryptographic processes described above can be established in spaces without distortion maps. That is, it is not essential that there exist distortion maps in spaces for implementing the cryptographic processes described above. The same applies to the cryptographic processes to be described below.

The HPE scheme has been described above. The HPKEM scheme will now be described. Only portions of the HPKEM scheme that are different from the above HPE scheme will be described.

Figure 17:
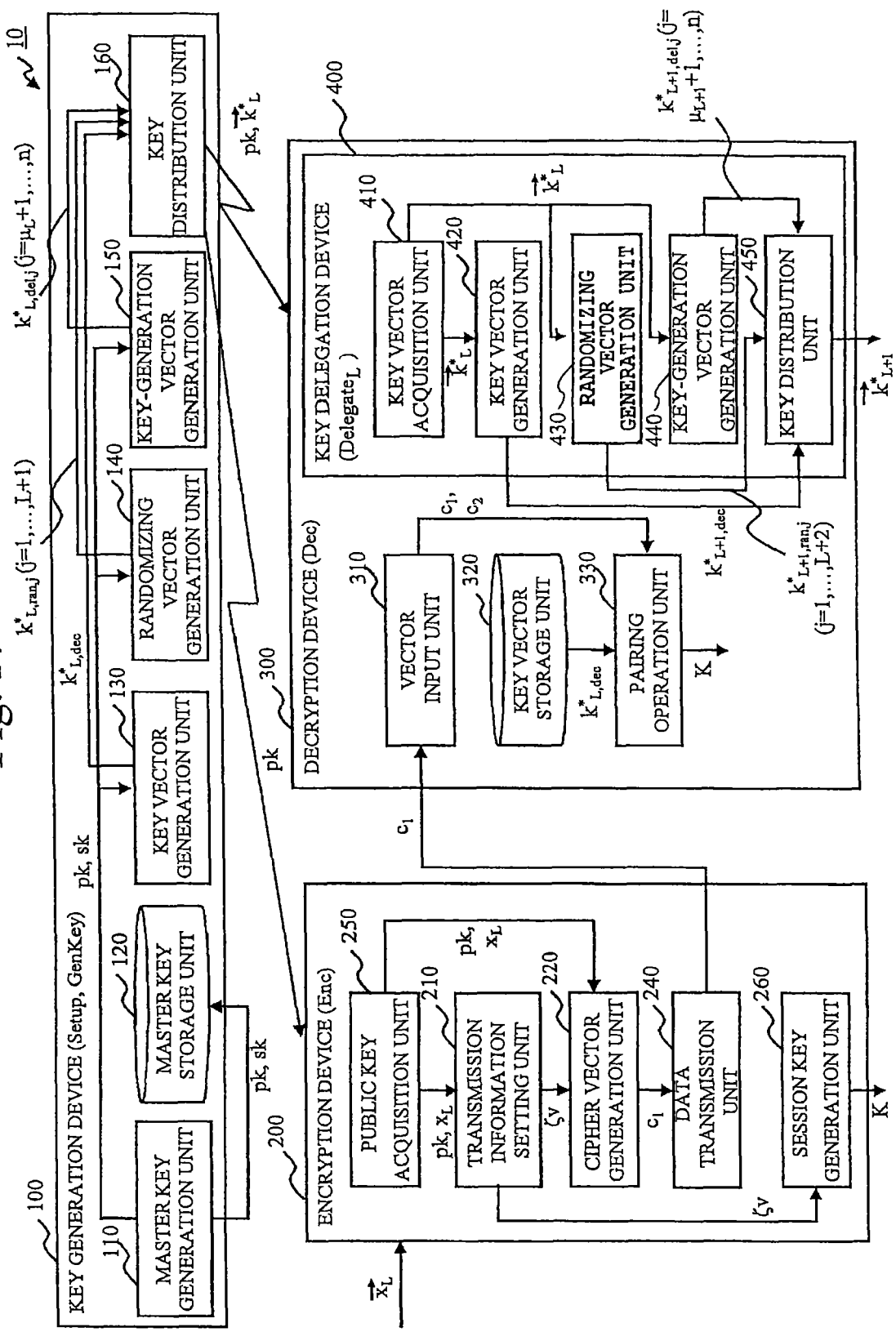
FIG. 17 is a functional block diagram showing functions of the cryptographic processing system 10 that implements a hierarchical predicate key encapsulation mechanism (HPKEM) scheme according to the second embodiment.

FIG. 17 is a functional block diagram showing functions of the cryptographic processing system 10 that implements the HPKEM scheme.

The processing steps of the key generation device 100 and the processing steps of the key delegation device 400 are the same as those of the HPE scheme described above. Thus, only the processing steps of the encryption device 200 and the processing steps of the decryption device 300 will be described.

Figure 18:
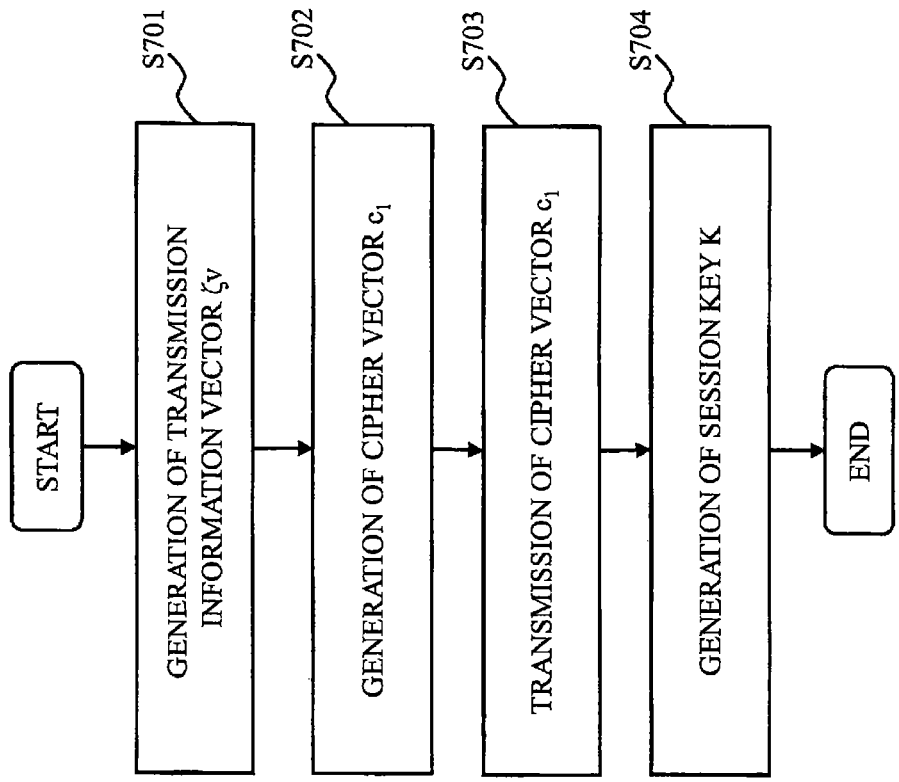
FIG. 18 is a flowchart showing operations of the encryption device 200 according to the second embodiment.
Figure 19:
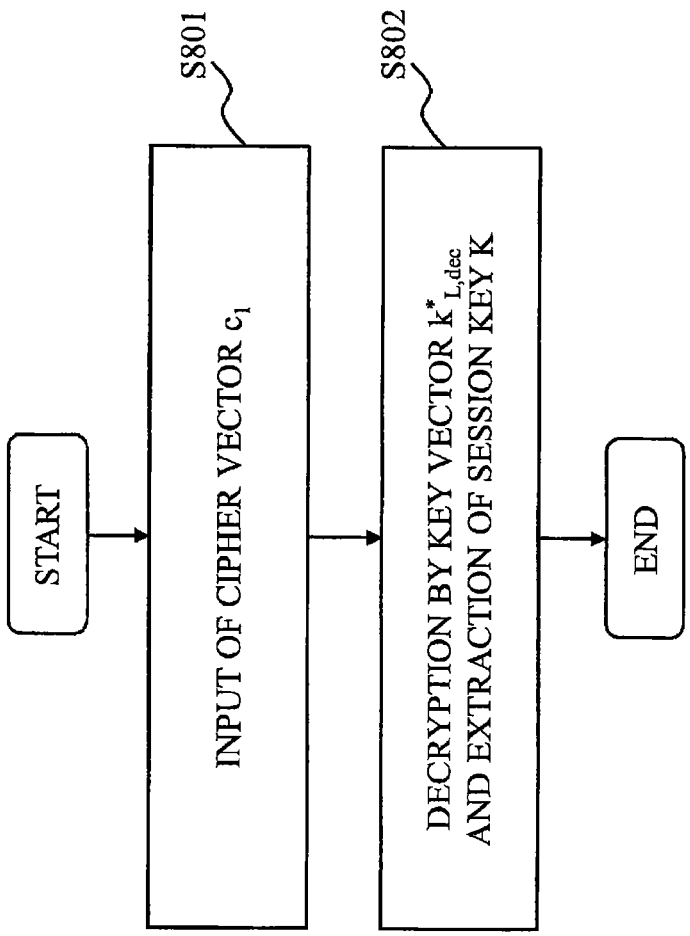
FIG. 19 is a flowchart showing operations of the decryption device 300 according to the second embodiment.

FIG. 18 is a flowchart showing operations of the encryption device 200. FIG. 19 is a flowchart showing operations of the decryption device 300.

The functions and operations of the encryption device 200 will be described.

The encryption device 200 shown in FIG. 17 includes a session key generation unit 260, in addition to the functions included in the encryption device 200 shown in FIG. 11. The encryption device 200 shown in FIG. 17 does not include the cipher information generation unit 230 included in the encryption device 200 shown in FIG. 11.

(S701) and (S702) are the same as (S401) and (S402).

In (S703: data transmission step), the cipher vector $c_1$ generated by the cipher vector generation unit 220 in (S702) is transmitted to the decryption device 300 through the communication device. That is, in the HPKEM scheme, cipher information $c_2$ in which a message m is embedded is not generated and is not transmitted to the decryption device 300.

In (S704: session key generation step), using the processing device, the session key generation unit 260 computes Formula 183 to generate a session key K.

$$K := g_T^\zeta \qquad \text{[Formula 183]}$$

where $g_T = e(a_i, a_i^*) \neq 1$.

To summarize, the encryption device 200 executes the Enc algorithm shown in Formula 184 to generate the cipher vector $c_1$ and the session key K.

[Formula 184]

$$Enc(pk, (\vec{x}_1, \ldots, \vec{x}_L) := ((x_1, \ldots, x_{\mu_1}), \ldots, (x_{\mu_{L-1}+1}, \ldots, x_{\mu_L}))):$$

$$(\vec{x}_{L+1}, \ldots, \vec{x}_d) \xleftarrow{U} \mathbb{F}_q \mu_{L+1} - \mu_L \times \ldots \times \mathbb{F}_q n - \mu_{d-1},$$

$$\delta_1, \ldots, \delta_d, \delta_{n+3}, \zeta \xleftarrow{U} \mathbb{F}_q,$$

$$c_1 := \sum_{t=1}^{d} \delta_t \left( \sum_{i=\mu_{t-1}+1}^{\mu_t} x_i b_i \right) + \zeta d_{n+1} + \delta_{n+3} b_{n+3}, \, K := g_T^\zeta,$$

return $(c_1, K)$.

The functions and operations of the decryption device 300 will be described.

The configuration of the functions of the decryption device 300 shown in FIG. 17 is the same as that of the decryption device 300 shown in FIG. 11.

(S801: Vector Input Step)

The vector input unit 310 receives through the communication device and inputs the cipher vector $c_1$ transmitted by the data transmission unit 240 of the encryption device 200.

(S802: Decryption Step)

Using the processing device and based on the master public key pk and the key vector $k^*_{L,dec}$ which is the first element of the L-th level secret key, the pairing operation unit 330 computes Formula 185 to generate a session key K.

$$K' := e(c_1, k_{L,dec}^*) \qquad \text{[Formula 185]}$$

That is, using the processing device, the pairing operation unit 330 performs the pairing operation e on the cipher vector $c_1$ input by the vector input unit 310 and the key vector $k^*_{L,dec}$ stored in the storage device by the vector storage unit 320. The pairing operation unit 330 thus computes $g_T^\zeta (=K)$ which is a value concerning $\zeta$ embedded by the encryption device 200.

To summarize, the decryption device 300 executes the Dec algorithm shown in Formula 186 to generate the session key K' (=K).

$$Dec(pk, k_{L,dec}^*, c_1): K' := e(c_1, k_{L,dec}^*), \text{return } K'. \qquad \text{[Formula 186]}$$

As described above, according to the HPKEM scheme, the session key K can be secretly transmitted from the encryption device 200 to the decryption device 300. This means that the session key can be shared between the encryption device 200 and the decryption device 300.

Third Embodiment

In a third embodiment, a PE scheme with delegation which is more generic than the HPE and HPKEM schemes described in the second embodiment will be described.

As described above, in the HPE and HPKEM schemes described in the second embodiment, basis vectors are used as shown in FIG. 16. That is, the n number of basis vectors out of the (n+2+r+s) number of basis vectors are used to represent the hierarchical structure of the basis vectors for attribute vectors and predicate vectors. In particular, a first $\mu_1$ number of basis vectors are used as the basis vectors for the first level attribute vectors and predicate vectors. A ($\mu_2 - \mu_1$) number of basis vectors are used as the basis vectors for the second level attribute vectors and predicate vectors. Likewise, a ($\mu_L - \mu_{L-1}$) number of basis vectors are used as the basis vectors for the L-th level attribute vectors and predicate vectors.

The L-th level key vector $k^*_{L,dec}$ is computed as shown in Formula 164. That is, in the L-th level key vector $k^*_{L,dec}$, each of the predicate vectors is assigned as the coefficient of the basis vector $b^*_i$ (i=1, . . . , L), and 0 is assigned as the coefficient of the basis vector $b^*_i$ (i=L+1, . . . , n).

The L-th level cipher vector $c_1$ is computed as shown in Formula 170. That is, in the L-th level cipher vector $c_1$, each of the attribute vectors is assigned as the coefficient of the basis vector $b_i$ (i=1, . . . , L), and the random number is assigned as the coefficient of the basis vector $b_i$ (i=L+1, . . . , n).

With this arrangement, hierarchical delegation is implemented.

In the PE (PKEM) scheme to be described in the third embodiment, as in the second embodiment, the n number of basis vectors out of the (n+2+r+s) number of basis vectors are used as the basis vectors for attribute vectors and predicate vectors. However, for any key (regardless of level), all of the n number of basis vectors are used as the basis vectors for predicate vectors. That is, all of the n number of basis vectors are always used as the basis vectors for attribute vectors or predicate vectors.

In the key vector $k^*_{L,dec}$, each of the predicate vectors is assigned as the coefficient of the basis vector $b^*_i$ (i=1, ..., n). In the L-th level cipher vector $c_1$, each of the attribute vectors is assigned as the coefficient of the basis vector $b_i$ (i=1, ..., n).

That is, there is no concept of hierarchical structure for the n number of basis vectors. There is also no concept of hierarchical delegation for secret keys. Therefore, more flexible delegation can be realized, compared to the cryptographic processes described in the second embodiment.

First, implementation of the PE scheme with delegation will be described.

Figure 20:
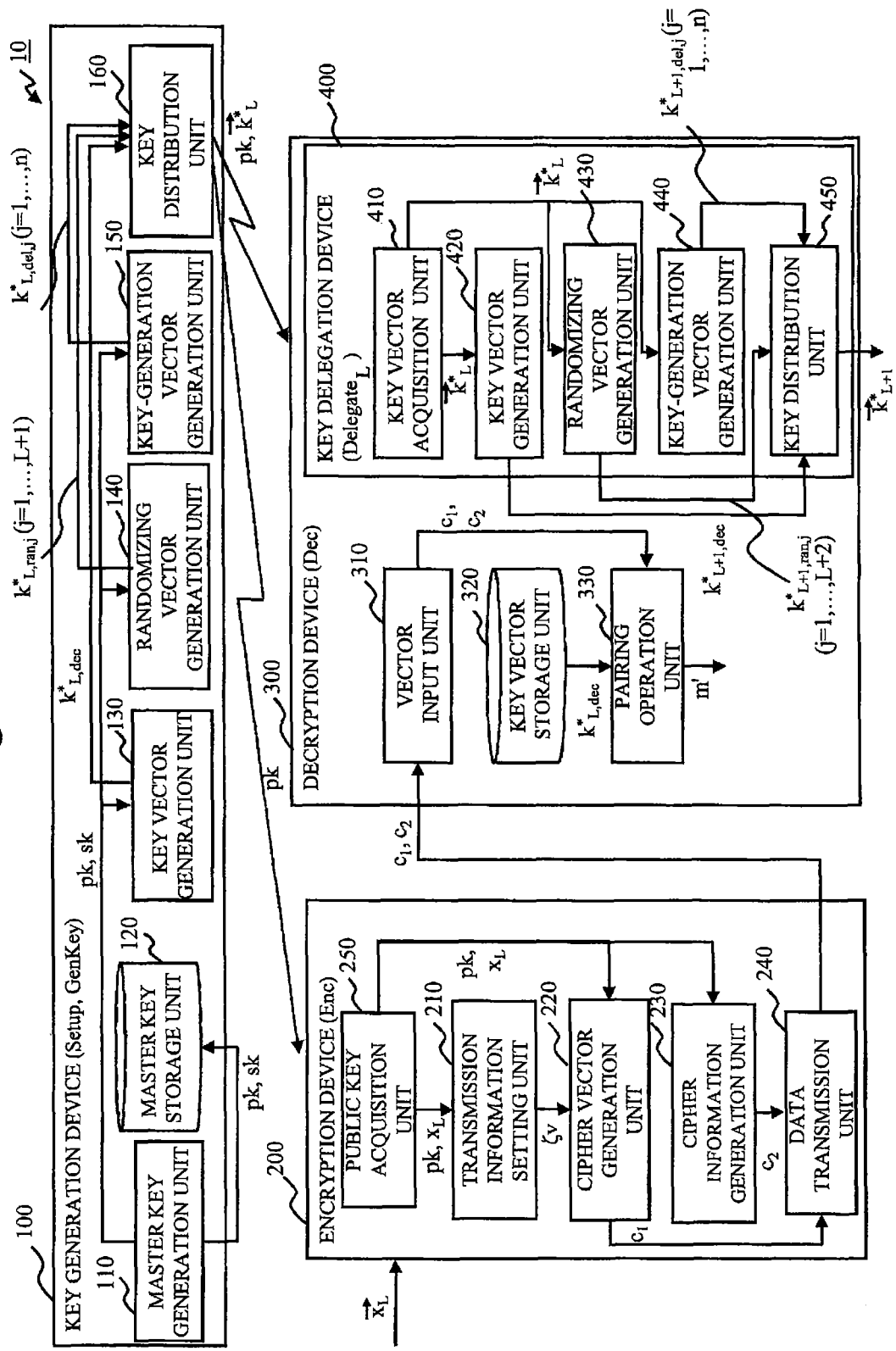
FIG. 20 is a functional block diagram showing functions of the cryptographic processing system 10 that implements a predicate encryption (PE) scheme with delegation capability according to a third embodiment.

FIG. 20 is a functional block diagram showing functions of the cryptographic processing system 10 that implements the PE scheme with delegation. The functions included in the cryptographic processing system 10 shown in FIG. 20 are the same as the functions included in the cryptographic processing system 10 shown in FIG. 11.

The flow of operations of the cryptographic processing system 10 for implementing the PE scheme with delegation according to the third embodiment are the same as the flow of operations of the cryptographic processing system 10 according to the second embodiment. Thus, the functions and operations of the cryptographic processing system 10 according to the third embodiment will be described with reference to FIGS. 20 and 12 to 16.

The functions and operations of the key generation device 100 will be described.

(S301: Master Key Generation Step)

As in (S301) of the second embodiment, using the processing device, the master key generation unit 110 computes Formula 187 to generate a master public key pk and a master secret key sk and stores the keys in the master key storage unit 120.

[Formula 187]

$$\text{Setup}(1^\lambda, \vec{\mu} := n): (\text{param}, \mathbb{B}, \mathbb{B}^*) \xleftarrow{R} \mathcal{G}_{ob}(1^\lambda, n+2+r+s),$$

$$\hat{\mathbb{B}} := (b_1, \ldots, b_n, b_{n+1}, b_{n+2}),$$

$$\text{return } sk := (X, \mathbb{B}^*), \, pk := (1^\lambda, \text{param}, \hat{\mathbb{B}}).$$

where $$\mathcal{G}_{ob}(1^\lambda, N): \text{param} := (q, \mathbb{V}, \mathbb{V}^*, \mathbb{G}_T, \mathbb{A}, \mathbb{A}^*) \xleftarrow{R} \mathcal{G}_{dpvs}(1^\lambda, N),$$

$$X := (\chi_{i,j}) \xleftarrow{U} GL(N, \mathbb{F}_q), \, (\upsilon_{i,j}) := (X^T)^{-1},$$

$$b_i = \sum_{j=1}^N \chi_{i,j} a_j, \, \mathbb{B} := (b_1, \ldots, b_N),$$

$$b_i^* = \sum_{j=1}^N \upsilon_{i,j} a_j^*, \, \mathbb{B}^* := (b_1^*, \ldots, b_N^*),$$

return (param, $\mathbb{B}$, $\mathbb{B}^*$)

(S302: Key Vector $k^*_{L,dec}$ Generation Step)

Using the processing device and based on the master public key pk, the master secret key sk, and predicate vectors $(v_1, \ldots, v_L)$ shown in Formula 188, the key vector generation unit 130 computes Formula 189 to generate a key vector $k^*_{L,dec}$ which is the first element of an L-th level (level L) secret key.

[Formula 188]

$$(\vec{v}_1, \ldots, \vec{v}_L) := ((v_{1,1}, \ldots, v_{1,n}), \ldots, (v_{L,1}, \ldots, v_{L,n}))$$

[Formula 189]

$$\sigma_{dec,t}, \eta_{dec,h} \xleftarrow{U} \mathbb{F}_q \quad (t=1, \ldots, L; h=1, \ldots, r) \quad (1)$$

$$vv := \sum_{t=1}^L \sigma_{dec,t} \left( \sum_{i=1}^n v_{t,i} b_i^* \right) \quad (2)$$

$$rv := \sum_{h=1}^r \eta_{dec,h} b_{n+2+h}^* \quad (3)$$

$$k^*_{L,dec} := \quad (4)$$

$$vv + b_{n+1}^* + rv := \sum_{t=1}^L \sigma_{dec,t} \left( \sum_{i=1}^n v_{t,i} b_i^* \right) + b_{n+1}^* + \sum_{h=1}^r \eta_{dec,h} b_{n+2+h}^*$$

(S303: Randomizing Vector $k^*_{L,ran,j}$ Generation Step)

Based on the master public key pk, the master secret key sk, and the predicate vectors $(v_1, \ldots, v_L)$ shown in Formula 188, the randomizing vector generation unit 140 computes Formula 190 to generate a randomizing vector $k^*_{L,ran,j}$ (j= 1, ..., L+1).

[Formula 190]

$$\sigma_{ran,j,t}, \eta_{ran,j,h} \xleftarrow{U} \mathbb{F}_q \quad (1)$$
$$(j=1, \ldots, L+1; t=1, \ldots, L; h=1, \ldots, r)$$

$$vv_j := \sum_{t=1}^L \sigma_{ran,j,t} \left( \sum_{i=1}^n v_{t,i} b_i^* \right) \, (j=1, \ldots, L+1) \quad (2)$$

$$rv_j := \sum_{h=1}^L \eta_{ran,j,h} b_{n+2+h}^* \, (j=1, \ldots, L+1) \quad (3)$$

$$k^*_{L,ran,j} := vv_j + rv_j := \quad (4)$$

$$\sum_{t=1}^L \sigma_{ran,j,t} \left( \sum_{i=1}^n v_{t,i} b_i^* \right) + \sum_{h=1}^r \eta_{ran,j,h} b_{n+2+h}^* \, (j=1, \ldots, L+1)$$

(S304: Key-Generation Vector $k^*_{L,del,j}$ Generation Step)

Using the processing device and based on the master public key pk, the master secret key sk, and the predicate vectors $(v_1, \ldots, v_L)$ shown in Formula 188, the key-generation vector generation unit 150 computes Formula 191 to generate a key-generation vector $k^*_{L,del,j}$ j=1, ..., n).

[Formula 191]

$$\sigma_{del,j,t}, \eta_{del,j,h}, \psi \xleftarrow{U} \mathbb{F}_q \quad (1)$$
$$(j=1, \ldots, n; t=1, \ldots, L; h=1, \ldots, r)$$

$$vv_j := \sum_{t=1}^L \sigma_{del,j,t} \left( \sum_{i=1}^n v_{t,i} b_i^* \right) \, (j=1, \ldots, n) \quad (2)$$

$$\psi v_j := \psi b_j^* \, (j=1, \ldots, n) \quad (3)$$

$$rv_j := \sum_{h=1}^r \eta_{del,j,h} b_{n+2+h}^* \, (j=1, \ldots, n) \quad (4)$$

-continued $$k^*_{L,del,j} := vv_j + \psi v_j + rv_j :=$$ (5)

$$\sum_{t=1}^{L} \sigma_{del,j,t}\left(\sum_{i=1}^{n} v_{t,i}b^*_i\right) + \psi b^*_j + \sum_{h=1}^{r} \eta_{del,j,h}b^*_{n+2+h} \quad (j=1,\ldots,n)$$

To summarize, in (S302) to (S304), using the processing device, the key vector generation unit 130, the randomizing vector generation unit 140, and the key-generation vector generation unit 150 execute the GenKey algorithm shown in Formula 192. This generates the L-th level secret key (key information $k^*_L$) including the key vector $k^*_{L,dec}$, the randomizing vector $k^*_{L,ran,j}$ (j=1, . . . , L+11), and the key-generation vector $k^*_{L,del,j}$ (j=1, . . . , n).

[Formula 192]

$$GenKey(pk, sk, (\vec{v}_1, \ldots, \vec{v}_L)) := ((v_{1,1}, \ldots, v_{1,n}), \ldots, (v_{L,1}, \ldots, v_{L,n})):$$

$$\sigma_{dec,t}, \eta_{dec,h}, \sigma_{ran,j,t}, \eta_{ran,j,h}(j=1,\ldots,L+1),$$

$$\sigma_{del,j,t}, \eta_{del,j,h}(j=1,\ldots,n), \psi \xleftarrow{U} \mathbb{F}_q$$

for $t = 1, \ldots, L; h = 1, \ldots, r,$ $$k^*_{L,dec} := \sum_{t=1}^{L} \sigma_{dec,t}\left(\sum_{i=1}^{n} v_{t,i}b^*_i\right) + b^*_{n+1} + \sum_{h=1}^{r} \eta_{dec,h}b^*_{n+2+h},$$

$$k^*_{L,ran,j} := \sum_{t=1}^{L} \sigma_{ran,j,t}\left(\sum_{i=1}^{n} v_{t,i}b^*_i\right) + \sum_{h=1}^{r} \eta_{ran,j,h}b^*_{n+2+h} \text{ for } j=1,\ldots,L+1,$$

$$k^*_{L,del,j} := \sum_{t=1}^{L} \sigma_{del,j,t}\left(\sum_{i=1}^{n} v_{t,i}b^*_i\right) + \psi b^*_j + \sum_{h=1}^{r} \eta_{del,j,h}b^*_{n+2+h}$$

for $j = 1, \ldots, n,$ return $k^*_L := (k^*_{L,dec}, k^*_{L,ran,1}, \ldots, k^*_{L,ran,L+1}, k^*_{L,del,1}, \ldots, k^*_{L,del,n}).$ (S305: Key Distribution Step)
As in (S305) of the second embodiment, the key distribution unit 160 transmits the master public key generated by the master key generation unit 110 and the key information $k^*_L$ generated by the key vector generation unit 130, the randomizing vector generation unit 140, and the key-generation vector generation unit 150 to the decryption device 300 through the communication device. The key distribution unit 160 transmits the master public key to the encryption device 200 through the communication device.

The functions and operations of the encryption device 200 will be described.

(S401: Transmission Information Setting Step)
As in (S401) of the second embodiment, using the processing device and based on the master public key pk, the transmission information setting unit 210 computes Formula 193 to generate a transmission information vector ζv.

[Formula 193]

$$\zeta \xleftarrow{U} \mathbb{F}_q$$ (1)

$$\zeta v := \zeta b_{n+1}$$ (2)

(S402: Cipher Vector $c_1$ Generation Step)
Using the processing device and based on the master public key pk and attribute vectors $(x_1, \ldots, x_L)$ shown in Formula 194, the cipher vector generation unit 220 computes Formula 195 to generate a cipher vector $c_1$.

[Formula 194]

$$(\vec{x}_1, \ldots, \vec{x}_L) := ((x_{1,1}, \ldots, x_{1,n}), \ldots, (x_{L,1}, \ldots, x_{L,n}))$$

[Formula 195]

$$\delta_1, \ldots, \delta_L, \delta_{n+2}, \zeta \xleftarrow{U} \mathbb{F}_q$$ (1)

$$xv := \sum_{t=1}^{L} \delta_t\left(\sum_{i=1}^{n} x_{t,i}b_i\right)$$ (2)

$$rv := \delta_{n+2}b_{n+2}$$ (3)

$$c_1 := xv + \zeta v + rv := \sum_{t=1}^{L} \delta_t\left(\sum_{i=1}^{n} x_{t,i}b_i\right) + \zeta b_{n+1} + \delta_{n+2}b_{n+2}$$ (4)

(S403: Cipher Information $c_2$ Generation Step)
As in (S403) of the second embodiment, using the processing device and based on a message m, the cipher information generation unit 230 computes Formula 196 to generate cipher information $c_2$.

$$c_2 := g_T^\zeta m$$ [Formula 196]

(S404: Data Transmission Step)
As in (S404) of the second embodiment, the data transmission unit 240 transmits the cipher vector $c_1$ generated by the cipher vector generation unit 220 and the cipher information $c_2$ generated by the cipher information generation unit 230 to the decryption device 300 through the communication device.

To summarize, the encryption device 200 executes the Enc algorithm shown in Formula 197 to generate the cipher vector $c_1$ and the cipher information $c_2$.

[Formula 197]

$$Enc(pk, m \in \mathbb{G}_T,$$

$$(\vec{x}_1, \ldots, \vec{x}_L) := ((x_{1,1}, \ldots, x_{1,n}), \ldots, (x_{L,1}, \ldots, x_{L,n}))):$$

$$\delta_1, \ldots, \delta_L, \delta_{n+2}, \zeta \xleftarrow{U} \mathbb{F}_q,$$

$$c_1 := \sum_{t=1}^{L} \delta_t\left(\sum_{i=1}^{n} x_{t,i}b_i\right) + \zeta b_{n+1} + \delta_{n+2}b_{n+2}, c_2 := g_T^\zeta m,$$

return $(c_1, c_2).$

The functions and operations of the decryption device 300 will be described.

(S501: Vector Input Step)
As in (S501) of the second embodiment, the vector input unit 310 receives through the communication device and inputs the cipher vector $c_1$ and the cipher information $c_2$ transmitted by the data transmission unit 240 of the encryption device 200.

(S502: Decryption Step)
As in (S502) of the second embodiment, using the processing device and based on the master public key pk and the key vector $k^*_{L,dec}$ which is the first element of the L-th level secret key, the pairing operation unit 330 computes Formula 198 to generate a message m'.

$$m' := c_2/e(c_1, k^*_{L,dec})$$ [Formula 198]

If $x_i \cdot v_j = 0$ holds for the attribute vector $x_i$ ($i=1, \ldots, h$) used by the encryption device 200 for encryption and the predicate vector $v_j$ ($j=1, \ldots, L$) of the key vector used by the decryption device 300 for decryption for every $i$ of ($i=1, \ldots, h$) and every $j$ of ($j=1, \ldots, L$), then the pairing operation unit 330 can generate the message m. It is assumed that the message $m \in G_T$.

To summarize, the decryption device 300 executes the Dec algorithm shown in Formula 199 to generate the message m'.

$$\text{Dec}(pk, k^*_{L,dec}, c_1, c_2) : m' := c_2/e(c_1, k^*_{L,dec}),$$

return m'. [Formula 199]

The functions and operations of the key delegation device 400 will be described.

(S601: Key Information $k^*_L$ Acquisition Step)

As in (S601) of the second embodiment, the key vector acquisition unit 410 obtains through the communication device the L-th level secret key (key information $k^*_L$) including the key vector $k^*_{L,dec}$ which is the first element of the L-th level secret key, the randomizing vector $k^*_{L,ran,j}$ ($j=1, \ldots, L+1$), and the key-generation vector $k^*_{L,del,j}$ ($j=1, \ldots, n$).

(S602: Key Vector $k^*_{L+1,dec}$ Generation Step)

Using the processing device and based on the master public key pk, the key information $k^*_L$, and a predicate vector $v_{L+1}$ shown in Formula 200, the key vector generation unit 420 computes Formula 201 to generate a key vector $k^*_{L+1,dec}$ which is the first element of an (L+1)-th level secret key.

[Formula 200]

$$\vec{v}_{L+1} := (v_{L+1,1}, \ldots, v_{L+1,n})$$

[Formula 201]

$$\alpha_{dec,t}, \sigma_{dec} \xleftarrow{U} \mathbb{F}_q \ (t = 1, \ldots, L+1) \quad (1)$$

$$rv := \sum_{t=1}^{L+1} \alpha_{dec,t} k^*_{L,ran,t} \quad (2)$$

$$vv := \sigma_{dec}\left(\sum_{i=1}^{n} v_{L+1,i} k^*_{L,del,i}\right) \quad (3)$$

$$k^*_{L+1,dec} := \quad (4)$$

$$k^*_{L,dec} + rv + vv := k^*_{L,dec} + \sum_{t=1}^{L+1} \alpha_{dec,t} k^*_{L,ran,t} + \sigma_{dec}\left(\sum_{i=1}^{n} v_{L+1,i} k^*_{L,del,i}\right)$$

(S603: Randomizing Vector $k^*_{L+1,ran,j}$ Generation Step)

Based on the master public key pk, the key information $k^*_L$, and the predicate vector $v_{L+1}$ shown in Formula 200, the randomizing vector generation unit 430 computes Formula 202 to generate a randomizing vector $k^*_{L+1,ran,j}$ ($j=1, \ldots, L+2$).

[Formula 202]

$$\alpha_{ran,j,t}, \sigma_{ran,j} \xleftarrow{U} \mathbb{F}_q \ (j=1, \ldots, L+2; t=1, \ldots, L+1) \quad (1)$$

$$rv_j := \sum_{t=1}^{L+1} \alpha_{ran,j,t} k^*_{L,ran,t} \ (j=1, \ldots, L+2) \quad (2)$$

$$vv_j := \sigma_{ran,j}\left(\sum_{i=1}^{n} v_{L+1,i} k^*_{L,del,i}\right) \ (j=1, \ldots, L+2) \quad (3)$$

$$k^*_{L+1,ran,j} := rv_j + vv_j := \quad (4)$$

$$\sum_{t=1}^{L+1} \alpha_{ran,j,t} k^*_{L,ran,t} + \sigma_{ran,j}\left(\sum_{i=1}^{n} v_{L+1,i} k^*_{L,del,i}\right) \ (j=1, \ldots, L+2)$$

(S604: Key-Generation Vector $k^*_{L+1,del,j}$ Generation Step)

Using the processing device and based on the master public key pk, the key information $k^*_L$, and the predicate vector $v_{L+1}$ shown in Formula 200, the key-generation vector generation unit 440 computes Formula 203 to generate a key-generation vector $k^*_{L+1,del,j}$ ($j=1, \ldots, n$).

[Formula 203]

$$\alpha_{del,j,t}, \sigma_{del,j}, \psi' \xleftarrow{U} \mathbb{F}_q \ (j=1, \ldots, n; i=1, \ldots, L+1) \quad (1)$$

$$rv_j := \sum_{t=1}^{L+1} \alpha_{del,j,t} k^*_{L,del,t} \ (j=1, \ldots, n) \quad (2)$$

$$vv_j := \sigma_{del,j}\left(\sum_{i=1}^{n} v_{L+1,i} k^*_{L,del,i}\right) \ (j=1, \ldots, n) \quad (3)$$

$$\psi v_j := \psi' k^*_{L,del,j} \ (j=1, \ldots, n) \quad (4)$$

$$k^*_{L+1,del,j} := rv_j + vv_j + \psi v_j := \quad (5)$$

$$\sum_{t=1}^{L+1} \alpha_{del,j,t} k^*_{L,del,t} + \sigma_{del,j}\left(\sum_{i=1}^{n} v_{L+1,i} k^*_{L,del,i}\right) + \psi' k^*_{L,del,j} \ (j=1, \ldots, n)$$

To summarize, in (S602) to (S604), using the processing device, the key vector generation unit 420, the randomizing vector generation unit 430, and the key-generation vector generation unit 440 execute the Delegate$_L$ algorithm shown in Formula 204 to generate the (L+1)-th level secret key (key information $k^*_{L+1}$) including the key vector $k^*_{L+1,dec}$, the randomizing vector $k^*_{L+1,ran,j}$ ($j=1, \ldots, L+2$), and the key-generation vector $k^*_{L+1,del,j}$ ($j=1, \ldots, n$).

[Formula 204]

$$\text{Delegate}_L\left(pk, \vec{k}^*_L, \vec{v}_{L+1} := (v_{L+1,1}, \ldots, v_{L+1,n})\right):$$

$$\alpha_{dec,t}, \sigma_{dec}, \alpha_{ran,j,t}, \sigma_{ran,j} (j=1, \ldots, L+2),$$

$$\alpha_{del,j,t}, \sigma_{del,j} (j=1, \ldots, n), \psi' \xleftarrow{U} \mathbb{F}_q \text{ for } t=1, \ldots, L+1,$$

$$k^*_{L+1,dec} := k^*_{L,dec} + \sum_{t=1}^{L+1} \alpha_{dec,t} k^*_{L,ran,t} + \sigma_{dec}\left(\sum_{i=1}^{n} v_{L+1,i} k^*_{L,del,i}\right),$$

$$k^*_{L+1,ran,j} := \sum_{t=1}^{L+1} \alpha_{ran,j,t} k^*_{L,ran,t} + \sigma_{ran,j}\left(\sum_{i=1}^{n} v_{L+1,i} k^*_{L,del,i}\right)$$

for $j = 1, \ldots, L+2$, $$k^*_{L+1,del,j} := \sum_{t=1}^{L+1} \alpha_{del,j,t} k^*_{L,del,t} + \sigma_{del,j}\left(\sum_{i=1}^{n} v_{L+1,i} k^*_{L,del,i}\right) + \psi' k^*_{L,del,j}$$

for $j = 1, \ldots, n$, return $\vec{k}^*_{L+1} :=$ $$(k^*_{L+1,dec}, k^*_{L+1,ran,1}, \ldots, k^*_{L+1,ran,L+2}, k^*_{L+1,del,1}, \ldots k^*_{L+1,del,n}).$$

(S605: Key Distribution Step)

As in (S605) of the second embodiment, the key distribution unit 450 transmits the key information $k^*_{L+1}$ generated by the key vector generation unit 420, the randomizing vector generation unit 430, and the key-generation vector generation unit 440 to the decryption device 300 of a lower level through the communication device.

As described above, if $x_i \cdot v_j = 0$ holds for the attribute vector $x_i$ (i=1, ..., h) used by the encryption device 200 for encryption and the predicate vector $v_j$ (j=1, ..., L) of the key vector $k^*_{L,dec}$ used by the decryption device 300 for decryption for every i of (i=1, ..., h) and every j of (j=1, ..., L), then the decryption device 300 succeeds in decryption. That is, when the key vector $k^*_{1,dec}$ generated based on the predicate vector ($v_1$) is used for decryption, the decryption device 300 succeeds in decryption if $x \cdot v_1 = 0$. When the key vector $k^*_{2,dec}$ generated based on the predicate vectors ($v_1, v_2$) is used for decryption, the decryption device 300 succeeds in decryption if $x \cdot v_1 = 0$ and $x \cdot v_2 = 0$. That is, as with the algorithms described in the second embodiment, the lower level key vector $k^*_{2,dec}$ has more limited capabilities than the higher level key vector $k^*_{1,dec}$.

As in the second embodiment, the HPKEM scheme may also be implemented by modifying the Enc algorithm executed by the encryption device 200 and the Dec algorithm executed by the decryption device 300 as shown in Formula 205 and Formula 206 respectively.

[Formula 205]

$$Enc(pk, (\vec{x}_1, \ldots, \vec{x}_L) := ((x_{1,1}, \ldots, x_{1,n}), \ldots, (x_{L,1}, \ldots, x_{L,n}))):$$

$$\delta_1, \ldots, \delta_L, \delta_{n+2}, \zeta \xleftarrow{U} \mathbb{F}_q,$$

$$c_1 := \sum_{t=1}^{L} \delta_t \left( \sum_{i=1}^{n} x_{t,i} b_i \right) + \zeta b_{n+1} + \delta_{n+2} b_{n+2}, K := g_T^\zeta,$$

return $(c_1, K)$.

[Formula 206]

$Dec(pk, k^*_{L,dec}, c_1): K' := e(c_1, k^*_{L,dec}),$ return $K'$.

Fourth Embodiment

In the above embodiments, the methods for implementing the cryptographic processes in dual vector spaces have been described. In this embodiment, a method for implementing the cryptographic processes in dual modules will be described.

That is, in the above embodiments, the cryptographic processes are implemented in cyclic groups of prime order q. However, when a ring R is expressed using a composite number M as shown in Formula 207, the cryptographic processes described in the above embodiments can be adapted to a module having the ring R as the coefficient.

$$\mathbb{R} := \mathbb{Z}/M\mathbb{Z} \quad \text{[Formula 207]}$$

where
$\mathbb{Z}$: integer,
M: composite number.

For example, when the HPE scheme described in the second embodiment is implemented in the module having the ring R as the coefficient, it is expressed as shown in Formulas 208 to 212.

[Formula 208]

$Setup(1^\lambda, \vec{\mu} := (n, d; \mu_1, \ldots, \mu_d)):$ $(param, \mathbb{B}, \mathbb{B}^*) \xleftarrow{R} \mathcal{G}_{ob}(1^\lambda, n + 2 + r + s),$ $\hat{\mathbb{B}} := (b_1, \ldots, b_n, b_{n+1}, b_{n+2}),$ return $sk := (X, \mathbb{B}^*), pk := (1^\lambda, param, \hat{\mathbb{B}}).$ where $\mathcal{G}_{ob}(1^\lambda, N): param := (M, \mathbb{V}, \mathbb{V}^*, \mathbb{G}_T, \mathbb{A}, \mathbb{A}^*) \xleftarrow{R} \mathcal{G}_{dpvs}(1^\lambda, N),$ $X := (\chi_{i,j}) \xleftarrow{U} GL(N, \mathbb{R}), (v_{i,j}) := (X^T)^{-1},$ $b_i = \sum_{j=1}^{N} \chi_{i,j} a_j, \mathbb{B} := (b_1, \ldots, b_N),$ $b_i^* = \sum_{j=1}^{N} v_{i,j} a_j^*, \mathbb{B}^* := (b_1^*, \ldots, b_N^*),$ return $(param, \mathbb{B}, \mathbb{B}^*)$

[Formula 209]

$GenKey(pk, sk, (\vec{v}_1, \ldots, \vec{v}_L)) :=$ $((v_1, \ldots, v_{\mu_1}), \ldots, (v_{\mu_{L-1}+1}, \ldots, v_{\mu_L})):$ $\sigma_{j,i}, \psi, \eta_{j,h} \xleftarrow{U} \mathbb{R}$ for $j = 0, \ldots, L+1, \mu_L + 1, \ldots, n; i = 1, \ldots, L; h = 1, \ldots, r$ $k^*_{L,dec} := \sum_{t=1}^{L} \sigma_{0,t} \left( \sum_{i=\mu_{t-1}+1}^{\mu_t} v_i b_i^* \right) + \sum_{h=1}^{r} \eta_{0,h} b^*_{n+2+h},$ $k^*_{L,ran,j} := \sum_{t=1}^{L} \sigma_{j,t} \left( \sum_{i=\mu_{t-1}+1}^{\mu_t} v_i b_i^* \right) + \sum_{h=1}^{r} \eta_{j,h} b^*_{n+2+h}$ for $j = 1, \ldots, L+1,$ $k^*_{L,del,j} := \sum_{t=1}^{L} \sigma_{j,t} \left( \sum_{i=\mu_{t-1}+1}^{\mu_t} v_i b_i^* \right) + \psi b_j^* + \sum_{h=1}^{r} \eta_{j,h} b^*_{n+2+h}$ for $j = \mu_L + 1, \ldots, n,$ return $\vec{k}^*_L := (k^*_{L,0}, \ldots, k^*_{L,L+1}, k^*_{L,\mu_L+1}, \ldots, k^*_{L,n}).$

[Formula 210]

$Enc(pk, m \in \mathbb{G}_T,$ $(\vec{x}_1, \ldots, \vec{x}_L) := ((x_1, \ldots, x_{\mu_1}), \ldots, (x_{\mu_{L-1}+1}, \ldots, x_{\mu_L}))):$ $(\vec{x}_{L+1}, \ldots, \vec{x}_d) \xleftarrow{U} \mathbb{R}\mu_{L+1} - \mu_L \times \ldots \times \mathbb{R}n - \mu_{d-1},$ $\delta_1, \ldots, \delta_d, \delta_{n+2}, \zeta \xleftarrow{U} \mathbb{R},$ $c_1 := \sum_{t=1}^{d} \delta_t \left( \sum_{i=\mu_{t-1}+1}^{\mu_t} x_i b_i \right) + \zeta b_{n+1} + \delta_{n+2} b_{n+2}, c_2 := g_T^\zeta m,$ return $(c_1, c_2).$

[Formula 211]

$Dec(pk, k^*_{L,dec}, c_1, c_2): m' := c_2 / e(c_1, k^*_{L,dec}),$ return $m'.$

-continued

[Formula 212]

$$\text{Delegate}_L(pk, \vec{k}^*_L, \vec{v}_{L+1} := (v_{\mu_L+1}, \ldots, v_{\mu_{L+1}})):$$

$$\alpha_{j,i}, \sigma_j, \psi' \xleftarrow{U} \mathbb{R} \text{ for } j = 0, \ldots, L+2, \mu_{L+1}+1, \ldots, n; i = 1, \ldots, L+1$$

$$k^*_{L+1,dec} := k^*_{L,dec} + \sum_{i=1}^{L+1} \alpha_{0,i} k^*_{L,ran,i} + \sigma_0 \left( \sum_{i=\mu_L+1}^{\mu_{L+1}} v_i k^*_{L,del,i} \right),$$

$$k^*_{L+1,ran,j} := \sum_{i=1}^{L+1} \alpha_{j,i} k^*_{L,ran,i} + \sigma_j \left( \sum_{i=\mu_L+1}^{\mu_{L+1}} v_i k^*_{L,del,i} \right)$$

for $j = 0, \ldots, L+2$, $$k^*_{L+1,del,j} := \sum_{i=1}^{L+1} \alpha_{j,i} k^*_{L,ran,i} + \sigma_j \left( \sum_{i=\mu_L+1}^{\mu_{L+1}} v_i k^*_{L,del,i} \right) + \psi' k^*_{L,del,j}$$

for $j = \mu_{L+1}+1, \ldots, n$, $$\text{return } \vec{k}^*_{L+1} := (k^*_{L+1,0}, \ldots, k^*_{L+1,L+2}, k^*_{L+1,\mu_{L+1}+1}, \ldots k^*_{L+1,n}).$$

In this embodiment, only the method for implementing the HPE scheme of the second embodiment in the module having the ring R as the coefficient has been described. However, in principle, the processes described for the field $F_q$ in the above embodiments can be implemented in the module having the ring R as the coefficient by replacing the field $F_q$ with the ring R.

A hardware configuration of the cryptographic processing system 10 (the key generation device 100, the encryption device 200, the decryption device 300, and the key delegation device 400) according to the embodiments will now be described.

Figure 21:
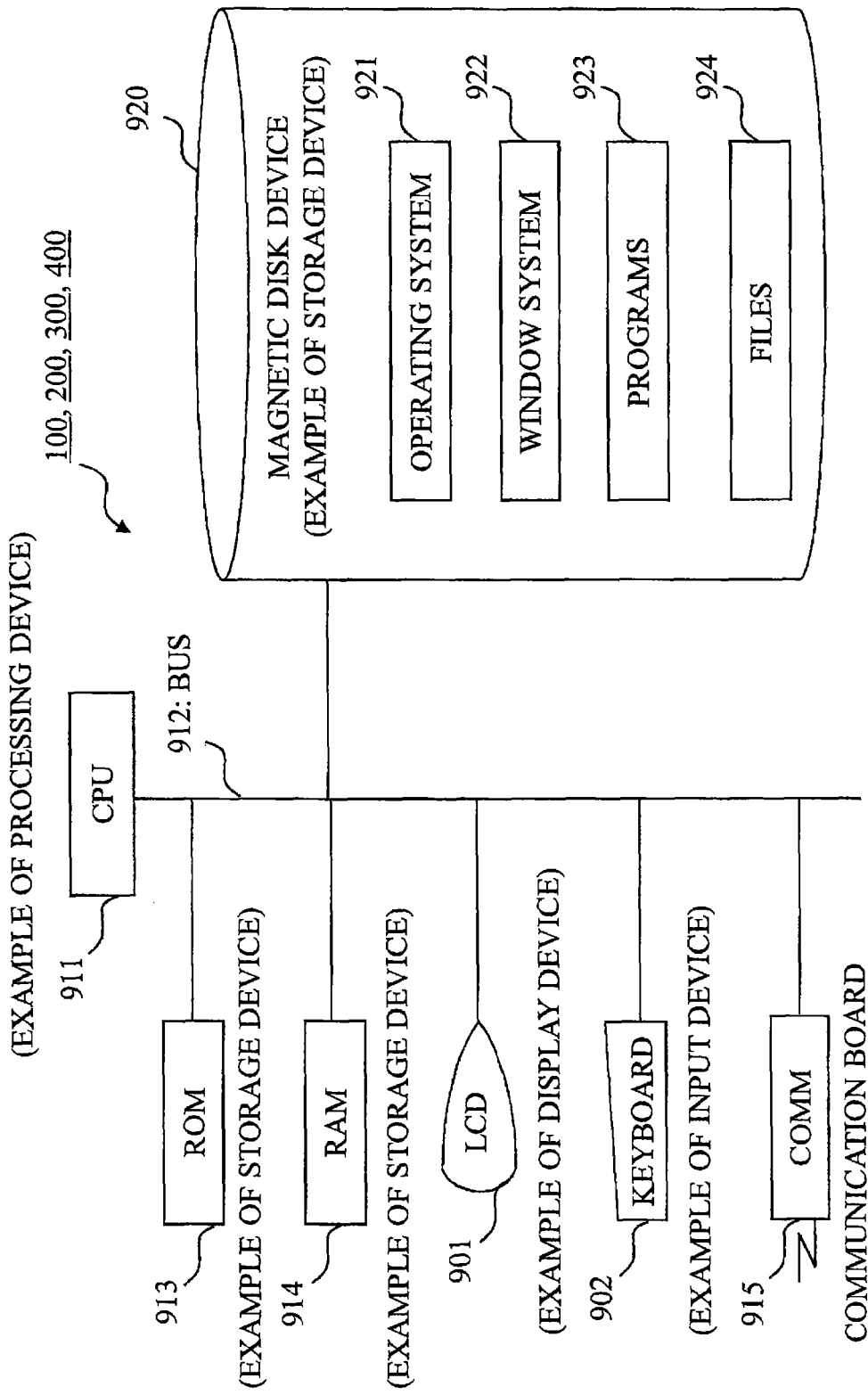
FIG. 21 is a diagram showing an example of a hardware configuration of the key generation device 100, the encryption device 200, the decryption device 300, and the key delegation device 400.

FIG. 21 is a diagram showing an example hardware configuration of the key generation device 100, the encryption device 200, the decryption device 300, and the key delegation device 400.

As shown in FIG. 21, the key generation device 100, the encryption device 200, the decryption device 300, and the key delegation device 400 each include the CPU 911 (central processing unit, also called a processing unit, an arithmetic unit, a microprocessor, a microcomputer, or a processor). The CPU 911 is connected through the bus 912 with the ROM 913, the RAM 914, the LCD 901 (liquid crystal display), the keyboard 902 (K/B), the communication board 915, and the magnetic disk device 920, and controls these hardware devices. The magnetic disk device 920 (fixed disk device) may be replaced with a storage device such as an optical disk device or a memory card read/write device. The magnetic disk device 920 is connected through a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of a storage device (memory). The keyboard 902 and the communication board 915 are examples of an input device. The communication board 915 is an example of a communication device (network interface). The LCD 901 is an example of a display device.

The magnetic disk device 920, the ROM 913, or the like stores an operating system 921 (OS), a window system 922, programs 923, and files 924. The programs 923 are executed by the CPU 911, the operating system 921, and the window system 922.

The programs 923 store software or programs for executing the functions described hereinabove as "the master key generation unit 110", "the master key storage unit 120", "the key vector generation unit 130", "the randomizing vector generation unit 140", "the key-generation vector generation unit 150", "the key distribution unit 160", "the transmission information setting unit 210", "the cipher vector generation unit 220", "the cipher information generation unit 230", "the data transmission unit 240", "the public key acquisition unit 250", "the session key generation unit 260", "the vector input unit 310", "the key vector storage unit 320", "the pairing operation unit 330", "the key vector acquisition unit 410", "the key vector generation unit 420", "the randomizing vector generation unit 430", "the key-generation vector generation unit 440", "the key distribution unit 450", and so on. The programs are read and executed by the CPU 911.

The files 924 store information, data, signal values, variable values, and parameters, such as "the master public key pk", "the master secret key sk", "the cipher vector c", and "the key vector" described hereinabove, each of which is stored as an item of a "file" or a "database". The "file" or "database" is stored in a storage device such as a disk or memory. The information, data, signal values, variable values, and parameters stored in the storage device such as the disk or memory are read by the CPU 911 through a read/write circuit to a main memory or a cache memory, and are used for operations of the CPU 911 such as extraction, search, reference, comparison, calculation, computation, processing, output, printing, and display. The information, data, signal values, variable values, and parameters are temporarily stored in the main memory, the cache memory, or a buffer memory during the operations of the CPU 911 such as extraction, search, reference, comparison, calculation, computation, processing, output, printing, and display.

In the flowcharts described hereinabove, an arrow mainly represents an input/output of data or a signal, and each data or signal value is stored in the RAM 914, or other types of storage medium such as an optical disk, or an IC chip. The data or signal is transferred online through the bus 912, a signal line, a cable, other types of transfer medium, or a radio wave.

What is described hereinabove as "a . . . unit" may be "a . . . circuit", "a . . . device", "a . . . tool", "a . . . means", or "a . . . function", and may also be "a . . . step", "a . . . procedure", or "a . . . process". What is described as "a . . . device" may be "a . . . circuit", "a . . . tool", "a . . . means", or "a . . . function", and may also be "a . . . step", "a . . . procedure", or "a . . . process". What is described as "a . . . process" may be "a . . . step". That is, what is described as "a . . . unit" may be implemented by firmware stored in the ROM 913. Alternatively, "the . . . unit" may be implemented solely by software, or solely by hardware such as elements, devices, boards, and wiring, or by a combination of software and hardware, or by a combination including firmware. Firmware or software is stored as a program in a storage medium such as the ROM 913. The program is read by the CPU 911 and executed by the CPU 911. That is, the program causes a computer or the like to function as "the . . . unit" described above. Alternatively, the program causes the computer or the like to execute a procedure or a method of "the . . . unit" described above.

LIST OF REFERENCE SIGNS

10: cryptographic processing system
100: key generation device
110: master key generation unit 120: master key storage unit
130: key vector generation unit
140: randomizing vector generation unit
150 key-generation vector generation unit
160: key distribution unit
200: encryption device
210: transmission information setting unit
220: cipher vector generation unit
230: cipher information generation unit
240: data transmission unit
250: public key acquisition unit
260: session key generation unit
300: decryption device
310: vector input unit
320: key vector storage unit
330: pairing operation unit
400: key delegation device
410: key vector acquisition unit
420: key vector generation unit
430: randomizing vector generation unit
440: key-generation vector generation unit
450: key distribution unit

The invention claimed is:

1. A cryptographic processing system that performs a predicate encryption process using dual vector spaces of a space V and a space V* paired through a pairing operation, the cryptographic processing system comprising:
an encryption device that is given a basis B^ and predetermined attribute information as a public key, the basis B^ having, out of basis vectors $b_i$ (i=1, ..., n, ..., S, ..., N) (N being an integer of 3 or greater, S being an integer from n+1 to N−1, and n being an integer from 1 to N−2) that constitute a predetermined basis B of the space V, at least basis vectors $b_i$ (i=1, ..., n+1) excluding basis vectors $b_i$ (i=S+1, ..., N), and, using a processing device, generates as a cipher vector $c_1$ a vector in which attribute information is set as coefficients of one or more basis vectors out of basis vectors $b_i$ (i=1, ..., n) of the basis B^, and predetermined information is set as a coefficient of a basis vector $b_{n+1}$; and
a decryption device that, using the processing device, performs the pairing operation e ($c_1$, $k^*_{L,dec}$) shown below in Formula 1 on the cipher vector $c_1$ generated by the encryption device and a key vector $k^*_{L,dec}$ to decrypt the cipher vector $c_1$ and to extract a value concerning the predetermined information, the key vector $k^*_{L,dec}$ being a vector, of a basis B* of the space V*, in which predicate information is set as coefficients of one or more basis vectors of basis vectors $b^*_i$ (i=1, ..., n) out of basis vectors $b^*_i$ (i=1, ..., n, ..., S, ..., N) that constitute the basis B*, and a predetermined value is set as a coefficient of a basis vector $b^*_{n+1}$ of the basis B*

$$e(p,q) := \Pi_{i=1}^{N} e(\chi_i b_i, \eta_i b_i^*)$$ [Formula 1]

where
$p := \Sigma_{i=1}^{N} \chi_i b_i$,
$q := \Sigma_{i=1}^{N} \eta_i b_i^*$,
$\chi_i, \eta_i$: coefficients.

2. The cryptographic processing system of claim 1, wherein the decryption device performs the pairing operation e ($c_1$, $k^*_{L,dec}$) on the cipher vector $c_1$ and the key vector $k^*_{L,dec}$, the key vector $k^*_{L,dec}$ being a vector in which predicate information is set in one or more basis vectors of basis vectors $b^*_i$ (i=1, ..., n) out of basis vectors $b^*_i$ (i=1, ..., n, ..., R, ..., S, ..., N) (N being an integer of 4 or greater, S being an integer from n+2 to N−1, R being an integer from n+1 to S−1, and n being an integer from 1 to N−3) that constitute the basis B*, a predetermined value is set as a coefficient of a basis vector $b^*_{n+1}$ of the basis B*, and random values are set as coefficients of basis vectors $b^*_i$ (i=R+1, ..., S).

3. The cryptographic processing system of claim 2, further comprising:
a key generation device that, using the processing device, generates as the key vector $k^*_{L,dec}$ a vector in which predicate information is set as coefficients of one or more basis vectors of basis vectors $b^*_i$ (i=1, ..., n) out of basis vectors $b^*_i$ (i=1, ..., n, ..., R, ..., S, ..., N) that constitute the basis B*, a predetermined value is set as a coefficient of a basis vector $b^*_{n+1}$, and random values are set as coefficients of basis vectors $b^*_i$ (i=R+1, ..., S), and wherein
the decryption device obtains the key vector $k^*_{L,dec}$ generated by the key generation device, and performs the pairing operation on the key vector $k^*_{L,dec}$ obtained and the cipher vector $c_1$.

4. The cryptographic processing system of claim 3, further comprising:
a key delegation device that generates as a key vector $k^*_{L+1,dec}$ a vector that can decrypt one or more, but not all, of cipher vectors that can be decrypted by the key vector $k^*_{L,dec}$ generated by the key generation device, the key vector $k^*_{L+1,dec}$ being the vector in which random values having uniformly distributed values are set as coefficients of basis vectors in which predicate information is set.

5. A cryptographic processing method that performs a predicate encryption process using dual vector spaces of a space V and a space V* paired through a pairing operation, the cryptographic processing method comprising:
being given a basis B^ and predetermined attribute information as a public key, the basis B^ having, out of basis vectors $b_i$ (i=1, ..., n, ..., S, ..., N) (N being an integer of 3 or greater, S being an integer from n+1 to N−1, and n being an integer from 1 to N−2) that constitute a predetermined basis B of the space V, at least basis vectors $b_i$ (i=1, ..., n+1) excluding basis vectors $b_i$ (i=S+1, ..., N), and generating, by a processing circuitry, as a cipher vector $c_1$ a vector in which attribute information is set as coefficients of one or more basis vectors out of basis vectors $b_i$ (i=1, ..., n) of the basis B^, and predetermined information is set as a coefficient of the basis vector $b_{n+1}$; and
performing, by the processing circuitry the pairing operation e ($c_1$, $k^*_{L,dec}$) shown below in Formula 1 on the cipher vector $c_1$ and a key vector $k^*_{L,dec}$ to decrypt the cipher vector $c_1$ and to extract a value concerning the predetermined information, the key vector $k^*_{L,dec}$ being a vector, of a basis B* of the space V*, in which predicate information is set as coefficients of one or more basis vectors of basis vectors $b^*_i$ (i=1, ..., n) out of basis vectors $b^*_i$ (i=1, ..., n, ..., S, ..., N) that constitute the basis B*, and a predetermined value is set as a coefficient of a basis vector $b^*_{n+1}$ of the basis B*

$$e(p,q) := \Pi_{i=1}^{N} e(\chi_i b_i, \eta_i b_i^*)$$ [Formula 1]

where
$p := \Sigma_{i=1}^{N} \chi_i b_i$,
$q := \Sigma_{i=1}^{N} \eta_i b_i$,
$\chi_i, \eta_i$: coefficients.

6. A non-transitory computer-readable storage medium storing thereon a cryptographic processing program that causes a processing device to perform a cryptographic processing method including a predicate encryption process using dual vector spaces of a space V and a space V* paired through a pairing operation the cryptographic processing method comprising:
being given a basis B^ and predetermined attribute information as a public key, the basis B^ having, out of basis vectors $b_i$ (i=1, ..., n, ..., S, ..., N) (N being an integer of 3 or greater, S being an integer from n+1 to N−1, and n being an integer from 1 to N−2) that constitute a predetermined basis B of the space V, at least basis vectors $b_i$ (i=1, . . . , n+1) excluding basis vectors $b_i$ (i=S+1, . . . , N), and generating as a cipher vector $c_1$ a vector in which attribute information is set as coefficients of one or more basis vectors out of basis vectors $b_i$ (i=1, . . . , n) of the basis B^, and predetermined information is set as a coefficient of the basis vector $b_{n+1}$; and performing the pairing operation e ($c_1$, $k^*_{L,dec}$) shown in Formula 1 on the cipher vector $c_1$ generated by the encryption device and a key vector $k^*_{L,dec}$ to decrypt the cipher vector $c_1$ and to extract a value concerning the predetermined information, the key vector $k^*_{L,dec}$ being a vector, of a basis B* of the space V*, in which predicate information is set as coefficients of one or more basis vectors of basis vectors $b^*_i$ (i=1, . . . , n) out of basis vectors $b^*_i$ (i=1, ..., n, ..., S, ..., N) that constitute the basis B*, and a predetermined value is set as a coefficient of a basis vector $b^*_{n+1}$ of the basis B*

$$e(p,q) := \Pi_{i=1}^{N} e(\chi_i b_i, \eta_i b_i^*) \quad \text{[Formula 1]}$$

where
$p := \Sigma_{i=1}^{N} \chi_i b_i$,
$q := \Sigma_{i=1}^{N} \eta_i b_i$,
$\chi_i, \eta_i$: coefficients.

* * * * *